United States Patent
Doshi et al.

(10) Patent No.: US 10,705,964 B2
(45) Date of Patent: Jul. 7, 2020

(54) CONTROLLING DISPLACEMENT IN A CO-OPERATIVE AND ADAPTIVE MULTIPLE-LEVEL MEMORY SYSTEM

(71) Applicant: Intel Corporation, Santa Clara, CA (US)

(72) Inventors: Kshitij A. Doshi, Chandler, AZ (US); Christopher J. Hughes, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 366 days.

(21) Appl. No.: 14/697,832

(22) Filed: Apr. 28, 2015

(65) Prior Publication Data

US 2016/0321185 A1    Nov. 3, 2016

(51) Int. Cl.
*G06F 12/0864* (2016.01)
*G06F 9/46* (2006.01)
*G06F 12/121* (2016.01)
*G06F 12/0842* (2016.01)

(52) U.S. Cl.
CPC ............ *G06F 12/0864* (2013.01); *G06F 9/46* (2013.01); *G06F 12/121* (2013.01); *G06F 12/0842* (2013.01); *G06F 2212/1016* (2013.01); *G06F 2212/608* (2013.01)

(58) Field of Classification Search
CPC .. G06F 12/0862; G06F 12/08; G06F 12/0888; G06F 2212/283; G06F 12/0871; G06F 17/30867; G06F 12/0868; G06F 12/0873; G06F 12/121; G06F 17/30132; G06F 17/3033; G06F 17/30949; G06F 12/0804; G06F 12/0897; G06F 12/12; G06F 12/127; G06F 12/0808; G06F 12/0864; G06F 12/0811; G06F 2212/69; G06F 9/46; G06F 12/0842; G06F 2212/1016; G06F 2212/608
See application file for complete search history.

(56) References Cited

U.S. PATENT DOCUMENTS

| | | | | |
|---|---|---|---|---|
| 7,752,395 | B1 * | 7/2010 | Fair ..................... | G06F 12/0866 711/133 |
| 9,047,225 | B1 * | 6/2015 | Evans ................... | G06F 12/121 |
| 2002/0007440 | A1 * | 1/2002 | Hosoya ............... | G06F 12/0811 711/122 |
| 2004/0215890 | A1 * | 10/2004 | Cargnoni ............ | G06F 12/0891 711/136 |

(Continued)

OTHER PUBLICATIONS

U.S. Appl. No. 14/496,255, filed Sep. 25, 2014, entitled "Instruction and Logic for Adaptive Dataset Priorities in Processor Caches," by Kshitij Doshi, et al.

*Primary Examiner* — Yaima Rigol
(74) *Attorney, Agent, or Firm* — Trop, Pruner & Hu, P.C.

(57) ABSTRACT

In one embodiment, a processor includes a control logic to determine whether to enable an incoming data block associated with a first priority to displace, in a cache memory coupled to the processor, a candidate victim data block associated with a second priority and stored in the cache memory, based at least in part on the first and second priorities, a first access history associated with the incoming data block and a second access history associated with the candidate victim data block. Other embodiments are described and claimed.

22 Claims, 33 Drawing Sheets

(56) References Cited

U.S. PATENT DOCUMENTS

| | | | |
|---|---|---|---|
| 2015/0026404 A1* | 1/2015 | Lilly | G06F 12/0862 |
| | | | 711/122 |
| 2015/0067266 A1* | 3/2015 | Jafri | G06F 12/0804 |
| | | | 711/136 |
| 2016/0062894 A1* | 3/2016 | Schwetman, Jr. | G06F 12/0862 |
| | | | 711/137 |

* cited by examiner

| 127 120 | 119 112 | 111 104 | 103 | | 24 | 23 16 | 15 8 | 7 0 |
|---|---|---|---|---|---|---|---|---|
| sbbb bbbb | sbbb bbbb | sbbb bbbb | ● | ● | ● | sbbb bbbb | sbbb bbbb | sbbb bbbb |

Unsigned Packed Byte Representation 344

| 127 120 | 119 112 | 111 104 | 103 | | 24 | 23 16 | 15 8 | 7 0 |
|---|---|---|---|---|---|---|---|---|
| sbbb bbbb | sbbb bbbb | sbbb bbbb | ● | ● | ● | sbbb bbbb | sbbb bbbb | sbbb bbbb |

Signed Packed Byte Representation 345

| 127 112 | 111 | | 16 | 15 0 |
|---|---|---|---|---|
| wwww wwww wwww wwww | ● | ● | ● | wwww wwww wwww wwww |

Unsigned Packed Word Representation 346

| 127 112 | 111 | | 16 | 15 0 |
|---|---|---|---|---|
| swww wwww wwww wwww | ● | ● | ● | swww wwww wwww wwww |

Signed Packed Word Representation 347

| 127 92 | 91 | | 32 | 31 0 |
|---|---|---|---|---|
| dddd dddd dddd dddd dddd dddd dddd dddd | ● | ● | ● | dddd dddd dddd dddd dddd dddd dddd dddd |

Unsigned Packed Doubleword Representation 348

| 127 92 | 91 | | 32 | 31 0 |
|---|---|---|---|---|
| sddd dddd dddd dddd dddd dddd dddd dddd | ● | ● | ● | sddd dddd dddd dddd dddd dddd dddd dddd |

Signed Packed Doubleword Representation 349

FIG. 3C

CONTROLLING DISPLACEMENT IN A CO-OPERATIVE AND ADAPTIVE MULTIPLE-LEVEL MEMORY SYSTEM

TECHNICAL FIELD

The present disclosure pertains to the field of processing logic, microprocessors, and associated instruction set architecture that, when executed by the processor or other processing logic, perform logical, mathematical, or other functional operations.

BACKGROUND

Multiprocessor systems are becoming more and more common. Applications of multiprocessor systems include dynamic domain partitioning all the way down to desktop computing. In order to take advantage of multiprocessor systems, code to be executed may be separated into multiple threads for execution by various processing entities. Each thread may be executed in parallel with one another. Furthermore, in order to increase the utility of a processing entity, out-of-order execution may be employed. Out-of-order execution may execute instructions as input to such instructions is made available. Thus, an instruction that appears later in a code sequence may be executed before an instruction appearing earlier in a code sequence. Timely access to requested data by execution logic enhances processing efficiency. Some architectures, however, can incur latencies before requested data is available.

BRIEF DESCRIPTION OF THE DRAWINGS

FIG. 3C illustrates various signed and unsigned packed data type representations in multimedia registers, in accordance with embodiments of the present disclosure.

DETAILED DESCRIPTION

Figure 1A:
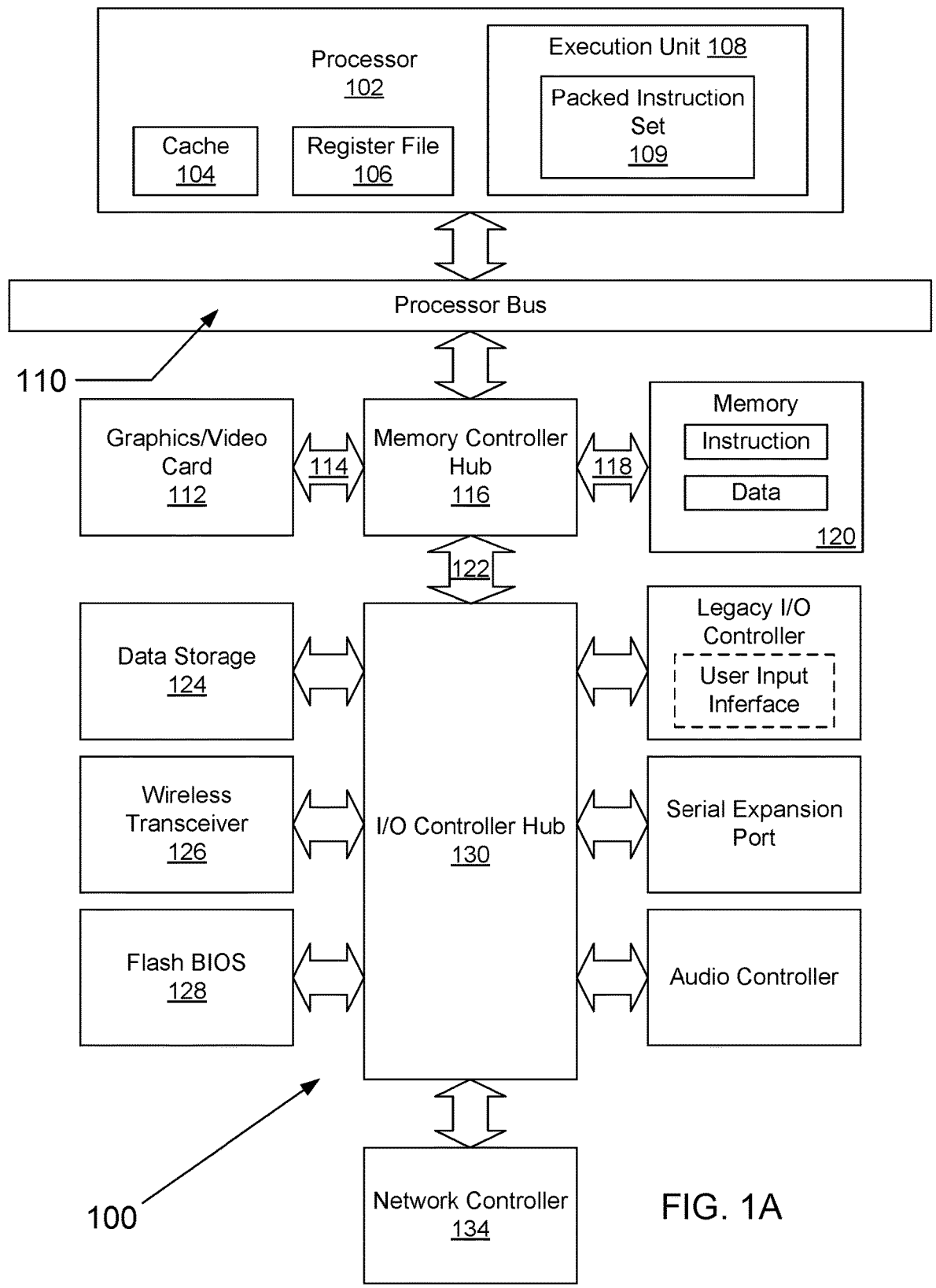
FIG. 1A is a block diagram of an exemplary computer system formed with a processor that may include execution units to execute an instruction, in accordance with embodiments of the present disclosure.

The following description describes an instruction and processing logic for adaptive data set priorities with a processor, virtual processor, package, computer system, or other processing apparatus. Such adaptive dataset priorities may be used to evaluate contents of one or more memory and/or storage devices coupled to such a processor. In the following description, numerous specific details such as processing logic, processor types, micro-architectural conditions, events, enablement mechanisms, and the like are set forth in order to provide a more thorough understanding of embodiments of the present disclosure. It will be appreciated, however, by one skilled in the art that the embodiments may be practiced without such specific details. Additionally, some well-known structures, circuits, and the like have not been shown in detail to avoid unnecessarily obscuring embodiments of the present disclosure.

Although the following embodiments are described with reference to a processor, other embodiments are applicable to other types of integrated circuits and logic devices. Similar techniques and teachings of embodiments of the present disclosure may be applied to other types of circuits or semiconductor devices that may benefit from higher pipeline throughput and improved performance. The teachings of embodiments of the present disclosure are applicable to any processor or machine that performs data manipulations. However, the embodiments are not limited to processors or machines that perform 512-bit, 256-bit, 128-bit, 64-bit, 32-bit, or 16-bit data operations and may be applied to any processor and machine in which manipulation or management of data may be performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure may be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions may be used to cause a general-purpose or special-purpose processor that may be programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Furthermore, steps of embodiments of the present disclosure might be performed by specific hardware components that contain fixed-function logic for performing the steps, or by any combination of programmed computer components and fixed-function hardware components.

Instructions used to program logic to perform embodiments of the present disclosure may be stored within a memory in the system, such as DRAM, cache, flash memory, or other storage. Furthermore, the instructions may be distributed via a network or by way of other computer-readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium may include any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as may be useful in simulations, the hardware may be represented using a hardware description language or another functional description language. Additionally, a circuit level model with logic and/or transistor gates may be produced at some stages of the design process. Furthermore, designs, at some stage, may reach a level of data representing the physical placement of various devices in the hardware model. In cases wherein some semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or retransmission of the electrical signal is performed, a new copy may be made. Thus, a communication provider or a network provider may store on a tangible, machine-readable medium, at least temporarily, an article, such as information encoded into a carrier wave, embodying techniques of embodiments of the present disclosure.

In modern processors, a number of different execution units may be used to process and execute a variety of code and instructions. Some instructions may be quicker to complete while others may take a number of clock cycles to complete. The faster the throughput of instructions, the better the overall performance of the processor. Thus it would be advantageous to have as many instructions execute as fast as possible. However, there may be certain instructions that have greater complexity and require more in terms of execution time and processor resources, such as floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which may include processor logic and circuits used to implement one or more instruction sets. Accordingly, processors with different micro-architectures may share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

An instruction may include one or more instruction formats. In one embodiment, an instruction format may indicate various fields (number of bits, location of bits, etc.) to specify, among other things, the operation to be performed and the operands on which that operation will be performed. In a further embodiment, some instruction formats may be further defined by instruction templates (or sub-formats). For example, the instruction templates of a given instruction format may be defined to have different subsets of the instruction format's fields and/or defined to have a given field interpreted differently. In one embodiment, an instruction may be expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that may logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type may be referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data may be generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that may include execution units to execute an instruction, in accordance with embodiments of the present disclosure. System 100 may include a component, such as a processor 102 to employ execution units including logic to perform algorithms for process data, in accordance with the present disclosure, such as in the embodiment described herein. System 100 may be representative of processing systems based on the PENTIUM™ III, PENTIUM™ 4, Xeon™, Itanium™, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Embodiments of the present disclosure may be used in other devices such as handheld devices and embedded applications. Some examples of handheld devices include cellular phones, Internet Protocol devices, digital cameras, personal digital assistants (PDAs), and handheld PCs. Embedded applications may include a micro controller, a digital signal processor (DSP), system on a chip, network computers (NetPC), set-top boxes, network hubs, wide area network (WAN) switches, or any other system that may perform one or more instructions in accordance with at least one embodiment.

Computer system 100 may include a processor 102 that may include one or more execution units 108 to perform an algorithm to perform at least one instruction in accordance with one embodiment of the present disclosure. One embodiment may be described in the context of a single processor desktop or server system, but other embodiments may be included in a multiprocessor system. System 100 may be an example of a 'hub' system architecture. System 100 may include a processor 102 for processing data signals. Processor 102 may include a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In one embodiment, processor 102 may be coupled to a processor bus 110 that may transmit data signals between processor 102 and other components in system 100. The elements of system 100 may perform conventional functions that are well known to those familiar with the art.

In one embodiment, processor 102 may include a Level 1 (L1) internal cache memory 104. Depending on the architecture, the processor 102 may have a single internal cache or multiple levels of internal cache. In another embodiment, the cache memory may reside external to processor 102. Other embodiments may also include a combination of both internal and external caches depending on the particular implementation and needs. Register file 106 may store different types of data in various registers including integer registers, floating point registers, status registers, and instruction pointer register.

Execution unit 108, including logic to perform integer and floating point operations, also resides in processor 102. Processor 102 may also include a microcode (ucode) ROM that stores microcode for certain macroinstructions. In one embodiment, execution unit 108 may include logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications may be accelerated and executed more efficiently by using the full width of a processor's data bus for performing operations on packed data. This may eliminate the need to transfer smaller units of data across the processor's data bus to perform one or more operations one data element at a time.

Embodiments of an execution unit 108 may also be used in micro controllers, embedded processors, graphics devices, DSPs, and other types of logic circuits. System 100 may include a memory 120. Memory 120 may be implemented as a dynamic random access memory (DRAM) device, a static random access memory (SRAM) device, flash memory device, or other memory device. Memory 120 may store instructions and/or data represented by data signals that may be executed by processor 102.

A system logic chip 116 may be coupled to processor bus 110 and memory 120. System logic chip 116 may include a memory controller hub (MCH). Processor 102 may communicate with MCH 116 via a processor bus 110. MCH 116 may provide a high bandwidth memory path 118 to memory 120 for instruction and data storage and for storage of graphics commands, data and textures. MCH 116 may direct data signals between processor 102, memory 120, and other components in system 100 and to bridge the data signals between processor bus 110, memory 120, and system I/O 122. In some embodiments, the system logic chip 116 may provide a graphics port for coupling to a graphics controller 112. MCH 116 may be coupled to memory 120 through a memory interface 118. Graphics card 112 may be coupled to MCH 116 through an Accelerated Graphics Port (AGP) interconnect 114.

System 100 may use a proprietary hub interface bus 122 to couple MCH 116 to I/O controller hub (ICH) 130. In one embodiment, ICH 130 may provide direct connections to some I/O devices via a local I/O bus. The local I/O bus may include a high-speed I/O bus for connecting peripherals to memory 120, chipset, and processor 102. Examples may include the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. Data storage device 124 may comprise a hard disk drive, a floppy disk drive, a CD-ROM device, a flash memory device, or other mass storage device.

For another embodiment of a system, an instruction in accordance with one embodiment may be used with a system on a chip. One embodiment of a system on a chip comprises of a processor and a memory. The memory for one such system may include a flash memory. The flash memory may be located on the same die as the processor and other system components. Additionally, other logic blocks such as a memory controller or graphics controller may also be located on a system on a chip.

Figure 1B:
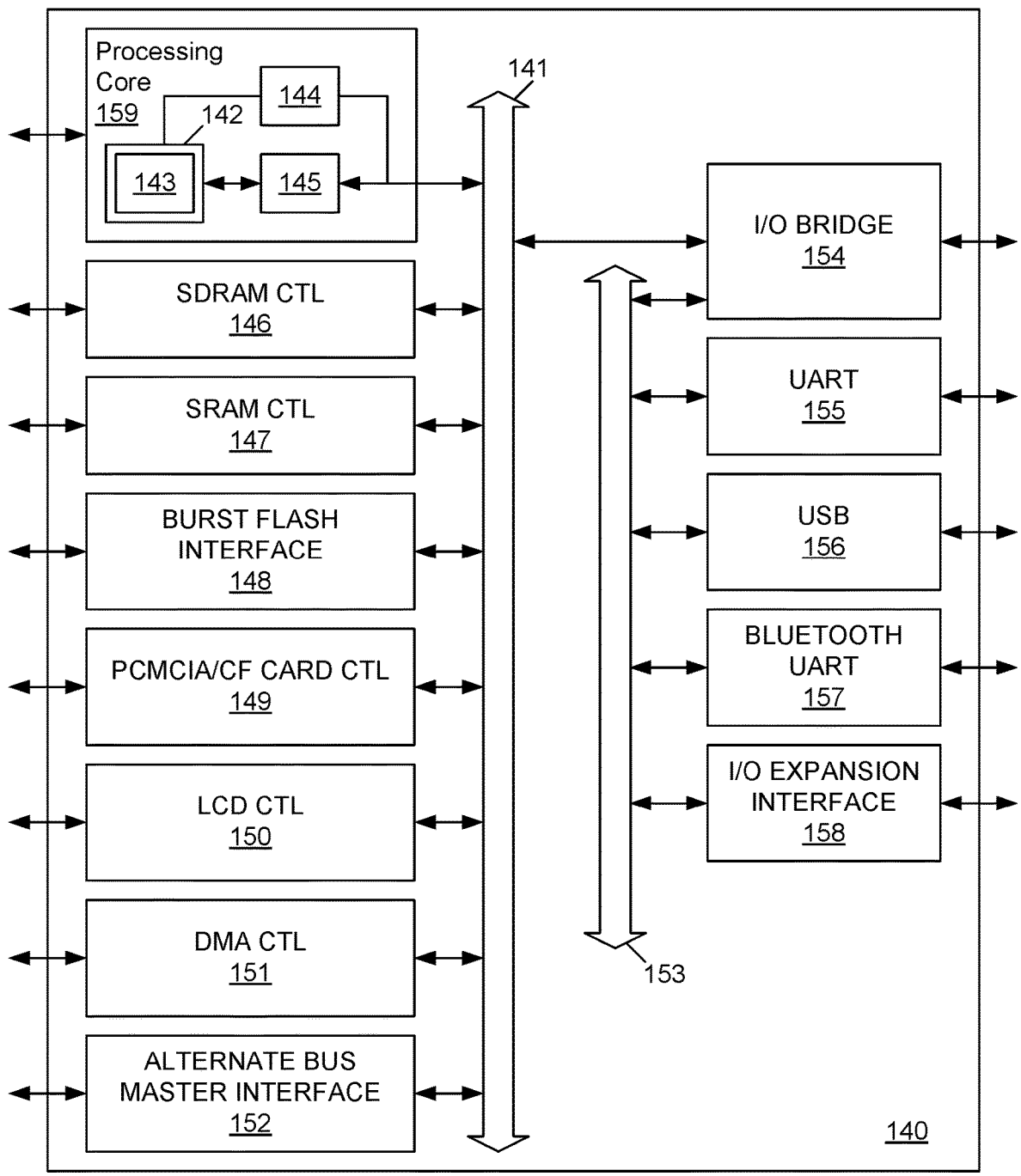
FIG. 1B illustrates a data processing system, in accordance with embodiments of the present disclosure.

FIG. 1B illustrates a data processing system 140 which implements the principles of embodiments of the present disclosure. It will be readily appreciated by one of skill in the art that the embodiments described herein may operate with alternative processing systems without departure from the scope of embodiments of the disclosure.

Computer system 140 comprises a processing core 159 for performing at least one instruction in accordance with one embodiment. In one embodiment, processing core 159 represents a processing unit of any type of architecture, including but not limited to a CISC, a RISC or a VLIW type architecture. Processing core 159 may also be suitable for manufacture in one or more process technologies and by being represented on a machine-readable media in sufficient detail, may be suitable to facilitate said manufacture.

Processing core 159 comprises an execution unit 142, a set of register files 145, and a decoder 144. Processing core 159 may also include additional circuitry (not shown) which may be unnecessary to the understanding of embodiments of the present disclosure. Execution unit 142 may execute instructions received by processing core 159. In addition to performing typical processor instructions, execution unit 142 may perform instructions in packed instruction set 143 for performing operations on packed data formats. Packed instruction set 143 may include instructions for performing embodiments of the disclosure and other packed instructions. Execution unit 142 may be coupled to register file 145 by an internal bus. Register file 145 may represent a storage area on processing core 159 for storing information, including data. As previously mentioned, it is understood that the storage area may store the packed data might not be critical. Execution unit 142 may be coupled to decoder 144. Decoder 144 may decode instructions received by processing core 159 into control signals and/or microcode entry points. In response to these control signals and/or microcode entry points, execution unit 142 performs the appropriate operations. In one embodiment, the decoder may interpret the opcode of the instruction, which will indicate what operation should be performed on the corresponding data indicated within the instruction.

Processing core 159 may be coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 that may perform SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
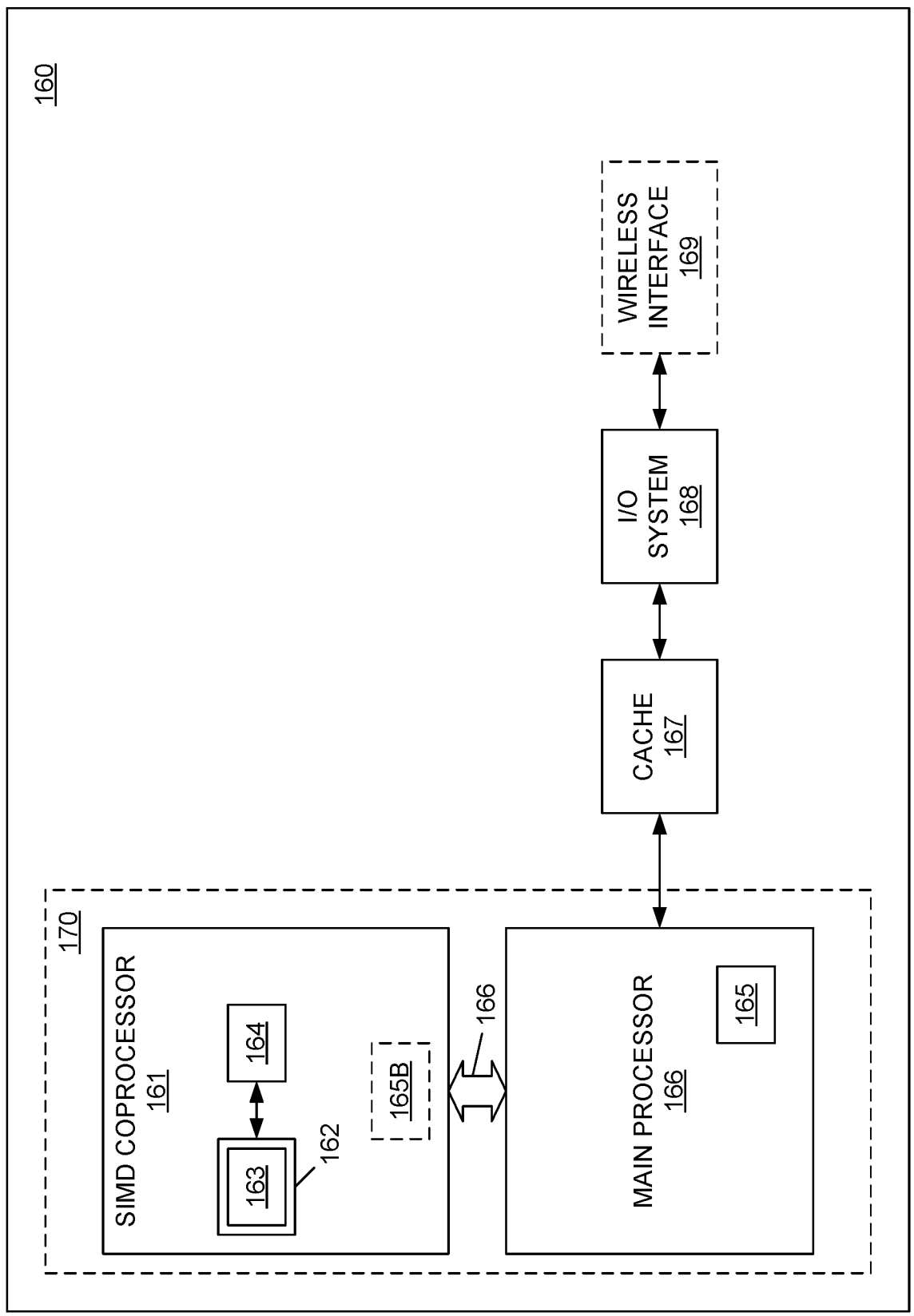
FIG. 1C illustrates another embodiment of a data processing system to perform operations in accordance with embodiments of the present disclosure.

FIG. 1C illustrates another embodiment of a data processing system to perform operations in accordance with embodiments of the present disclosure. In one embodiment, data processing system 160 may include a main processor 166, a SIMD coprocessor 161, a cache memory 167, and an input/output system 168. Input/output system 168 may optionally be coupled to a wireless interface 169. SIMD coprocessor 161 may perform operations including instructions in accordance with one embodiment. In one embodiment, processing core 170 may be suitable for manufacture in one or more process technologies and by being represented on a machine-readable media in sufficient detail, may be suitable to facilitate the manufacture of all or part of data processing system 160 including processing core 170.

In one embodiment, SIMD coprocessor 161 comprises an execution unit 162 and a set of register files 164. One embodiment of main processor 165 comprises a decoder 165 to recognize instructions of instruction set 163 including instructions in accordance with one embodiment for execution by execution unit 162. In other embodiments, SIMD coprocessor 161 also comprises at least part of decoder 165 to decode instructions of instruction set 163. Processing core 170 may also include additional circuitry (not shown) which may be unnecessary to the understanding of embodiments of the present disclosure.

In operation, main processor 166 executes a stream of data processing instructions that control data processing operations of a general type including interactions with cache memory 167, and input/output system 168. Embedded within the stream of data processing instructions may be SIMD coprocessor instructions. Decoder 165 of main processor 166 recognizes these SIMD coprocessor instructions as being of a type that should be executed by an attached SIMD coprocessor 161. Accordingly, main processor 166 issues these SIMD coprocessor instructions (or control signals representing SIMD coprocessor instructions) on the coprocessor bus 166. From coprocessor bus 166, these instructions may be received by any attached SIMD coprocessors. In this case, SIMD coprocessor 161 may accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. In one embodiment of processing core 170, main processor 166, and a SIMD coprocessor 161 may be integrated into a single processing core 170 comprising an execution unit 162, a set of register files 164, and a decoder 165 to recognize instructions of instruction set 163 including instructions in accordance with one embodiment.

Figure 2:
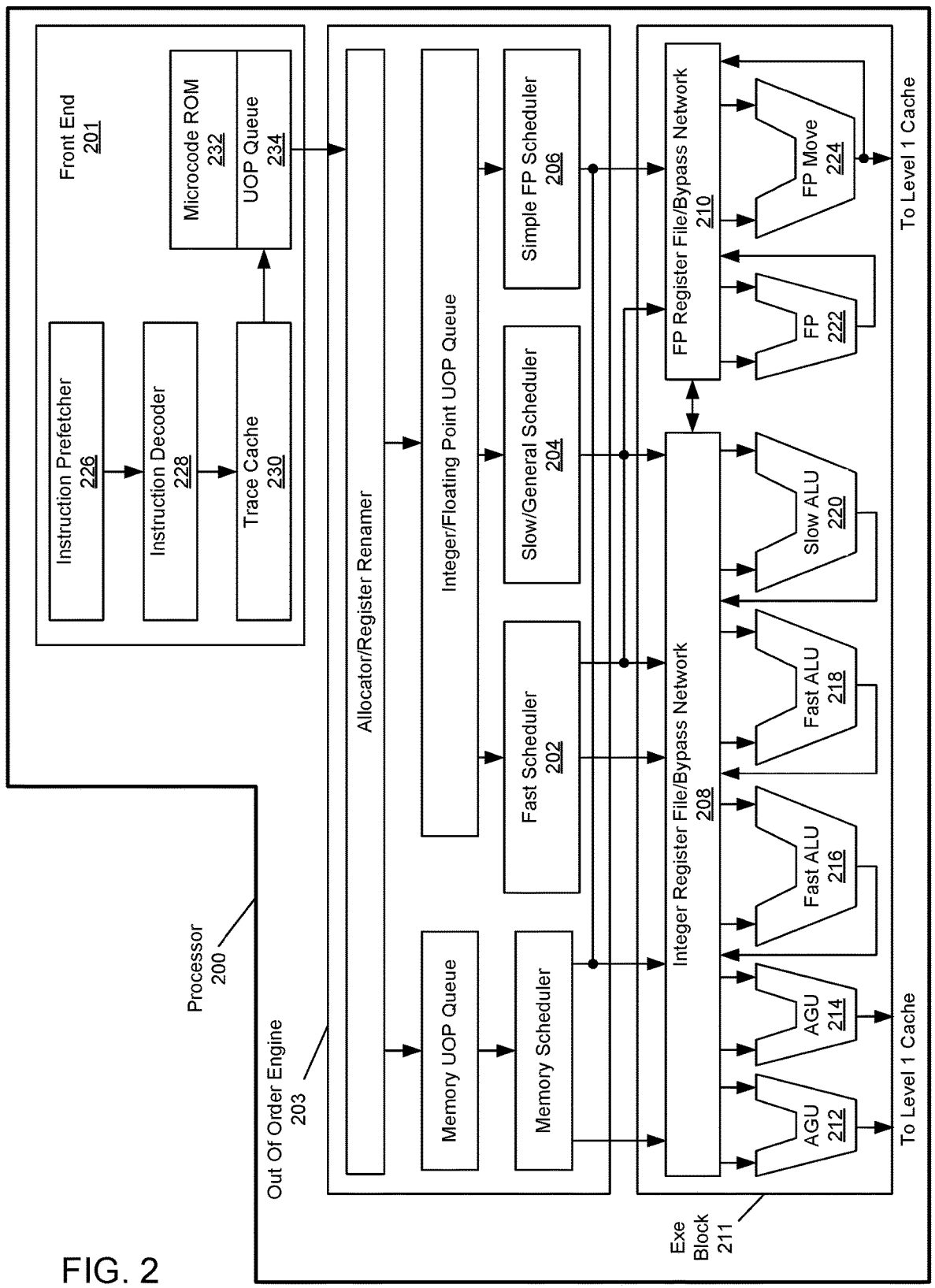
FIG. 2 is a block diagram of the micro-architecture for a processor that may include logic circuits to perform instructions, in accordance with embodiments of the present disclosure.

FIG. 2 is a block diagram of the micro-architecture for a processor 200 that may include logic circuits to perform instructions, in accordance with embodiments of the present disclosure. In some embodiments, an instruction in accordance with one embodiment may be implemented to operate on data elements having sizes of byte, word, doubleword, quadword, etc., as well as datatypes, such as single and double precision integer and floating point datatypes. In one embodiment, in-order front end 201 may implement a part of processor 200 that may fetch instructions to be executed and prepares the instructions to be used later in the processor pipeline. Front end 201 may include several units. In one embodiment, instruction prefetcher 226 fetches instructions from memory and feeds the instructions to an instruction decoder 228 which in turn decodes or interprets the instructions. For example, in one embodiment, the decoder decodes a received instruction into one or more operations called "micro-instructions" or "micro-operations" (also called micro op or uops) that the machine may execute. In other embodiments, the decoder parses the instruction into an opcode and corresponding data and control fields that may be used by the micro-architecture to perform operations in accordance with one embodiment. In one embodiment, trace cache 230 may assemble decoded uops into program ordered sequences or traces in uop queue 234 for execution. When trace cache 230 encounters a complex instruction, microcode ROM 232 provides the uops needed to complete the operation.

Some instructions may be converted into a single micro-op, whereas others need several micro-ops to complete the full operation. In one embodiment, if more than four micro-ops are needed to complete an instruction, decoder 228 may access microcode ROM 232 to perform the instruction. In one embodiment, an instruction may be decoded into a small number of micro ops for processing at instruction decoder 228. In another embodiment, an instruction may be stored within microcode ROM 232 should a number of micro-ops be needed to accomplish the operation. Trace cache 230 refers to an entry point programmable logic array (PLA) to determine a correct micro-instruction pointer for reading the micro-code sequences to complete one or more instructions in accordance with one embodiment from micro-code ROM 232. After microcode ROM 232 finishes sequencing micro-ops for an instruction, front end 201 of the machine may resume fetching micro-ops from trace cache 230.

Out-of-order execution engine 203 may prepare instructions for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. Uop schedulers 202, 204, 206, determine when a uop is ready to execute based on the readiness of their dependent input register operand sources and the availability of the execution resources the uops need to complete their operation. Fast scheduler 202 of one embodiment may schedule on each half of the main clock cycle while the other schedulers may only schedule once per main processor clock cycle. The schedulers arbitrate for the dispatch ports to schedule uops for execution.

Register files 208, 210 may be arranged between schedulers 202, 204, 206, and execution units 212, 214, 216, 218, 220, 222, 224 in execution block 211. Each of register files 208, 210 perform integer and floating point operations, respectively. Each register file 208, 210, may include a bypass network that may bypass or forward just completed results that have not yet been written into the register file to new dependent uops. Integer register file 208 and floating point register file 210 may communicate data with the other. In one embodiment, integer register file 208 may be split into two separate register files, one register file for low-order thirty-two bits of data and a second register file for high order thirty-two bits of data. Floating point register file 210 may include 128-bit wide entries because floating point instructions typically have operands from 64 to 128 bits in width.

Execution block 211 may contain execution units 212, 214, 216, 218, 220, 222, 224. Execution units 212, 214, 216, 218, 220, 222, 224 may execute the instructions. Execution block 211 may include register files 208, 210 that store the integer and floating point data operand values that the micro-instructions need to execute. In one embodiment, processor 200 may comprise a number of execution units: address generation unit (AGU) 212, AGU 214, fast ALU 216, fast ALU 218, slow ALU 220, floating point ALU 222, floating point move unit 224. In another embodiment, floating point execution blocks 222, 224, may execute floating point, MMX, SIMD, and SSE, or other operations. In yet another embodiment, floating point ALU 222 may include a 64-bit by 64-bit floating point divider to execute divide, square root, and remainder micro-ops. In various embodiments, instructions involving a floating point value may be handled with the floating point hardware. In one embodiment, ALU operations may be passed to high-speed ALU execution units 216, 218. High-speed ALUs 216, 218 may execute fast operations with an effective latency of half a clock cycle. In one embodiment, most complex integer operations go to slow ALU 220 as slow ALU 220 may include integer execution hardware for long-latency type of operations, such as a multiplier, shifts, flag logic, and branch processing. Memory load/store operations may be executed by AGUs 212, 214. In one embodiment, integer ALUs 216, 218, 220 may perform integer operations on 64-bit data operands. In other embodiments, ALUs 216, 218, 220 may be implemented to support a variety of data bit sizes including sixteen, thirty-two, 128, 256, etc. Similarly, floating point units 222, 224 may be implemented to support a range of operands having bits of various widths. In one embodiment, floating point units 222, 224, may operate on 128-bit wide packed data operands in conjunction with SIMD and multimedia instructions.

In one embodiment, uops schedulers 202, 204, 206, dispatch dependent operations before the parent load has finished executing. As uops may be speculatively scheduled and executed in processor 200, processor 200 may also include logic to handle memory misses. If a data load misses in the data cache, there may be dependent operations in flight in the pipeline that have left the scheduler with temporarily incorrect data. A replay mechanism tracks and re-executes instructions that use incorrect data. Only the dependent operations might need to be replayed and the independent ones may be allowed to complete. The schedulers and replay mechanism of one embodiment of a processor may also be designed to catch instruction sequences for text string comparison operations.

The term "registers" may refer to the on-board processor storage locations that may be used as part of instructions to identify operands. In other words, registers may be those that may be usable from the outside of the processor (from a programmer's perspective). However, in some embodiments registers might not be limited to a particular type of circuit. Rather, a register may store data, provide data, and perform the functions described herein. The registers described herein may be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit integer data. A register file of one embodiment also contains eight multimedia SIMD registers for packed data. For the discussions below, the registers may be understood to be data registers designed to hold packed data, such as 64-bit wide MMX™ registers (also referred to as 'mm' registers in some instances) in microprocessors enabled with MMX technology from Intel Corporation of Santa Clara, Calif. These MMX registers, available in both integer and floating point forms, may operate with packed data elements that accompany SIMD and SSE instructions. Similarly, 128-bit wide XMM registers relating to SSE2, SSE3, SSE4, or beyond (referred to generically as "SSEx") technology may hold such packed data operands. In one embodiment, in storing packed data and integer data, the registers do not need to differentiate between the two data types. In one embodiment, integer and floating point may be contained in the same register file or different register files. Furthermore, in one embodiment, floating point and integer data may be stored in different registers or the same registers.

Figure 3A:
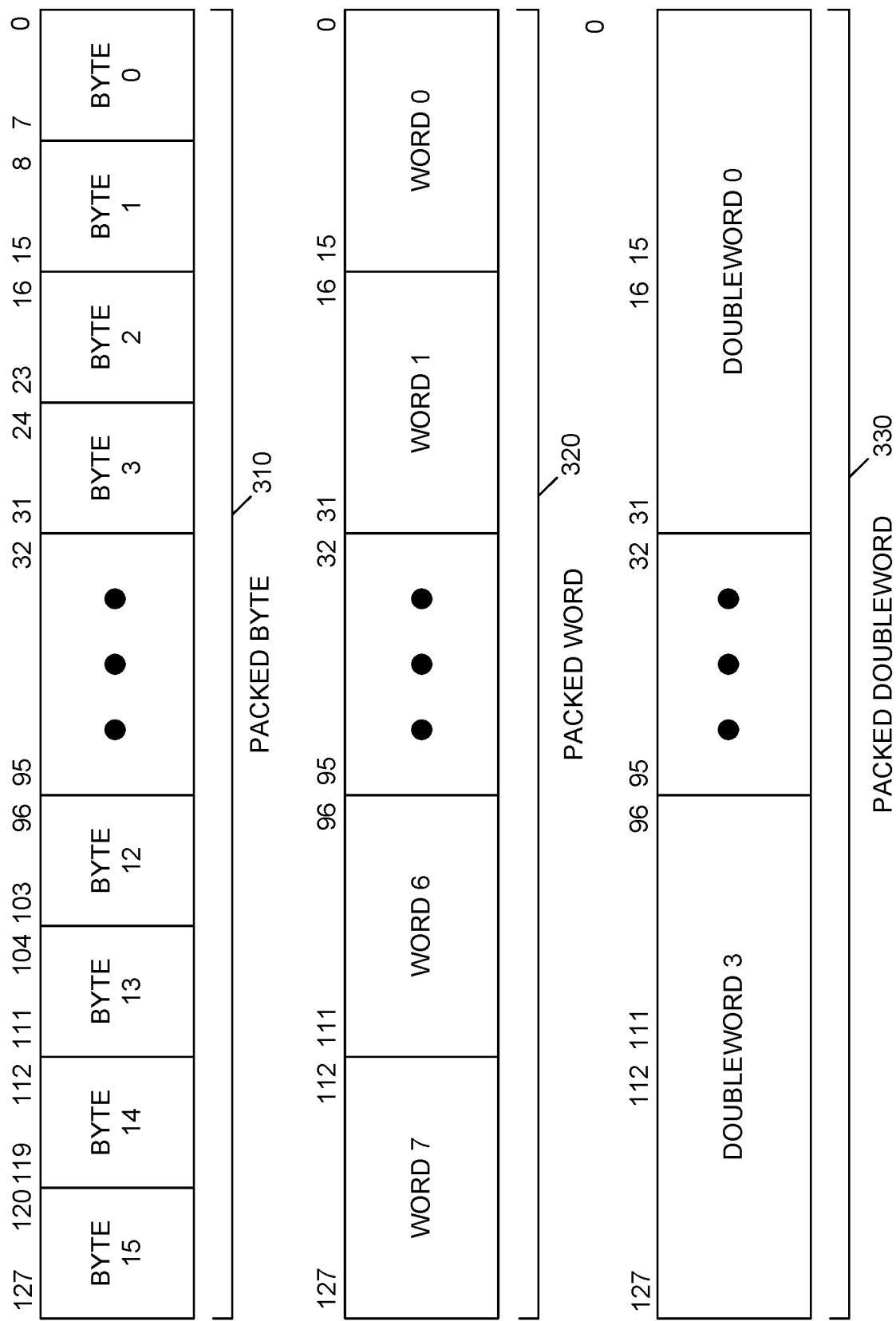
FIG. 3A illustrates various packed data type representations in multimedia registers, in accordance with embodiments of the present disclosure.

In the examples of the following figures, a number of data operands may be described. FIG. 3A illustrates various packed data type representations in multimedia registers, in accordance with embodiments of the present disclosure. FIG. 3A illustrates data types for a packed byte 310, a packed word 320, and a packed doubleword (dword) 330 for 128-bit wide operands. Packed byte format 310 of this example may be 128 bits long and contains sixteen packed byte data elements. A byte may be defined, for example, as eight bits of data. Information for each byte data element may be stored in bit 7 through bit 0 for byte 0, bit 15 through bit 8 for byte 1, bit 23 through bit 16 for byte 2, and finally bit 120 through bit 127 for byte 15. Thus, all available bits may be used in the register. This storage arrangement increases the storage efficiency of the processor. As well, with sixteen data elements accessed, one operation may now be performed on sixteen data elements in parallel.

Generally, a data element may include an individual piece of data that is stored in a single register or memory location with other data elements of the same length. In packed data sequences relating to SSEx technology, the number of data elements stored in a XMM register may be 128 bits divided by the length in bits of an individual data element. Similarly, in packed data sequences relating to MMX and SSE technology, the number of data elements stored in an MMX register may be 64 bits divided by the length in bits of an individual data element. Although the data types illustrated in FIG. 3A may be 128 bits long, embodiments of the present disclosure may also operate with 64-bit wide or other sized operands. Packed word format 320 of this example may be 128 bits long and contains eight packed word data elements. Each packed word contains sixteen bits of information. Packed doubleword format 330 of FIG. 3A may be 128 bits long and contains four packed doubleword data elements. Each packed doubleword data element contains thirty-two bits of information. A packed quadword may be 128 bits long and contain two packed quad-word data elements.

Figure 3B:
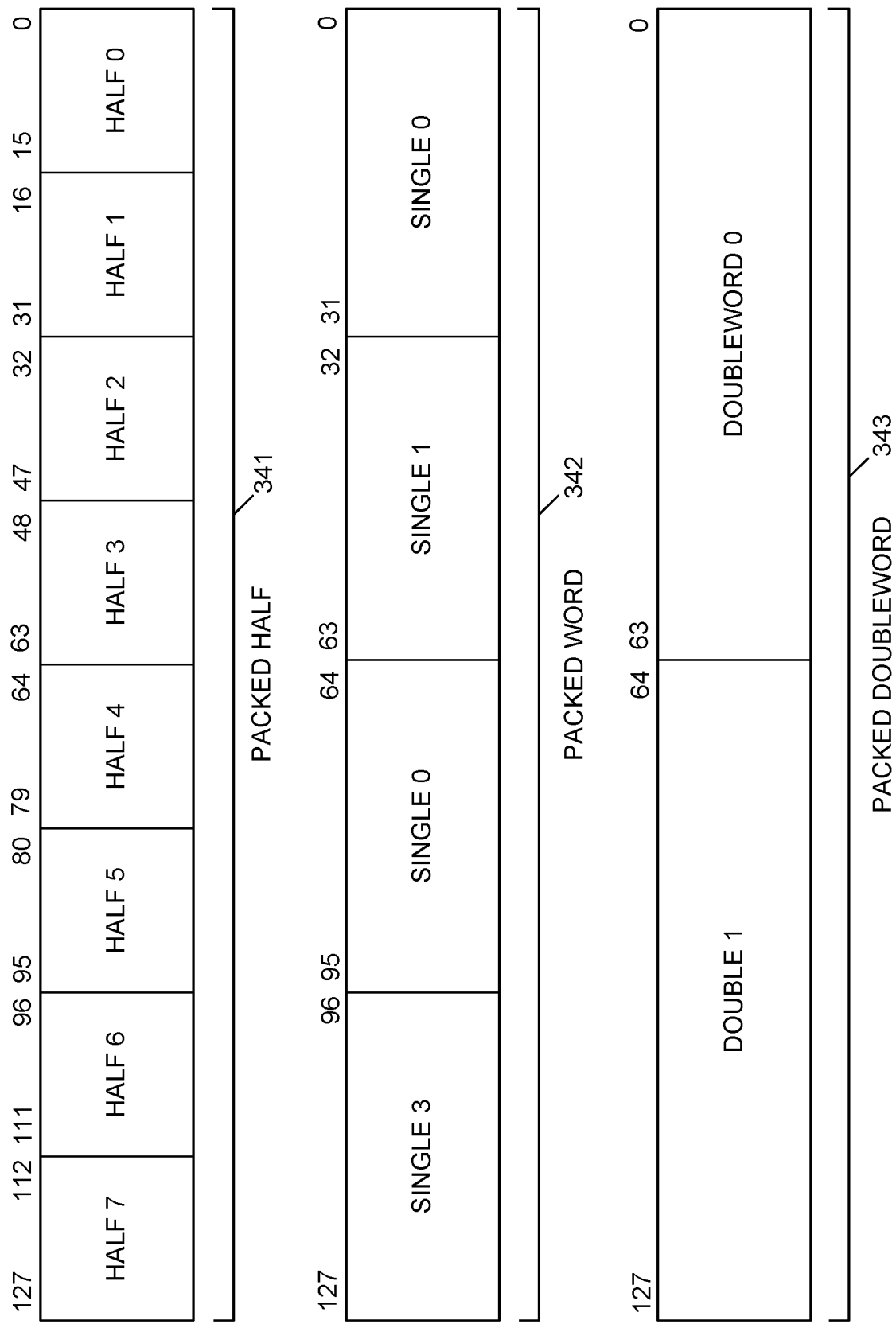
FIG. 3B illustrates possible in-register data storage formats, in accordance with embodiments of the present disclosure.

FIG. 3B illustrates possible in-register data storage formats, in accordance with embodiments of the present disclosure. Each packed data may include more than one independent data element. Three packed data formats are illustrated; packed half 341, packed single 342, and packed double 343. One embodiment of packed half 341, packed single 342, and packed double 343 contain fixed-point data elements. For another embodiment one or more of packed half 341, packed single 342, and packed double 343 may contain floating-point data elements. One embodiment of packed half 341 may be 128 bits long containing eight 16-bit data elements. One embodiment of packed single 342 may be 128 bits long and contains four 32-bit data elements. One embodiment of packed double 343 may be 128 bits long and contains two 64-bit data elements. It will be appreciated that such packed data formats may be further extended to other register lengths, for example, to 96-bits, 160-bits, 192-bits, 224-bits, 256-bits or more.

FIG. 3C illustrates various signed and unsigned packed data type representations in multimedia registers, in accordance with embodiments of the present disclosure. Unsigned packed byte representation 344 illustrates the storage of an unsigned packed byte in a SIMD register. Information for each byte data element may be stored in bit 7 through bit 0 for byte 0, bit 15 through bit 8 for byte 1, bit 23 through bit 16 for byte 2, and finally bit 120 through bit 127 for byte 15. Thus, all available bits may be used in the register. This storage arrangement may increase the storage efficiency of the processor. As well, with sixteen data elements accessed, one operation may now be performed on sixteen data elements in a parallel fashion. Signed packed byte representation 345 illustrates the storage of a signed packed byte. Note that the eighth bit of every byte data element may be the sign indicator. Unsigned packed word representation 346 illustrates how word seven through word zero may be stored in a SIMD register. Signed packed word representation 347 may be similar to the unsigned packed word in-register representation 346. Note that the sixteenth bit of each word data element may be the sign indicator. Unsigned packed doubleword representation 348 shows how doubleword data elements are stored. Signed packed doubleword representation 349 may be similar to unsigned packed doubleword in-register representation 348. Note that the necessary sign bit may be the thirty-second bit of each doubleword data element.

Figure 3D:
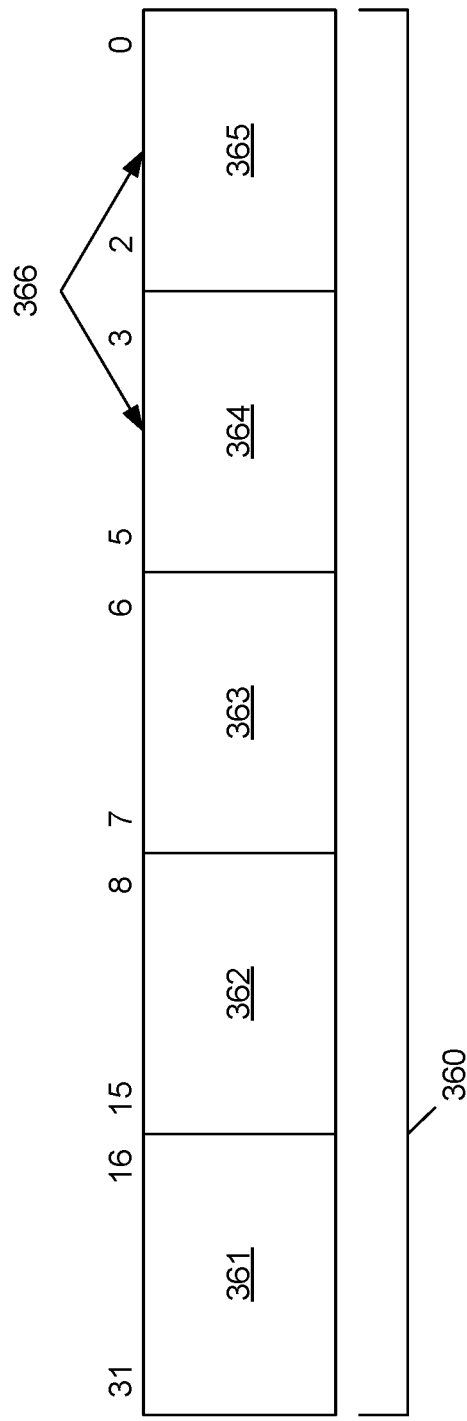
FIG. 3D illustrates an embodiment of an operation encoding format.

FIG. 3D illustrates an embodiment of an operation encoding (opcode). Furthermore, format 360 may include register/memory operand addressing modes corresponding with a type of opcode format described in the "IA-32 Intel Architecture Software Developer's Manual Volume 2: Instruction Set Reference," which is available from Intel Corporation, Santa Clara, Calif. on the world-wide-web (www) at intel.com/design/litcentr. In one embodiment, and instruction may be encoded by one or more of fields 361 and 362. Up to two operand locations per instruction may be identified, including up to two source operand identifiers 364 and 365. In one embodiment, destination operand identifier 366 may be the same as source operand identifier 364, whereas in other embodiments they may be different. In another embodiment, destination operand identifier 366 may be the same as source operand identifier 365, whereas in other embodiments they may be different. In one embodiment, one of the source operands identified by source operand identifiers 364 and 365 may be overwritten by the results of the text string comparison operations, whereas in other embodiments identifier 364 corresponds to a source register element and identifier 365 corresponds to a destination register element. In one embodiment, operand identifiers 364 and 365 may identify 32-bit or 64-bit source and destination operands.

Figure 3E:
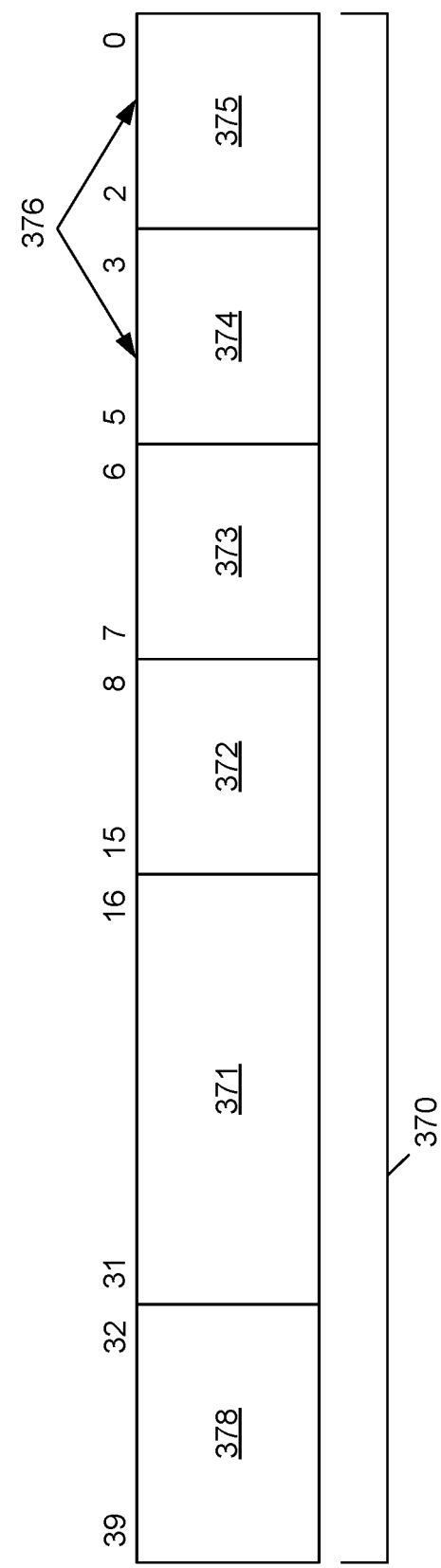
FIG. 3E illustrates another possible operation encoding format having forty or more bits, in accordance with embodiments of the present disclosure.

FIG. 3E illustrates another possible operation encoding (opcode) format 370, having forty or more bits, in accordance with embodiments of the present disclosure. Opcode format 370 corresponds with opcode format 360 and comprises an optional prefix byte 378. An instruction according to one embodiment may be encoded by one or more of fields 378, 371, and 372. Up to two operand locations per instruction may be identified by source operand identifiers 374 and 375 and by prefix byte 378. In one embodiment, prefix byte 378 may be used to identify 32-bit or 64-bit source and destination operands. In one embodiment, destination operand identifier 376 may be the same as source operand identifier 374, whereas in other embodiments they may be different. For another embodiment, destination operand identifier 376 may be the same as source operand identifier 375, whereas in other embodiments they may be different. In one embodiment, an instruction operates on one or more of the operands identified by operand identifiers 374 and 375 and one or more operands identified by operand identifiers 374 and 375 may be overwritten by the results of the instruction, whereas in other embodiments, operands identified by identifiers 374 and 375 may be written to another data element in another register. Opcode formats 360 and 370 allow register to register, memory to register, register by memory, register by register, register by immediate, register to memory addressing specified in part by MOD fields 363 and 373 and by optional scale-index-base and displacement bytes.

Figure 3F:
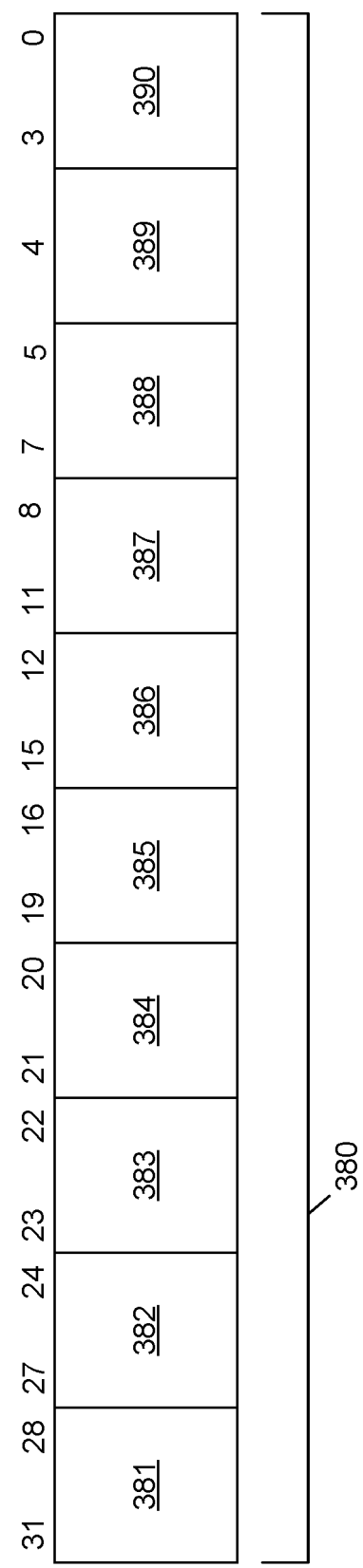
FIG. 3F illustrates yet another possible operation encoding format, in accordance with embodiments of the present disclosure.

FIG. 3F illustrates yet another possible operation encoding (opcode) format, in accordance with embodiments of the present disclosure. 64-bit single instruction multiple data (SIMD) arithmetic operations may be performed through a coprocessor data processing (CDP) instruction. Operation encoding (opcode) format 380 depicts one such CDP instruction having CDP opcode fields 382 an0064 389. The type of CDP instruction, for another embodiment, operations may be encoded by one or more of fields 383, 384, 387, and 388. Up to three operand locations per instruction may be identified, including up to two source operand identifiers 385 and 390 and one destination operand identifier 386. One embodiment of the coprocessor may operate on eight, sixteen, thirty-two, and 64-bit values. In one embodiment, an instruction may be performed on integer data elements. In some embodiments, an instruction may be executed conditionally, using condition field 381. For some embodiments, source data sizes may be encoded by field 383. In some embodiments, Zero (Z), negative (N), carry (C), and overflow (V) detection may be done on SIMD fields. For some instructions, the type of saturation may be encoded by field 384.

Figure 4A:
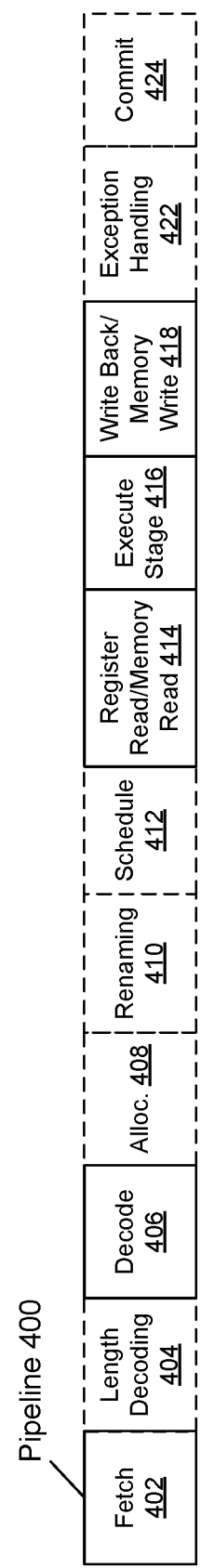
FIG. 4A is a block diagram illustrating an in-order pipeline and a register renaming stage, out-of-order issue/execution pipeline, in accordance with embodiments of the present disclosure.
Figure 4B:
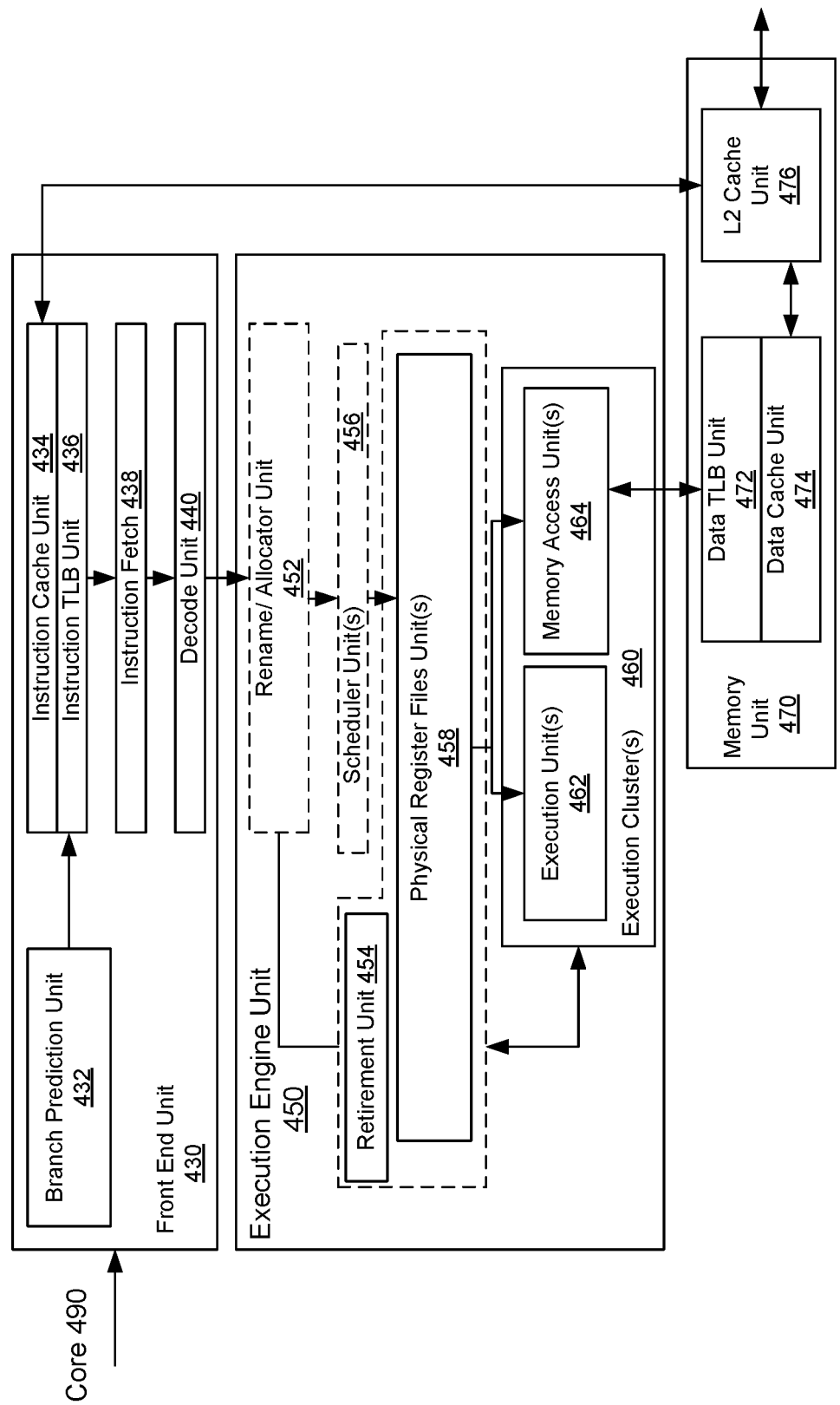
FIG. 4B is a block diagram illustrating an in-order architecture core and a register renaming logic, out-of-order issue/execution logic to be included in a processor, in accordance with embodiments of the present disclosure.

FIG. 4A is a block diagram illustrating an in-order pipeline and a register renaming stage, out-of-order issue/execution pipeline, in accordance with embodiments of the present disclosure. FIG. 4B is a block diagram illustrating an in-order architecture core and a register renaming logic, out-of-order issue/execution logic to be included in a processor, in accordance with embodiments of the present disclosure. The solid lined boxes in FIG. 4A illustrate the in-order pipeline, while the dashed lined boxes illustrates the register renaming, out-of-order issue/execution pipeline. Similarly, the solid lined boxes in FIG. 4B illustrate the in-order architecture logic, while the dashed lined boxes illustrates the register renaming logic and out-of-order issue/execution logic.

In FIG. 4A, a processor pipeline 400 may include a fetch stage 402, a length decode stage 404, a decode stage 406, an allocation stage 408, a renaming stage 410, a scheduling (also known as a dispatch or issue) stage 412, a register read/memory read stage 414, an execute stage 416, a write-back/memory-write stage 418, an exception handling stage 422, and a commit stage 424.

In FIG. 4B, arrows denote a coupling between two or more units and the direction of the arrow indicates a direction of data flow between those units. FIG. 4B shows processor core 490 including a front end unit 430 coupled to an execution engine unit 450, and both may be coupled to a memory unit 470.

Core 490 may be a reduced instruction set computing (RISC) core, a complex instruction set computing (CISC) core, a very long instruction word (VLIW) core, or a hybrid or alternative core type. In one embodiment, core 490 may be a special-purpose core, such as, for example, a network or communication core, compression engine, graphics core, or the like.

Front end unit 430 may include a branch prediction unit 432 coupled to an instruction cache unit 434. Instruction cache unit 434 may be coupled to an instruction translation lookaside buffer (TLB) 436. TLB 436 may be coupled to an instruction fetch unit 438, which is coupled to a decode unit 440. Decode unit 440 may decode instructions, and generate as an output one or more micro-operations, micro-code entry points, microinstructions, other instructions, or other control signals, which may be decoded from, or which otherwise reflect, or may be derived from, the original instructions. The decoder may be implemented using various different mechanisms. Examples of suitable mechanisms include, but are not limited to, look-up tables, hardware implementations, programmable logic arrays (PLAs), microcode read-only memories (ROMs), etc. In one embodiment, instruction cache unit 434 may be further coupled to a level 2 (L2) cache unit 476 in memory unit 470. Decode unit 440 may be coupled to a rename/allocator unit 452 in execution engine unit 450.

Execution engine unit 450 may include rename/allocator unit 452 coupled to a retirement unit 454 and a set of one or more scheduler units 456. Scheduler units 456 represent any number of different schedulers, including reservations stations, central instruction window, etc. Scheduler units 456 may be coupled to physical register file units 458. Each of physical register file units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. Physical register file units 458 may be overlapped by retirement unit 154 to illustrate various ways in which register renaming and out-of-order execution may be implemented (e.g., using one or more reorder buffers and one or more retirement register files, using one or more future files, one or more history buffers, and one or more retirement register files; using register maps and a pool of registers; etc.). Generally, the architectural registers may be visible from the outside of the processor or from a programmer's perspective. The registers might not be limited to any known particular type of circuit. Various different types of registers may be suitable as long as they store and provide data as described herein. Examples of suitable registers include, but might not be limited to, dedicated physical registers, dynamically allocated physical registers using register renaming, combinations of dedicated and dynamically allocated physical registers, etc. Retirement unit 454 and physical register file units 458 may be coupled to execution clusters 460. Execution clusters 460 may include a set of one or more execution units 162 and a set of one or more memory access units 464. Execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Scheduler units 456, physical register file units 458, and execution clusters 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file unit, and/or execution cluster—and in the case of a separate memory access pipeline, certain embodiments may be implemented in which only the execution cluster of this pipeline has memory access units 464). It should also be understood that where separate pipelines are used, one or more of these pipelines may be out-of-order issue/execution and the rest in-order.

The set of memory access units 464 may be coupled to memory unit 470, which may include a data TLB unit 472 coupled to a data cache unit 474 coupled to a level 2 (L2) cache unit 476. In one exemplary embodiment, memory access units 464 may include a load unit, a store address unit, and a store data unit, each of which may be coupled to data TLB unit 472 in memory unit 470. L2 cache unit 476 may be coupled to one or more other levels of cache and eventually to a main memory.

By way of example, the exemplary register renaming, out-of-order issue/execution core architecture may implement pipeline 400 as follows: 1) instruction fetch 438 may perform fetch and length decoding stages 402 and 404; 2) decode unit 440 may perform decode stage 406; 3) rename/allocator unit 452 may perform allocation stage 408 and renaming stage 410; 4) scheduler units 456 may perform schedule stage 412; 5) physical register file units 458 and memory unit 470 may perform register read/memory read stage 414; execution cluster 460 may perform execute stage 416; 6) memory unit 470 and physical register file units 458 may perform write-back/memory-write stage 418; 7) various units may be involved in the performance of exception handling stage 422; and 8) retirement unit 454 and physical register file units 458 may perform commit stage 424.

Core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads) in a variety of manners. Multithreading support may be performed by, for example, including time sliced multithreading, simultaneous multithreading (where a single physical core provides a logical core for each of the threads that physical core is simultaneously multithreading), or a combination thereof. Such a combination may include, for example, time sliced fetching and decoding and simultaneous multithreading thereafter such as in the Intel® Hyperthreading technology.

While register renaming may be described in the context of out-of-order execution, it should be understood that register renaming may be used in an in-order architecture. While the illustrated embodiment of the processor may also include a separate instruction and data cache units 434/474 and a shared L2 cache unit 476, other embodiments may have a single internal cache for both instructions and data, such as, for example, a Level 1 (L1) internal cache, or multiple levels of internal cache. In some embodiments, the system may include a combination of an internal cache and an external cache that may be external to the core and/or the processor. In other embodiments, all of the cache may be external to the core and/or the processor.

Figure 5A:
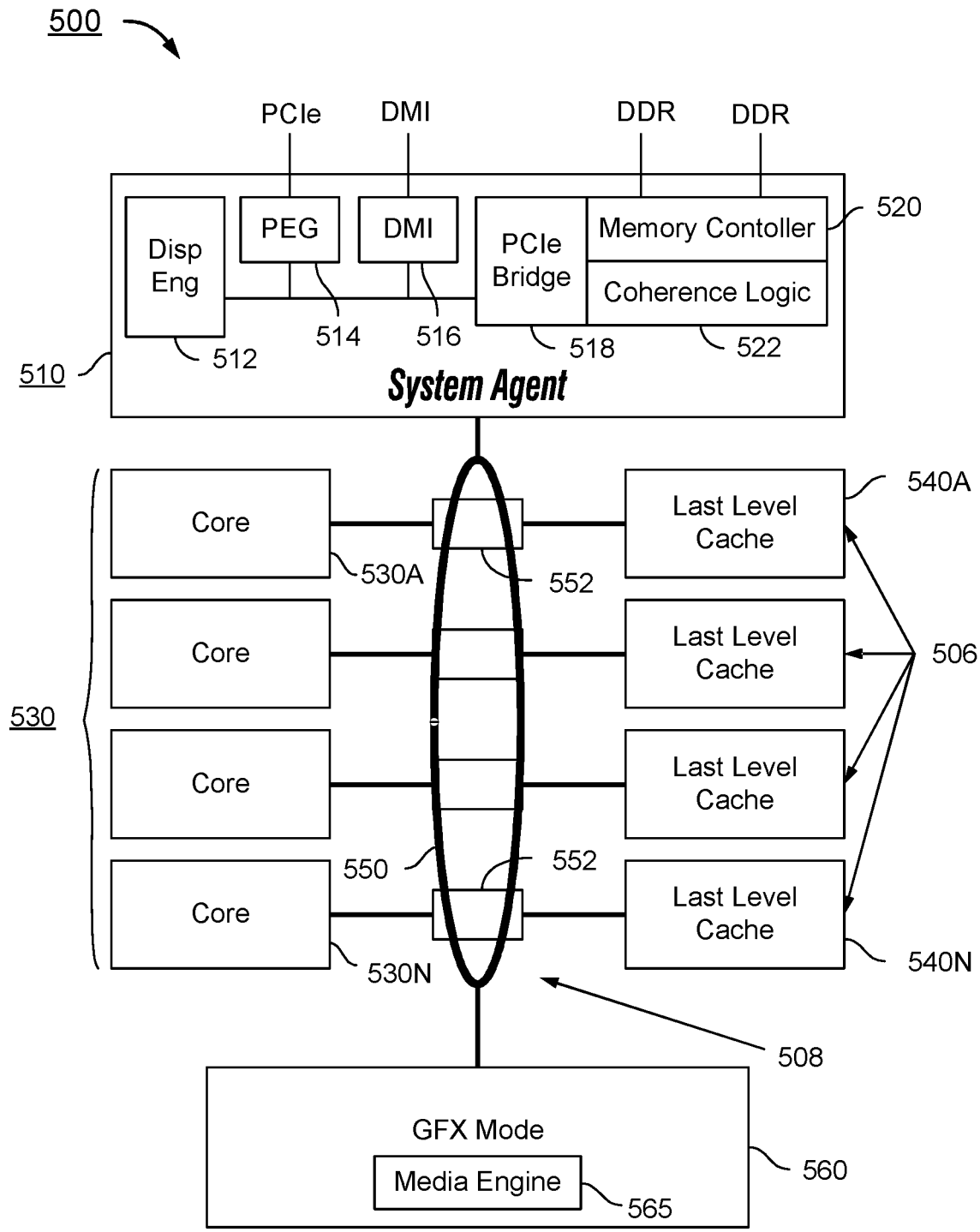
FIG. 5A is a block diagram of a processor, in accordance with embodiments of the present disclosure.

FIG. 5A is a block diagram of a processor 500, in accordance with embodiments of the present disclosure. In one embodiment, processor 500 may include a multicore processor. Processor 500 may include a system agent 510 communicatively coupled to one or more cores 502. Furthermore, cores 502 and system agent 510 may be communicatively coupled to one or more caches 506. Cores 502, system agent 510, and caches 506 may be communicatively coupled via one or more memory control units 552. Furthermore, cores 502, system agent 510, and caches 506 may be communicatively coupled to a graphics module 560 via memory control units 552.

Processor 500 may include any suitable mechanism for interconnecting cores 502, system agent 510, and caches 506, and graphics module 560. In one embodiment, processor 500 may include a ring-based interconnect unit 508 to interconnect cores 502, system agent 510, and caches 506, and graphics module 560. In other embodiments, processor 500 may include any number of well-known techniques for interconnecting such units. Ring-based interconnect unit 508 may utilize memory control units 552 to facilitate interconnections.

Processor 500 may include a memory hierarchy comprising one or more levels of caches within the cores, one or more shared cache units such as caches 506, or external memory (not shown) coupled to the set of integrated memory controller units 552. Caches 506 may include any suitable cache. In one embodiment, caches 506 may include one or more mid-level caches, such as level 2 (L2), level 3 (L3), level 4 (L4), or other levels of cache, a last level cache (LLC), and/or combinations thereof.

In various embodiments, one or more of cores 502 may perform multi-threading. System agent 510 may include components for coordinating and operating cores 502. System agent unit 510 may include for example a power control unit (PCU). The PCU may be or include logic and components needed for regulating the power state of cores 502. System agent 510 may include a display engine 512 for driving one or more externally connected displays or graphics module 560. System agent 510 may include an interface 1214 for communications busses for graphics. In one embodiment, interface 1214 may be implemented by PCI Express (PCIe). In a further embodiment, interface 1214 may be implemented by PCI Express Graphics (PEG). System agent 510 may include a direct media interface (DMI) 516. DMI 516 may provide links between different bridges on a motherboard or other portion of a computer system. System agent 510 may include a PCIe bridge 1218 for providing PCIe links to other elements of a computing system. PCIe bridge 1218 may be implemented using a memory controller 1220 and coherence logic 1222.

Cores 502 may be implemented in any suitable manner. Cores 502 may be homogenous or heterogeneous in terms of architecture and/or instruction set. In one embodiment, some of cores 502 may be in-order while others may be out-of-order. In another embodiment, two or more of cores 502 may execute the same instruction set, while others may execute only a subset of that instruction set or a different instruction set.

Processor 500 may include a general-purpose processor, such as a Core™ i3, i5, i7, 2 Duo and Quad, Xeon™, Itanium™, XScale™ or StrongARM™ processor, which may be available from Intel Corporation, of Santa Clara, Calif. Processor 500 may be provided from another company, such as ARM Holdings, Ltd, MIPS, etc. Processor 500 may be a special-purpose processor, such as, for example, a network or communication processor, compression engine, graphics processor, co-processor, embedded processor, or the like. Processor 500 may be implemented on one or more chips. Processor 500 may be a part of and/or may be implemented on one or more substrates using any of a number of process technologies, such as, for example, BiCMOS, CMOS, or NMOS.

In one embodiment, a given one of caches 506 may be shared by multiple ones of cores 502. In another embodiment, a given one of caches 506 may be dedicated to one of cores 502. The assignment of caches 506 to cores 502 may be handled by a cache controller or other suitable mechanism. A given one of caches 506 may be shared by two or more cores 502 by implementing time-slices of a given cache 506.

Graphics module 560 may implement an integrated graphics processing subsystem. In one embodiment, graphics module 560 may include a graphics processor. Furthermore, graphics module 560 may include a media engine 565. Media engine 565 may provide media encoding and video decoding.

Figure 5B:
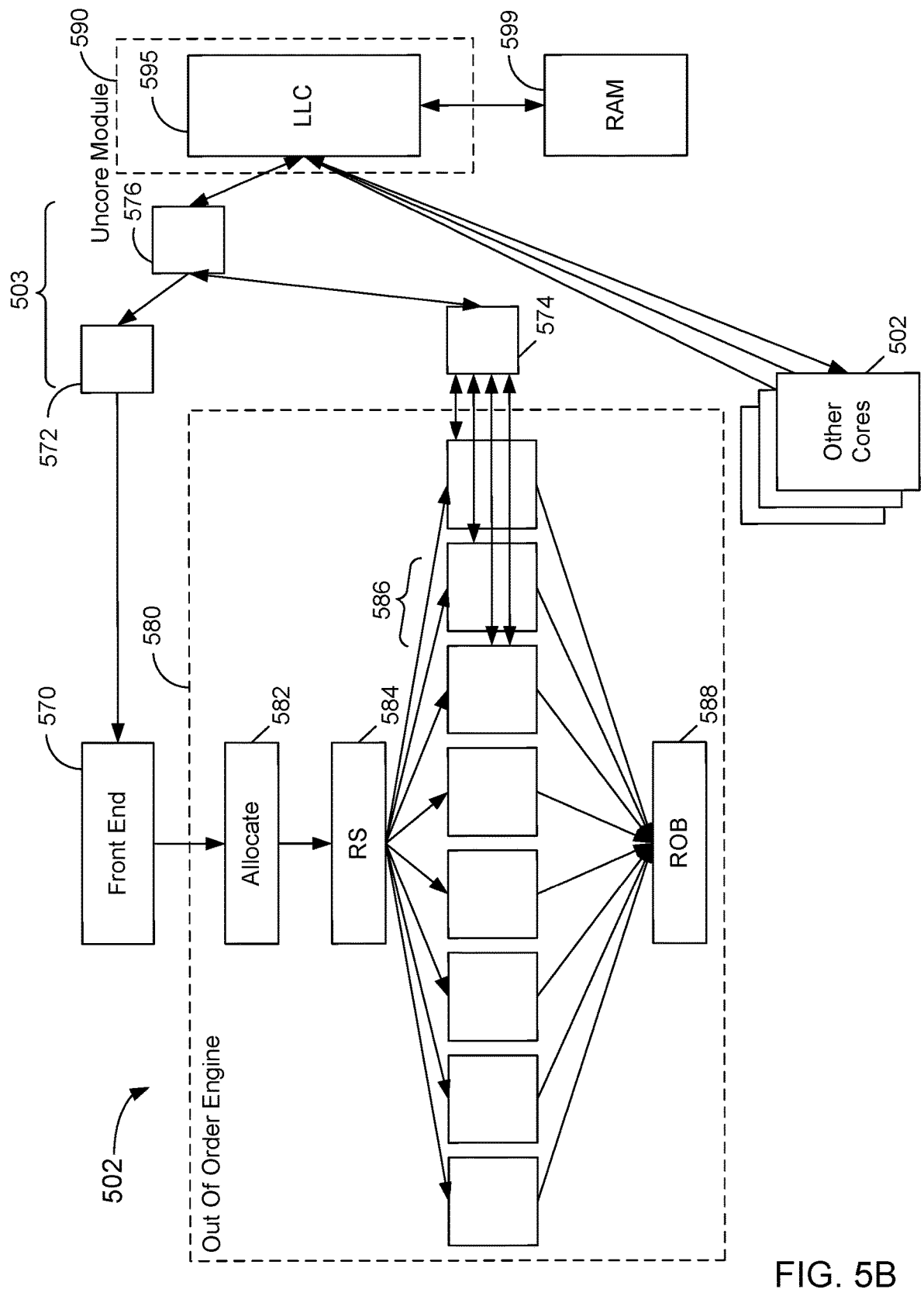
FIG. 5B is a block diagram of an example implementation of a core, in accordance with embodiments of the present disclosure.

FIG. 5B is a block diagram of an example implementation of a core 502, in accordance with embodiments of the present disclosure. Core 502 may include a front end 570 communicatively coupled to an out-of-order engine 580. Core 502 may be communicatively coupled to other portions of processor 500 through cache hierarchy 503.

Front end 570 may be implemented in any suitable manner, such as fully or in part by front end 201 as described above. In one embodiment, front end 570 may communicate with other portions of processor 500 through cache hierarchy 503. In a further embodiment, front end 570 may fetch instructions from portions of processor 500 and prepare the instructions to be used later in the processor pipeline as they are passed to out-of-order execution engine 580.

Out-of-order execution engine 580 may be implemented in any suitable manner, such as fully or in part by out-of-order execution engine 203 as described above. Out-of-order execution engine 580 may prepare instructions received from front end 570 for execution. Out-of-order execution engine 580 may include an allocate module 582. In one embodiment, allocate module 582 may allocate resources of processor 500 or other resources, such as registers or buffers, to execute a given instruction. Allocate module 582 may make allocations in schedulers, such as a memory scheduler, fast scheduler, or floating point scheduler. Such schedulers may be represented in FIG. 5B by resource schedulers 584. Allocate module 582 may be implemented fully or in part by the allocation logic described in conjunction with FIG. 2. Resource schedulers 584 may determine when an instruction is ready to execute based on the readiness of a given resource's sources and the availability of execution resources needed to execute an instruction. Resource schedulers 584 may be implemented by, for example, schedulers 202, 204, 206 as discussed above. Resource schedulers 584 may schedule the execution of instructions upon one or more resources. In one embodiment, such resources may be internal to core 502, and may be illustrated, for example, as resources 586. In another embodiment, such resources may be external to core 502 and may be accessible by, for example, cache hierarchy 503. Resources may include, for example, memory, caches, register files, or registers. Resources internal to core 502 may be represented by resources 586 in FIG. 5B. As necessary, values written to or read from resources 586 may be coordinated with other portions of processor 500 through, for example, cache hierarchy 503. As instructions are assigned resources, they may be placed into a reorder buffer 588. Reorder buffer 588 may track instructions as they are executed and may selectively reorder their execution based upon any suitable criteria of processor 500. In one embodiment, reorder buffer 588 may identify instructions or a series of instructions that may be executed independently. Such instructions or a series of instructions may be executed in parallel from other such instructions. Parallel execution in core 502 may be performed by any suitable number of separate execution blocks or virtual processors. In one embodiment, shared resources—such as memory, registers, and caches—may be accessible to multiple virtual processors within a given core 502. In other embodiments, shared resources may be accessible to multiple processing entities within processor 500.

Cache hierarchy 503 may be implemented in any suitable manner. For example, cache hierarchy 503 may include one or more lower or mid-level caches, such as caches 572, 574. In one embodiment, cache hierarchy 503 may include an LLC 595 communicatively coupled to caches 572, 574. In another embodiment, LLC 595 may be implemented in a module 590 accessible to all processing entities of processor 500. In a further embodiment, module 590 may be implemented in an uncore module of processors from Intel, Inc. Module 590 may include portions or subsystems of processor 500 necessary for the execution of core 502 but might not be implemented within core 502. Besides LLC 595, Module 590 may include, for example, hardware interfaces, memory coherency coordinators, interprocessor interconnects, instruction pipelines, or memory controllers. Access to RAM 599 available to processor 500 may be made through module 590 and, more specifically, LLC 595. Furthermore, other instances of core 502 may similarly access module 590. Coordination of the instances of core 502 may be facilitated in part through module 590.

Figure 6:
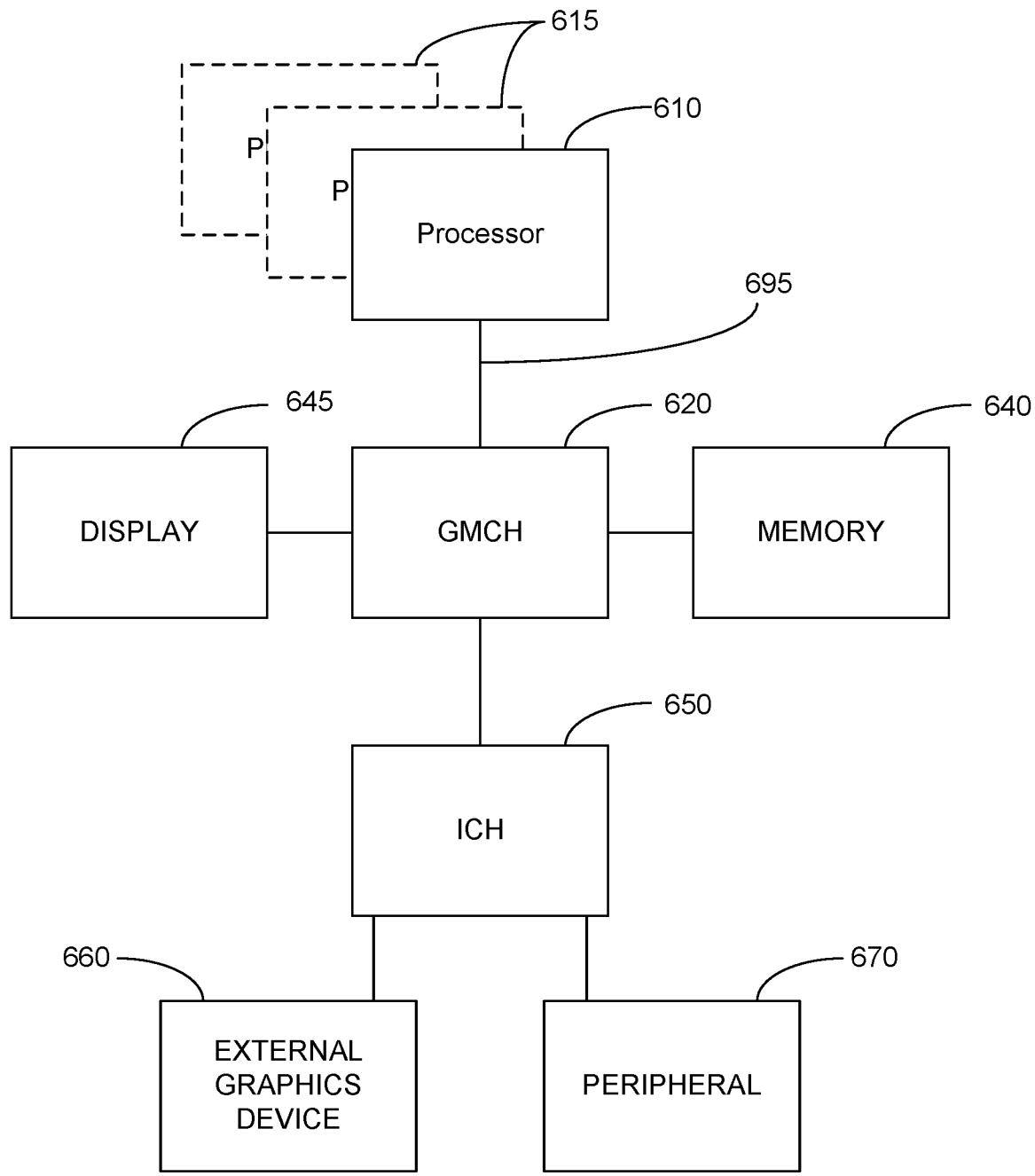
FIG. 6 is a block diagram of a system, in accordance with embodiments of the present disclosure.
Figure 7:
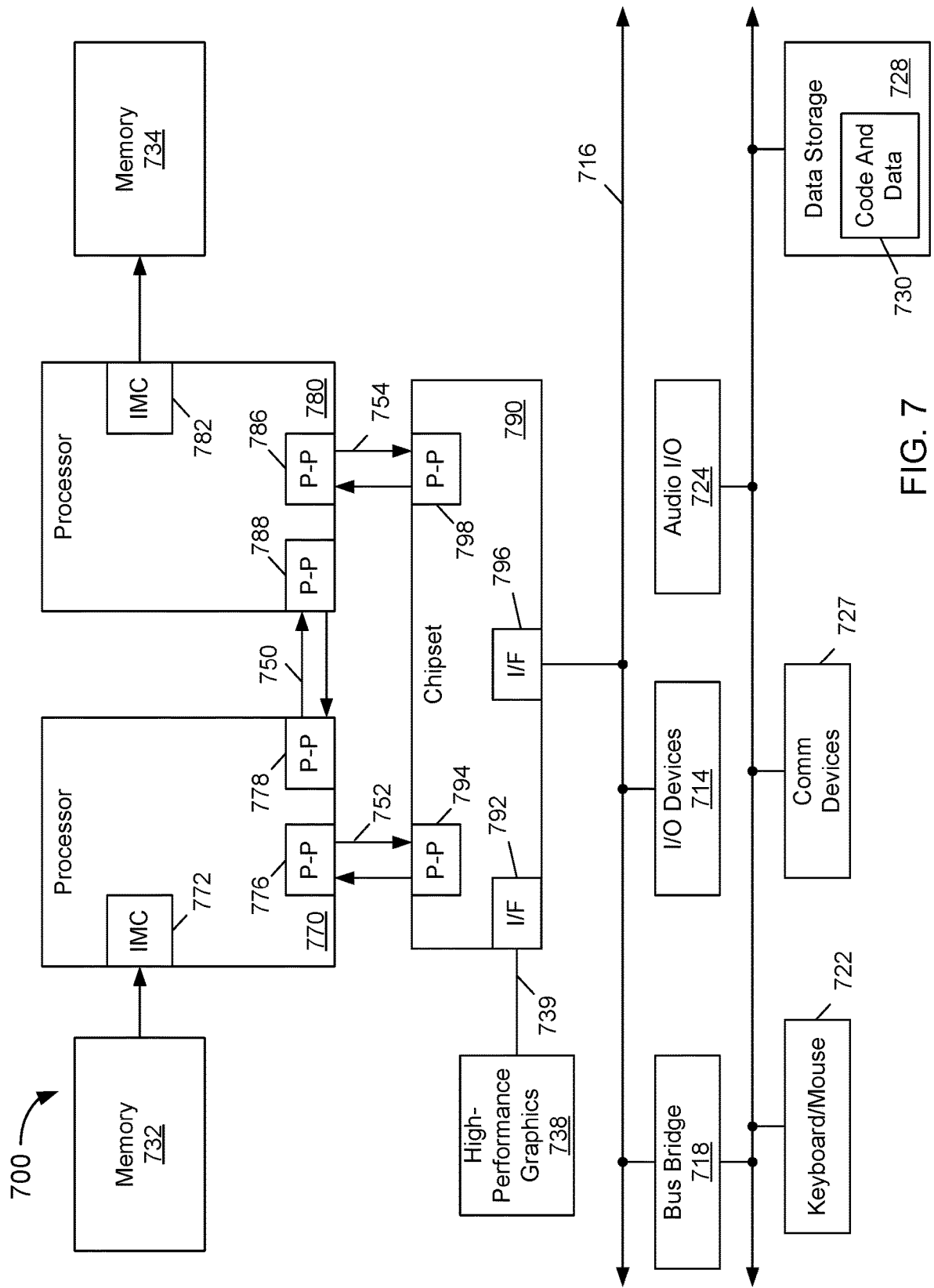
FIG. 7 is a block diagram of a second system, in accordance with embodiments of the present disclosure.
Figure 8:
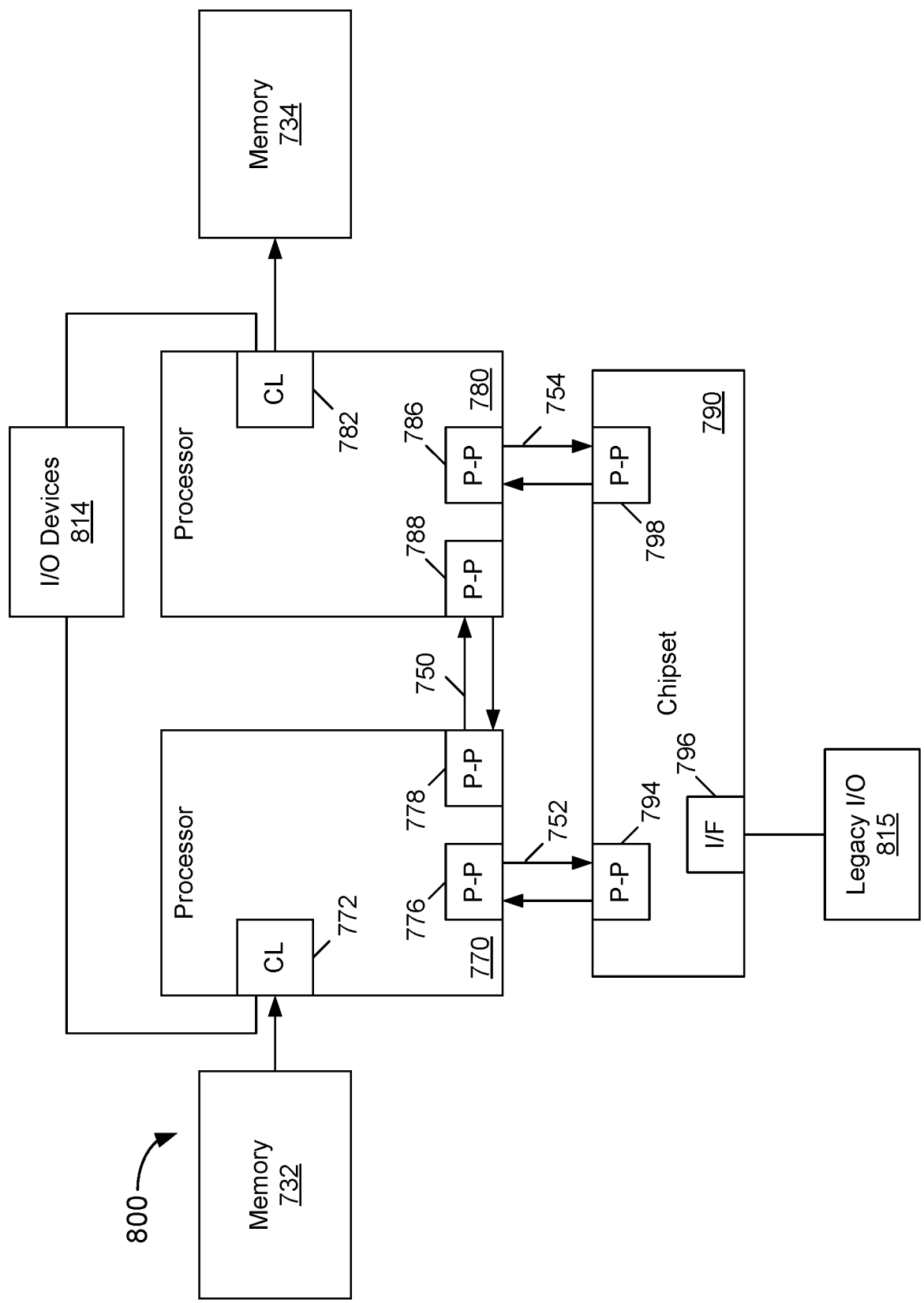
FIG. 8 is a block diagram of a third system in accordance with embodiments of the present disclosure.
Figure 9:
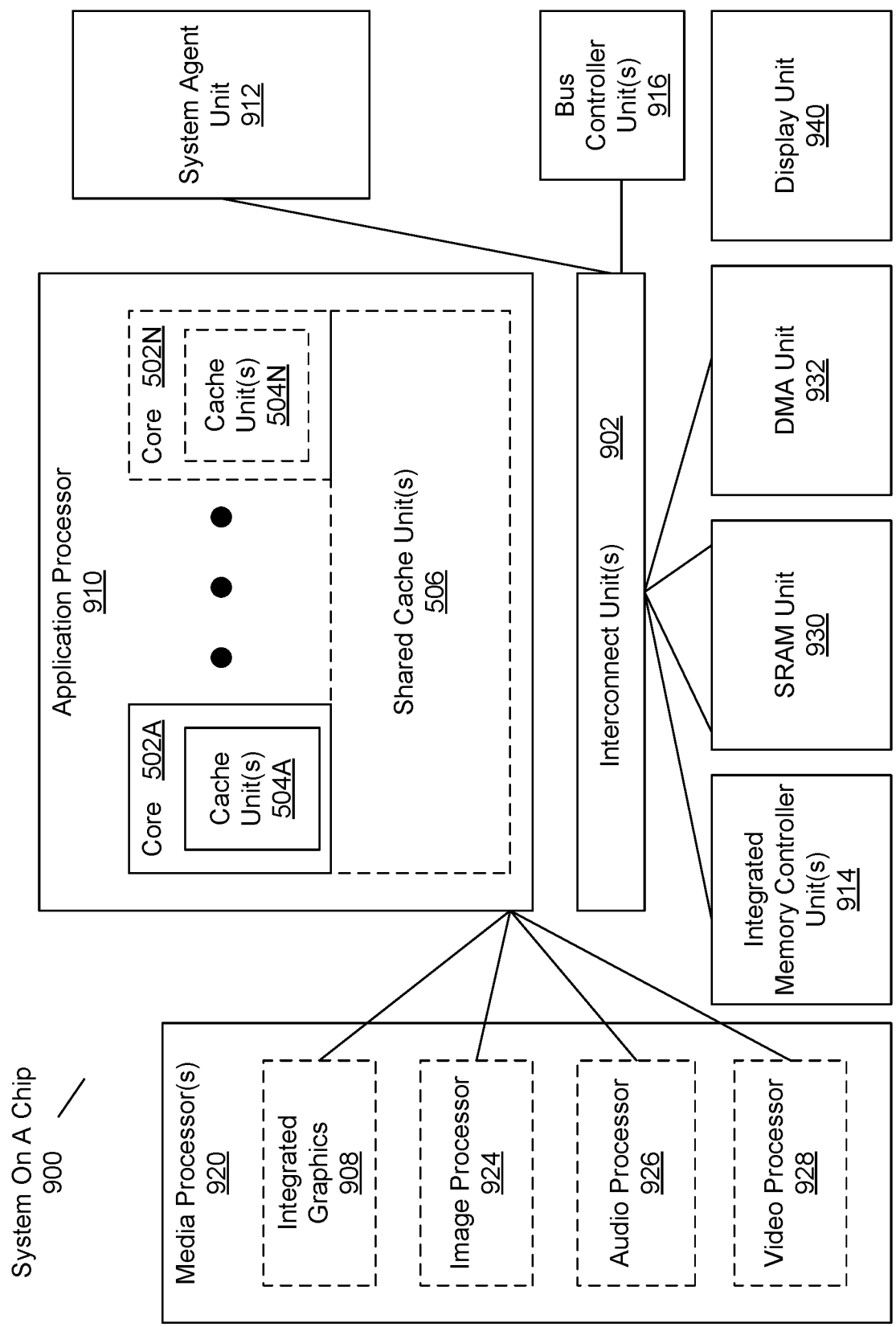
FIG. 9 is a block diagram of a system-on-a-chip, in accordance with embodiments of the present disclosure.

FIGS. 6-8 may illustrate exemplary systems suitable for including processor 500, while FIG. 9 may illustrate an exemplary system on a chip (SoC) that may include one or more of cores 502. Other system designs and implementations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, may also be suitable. In general, a huge variety of systems or electronic devices that incorporate a processor and/or other execution logic as disclosed herein may be generally suitable.

FIG. 6 illustrates a block diagram of a system 600, in accordance with embodiments of the present disclosure. System 600 may include one or more processors 610, 615, which may be coupled to graphics memory controller hub (GMCH) 620. The optional nature of additional processors 615 is denoted in FIG. 6 with broken lines.

Each processor 610,615 may be some version of processor 500. However, it should be noted that integrated graphics logic and integrated memory control units might not exist in processors 610,615. FIG. 6 illustrates that GMCH 620 may be coupled to a memory 640 that may be, for example, a dynamic random access memory (DRAM). The DRAM may, for at least one embodiment, be associated with a non-volatile cache.

GMCH 620 may be a chipset, or a portion of a chipset. GMCH 620 may communicate with processors 610, 615 and control interaction between processors 610, 615 and memory 640. GMCH 620 may also act as an accelerated bus interface between the processors 610, 615 and other elements of system 600. In one embodiment, GMCH 620 communicates with processors 610, 615 via a multi-drop bus, such as a frontside bus (FSB) 695.

Furthermore, GMCH 620 may be coupled to a display 645 (such as a flat panel display). In one embodiment, GMCH 620 may include an integrated graphics accelerator. GMCH 620 may be further coupled to an input/output (I/O) controller hub (ICH) 650, which may be used to couple various peripheral devices to system 600. External graphics device 660 may include be a discrete graphics device coupled to ICH 650 along with another peripheral device 670.

In other embodiments, additional or different processors may also be present in system 600. For example, additional processors 610, 615 may include additional processors that may be the same as processor 610, additional processors that may be heterogeneous or asymmetric to processor 610, accelerators (such as, e.g., graphics accelerators or digital signal processing (DSP) units), field programmable gate arrays, or any other processor. There may be a variety of differences between the physical resources 610, 615 in terms of a spectrum of metrics of merit including architectural, micro-architectural, thermal, power consumption characteristics, and the like. These differences may effectively manifest themselves as asymmetry and heterogeneity amongst processors 610, 615. For at least one embodiment, various processors 610, 615 may reside in the same die package.

FIG. 7 illustrates a block diagram of a second system 700, in accordance with embodiments of the present disclosure. As shown in FIG. 7, multiprocessor system 700 may include a point-to-point interconnect system, and may include a first processor 770 and a second processor 780 coupled via a point-to-point interconnect 750. Each of processors 770 and 780 may be some version of processor 500 as one or more of processors 610,615.

While FIG. 7 may illustrate two processors 770, 780, it is to be understood that the scope of the present disclosure is not so limited. In other embodiments, one or more additional processors may be present in a given processor.

Processors 770 and 780 are shown including integrated memory controller units 772 and 782, respectively. Processor 770 may also include as part of its bus controller units point-to-point (P-P) interfaces 776 and 778; similarly, second processor 780 may include P-P interfaces 786 and 788. Processors 770, 780 may exchange information via a point-to-point (P-P) interface 750 using P-P interface circuits 778, 788. As shown in FIG. 7, IMCs 772 and 782 may couple the processors to respective memories, namely a memory 732 and a memory 734, which in one embodiment may be portions of main memory locally attached to the respective processors.

Processors 770, 780 may each exchange information with a chipset 790 via individual P-P interfaces 752, 754 using point to point interface circuits 776, 794, 786, 798. In one embodiment, chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures may be possible. For example, instead of the point-to-point architecture of FIG. 7, a system may implement a multi-drop bus or other such architecture.

FIG. 8 illustrates a block diagram of a third system 700 in accordance with embodiments of the present disclosure. Like elements in FIGS. 7 and 8 bear like reference numerals, and certain aspects of FIG. 7 have been omitted from FIG. 8 in order to avoid obscuring other aspects of FIG. 8.

FIG. 8 illustrates that processors 770, 780 may include integrated memory and I/O control logic ("CL") 772 and 782, respectively. For at least one embodiment, CL 772, 782 may include integrated memory controller units such as that described above in connection with FIGS. 5 and 7. In addition. CL 772, 782 may also include I/O control logic. FIG. 8 illustrates that not only memories 732, 734 may be coupled to CL 872, 882, but also that I/O devices 814 may also be coupled to control logic 772, 782. Legacy I/O devices 815 may be coupled to chipset 790.

FIG. 9 illustrates a block diagram of a SoC 900, in accordance with embodiments of the present disclosure. Similar elements in FIG. 5 bear like reference numerals. Also, dashed lined boxes may represent optional features on more advanced SoCs. An interconnect units 902 may be coupled to: an application processor 910 which may include a set of one or more cores 502A-N and shared cache units 506; a system agent unit 912; a bus controller units 916; an integrated memory controller units 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

Figure 10:
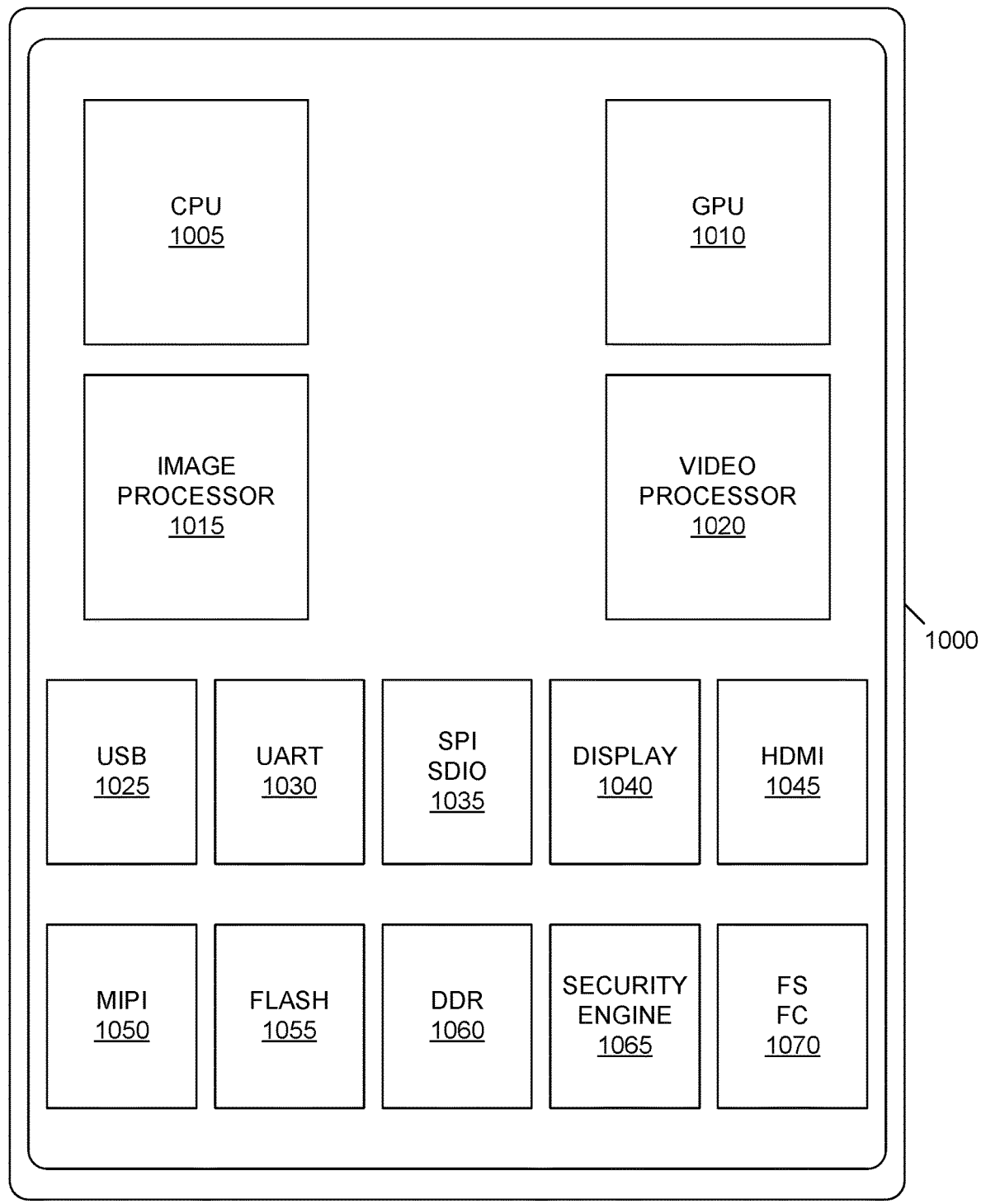
FIG. 10 illustrates a processor containing a central processing unit and a graphics processing unit which may perform at least one instruction, in accordance with embodiments of the present disclosure.

FIG. 10 illustrates a processor containing a central processing unit (CPU) and a graphics processing unit (GPU), which may perform at least one instruction, in accordance with embodiments of the present disclosure. In one embodiment, an instruction to perform operations according to at least one embodiment could be performed by the CPU. In another embodiment, the instruction could be performed by the GPU. In still another embodiment, the instruction may be performed through a combination of operations performed by the GPU and the CPU. For example, in one embodiment, an instruction in accordance with one embodiment may be received and decoded for execution on the GPU. However, one or more operations within the decoded instruction may be performed by a CPU and the result returned to the GPU for final retirement of the instruction. Conversely, in some embodiments, the CPU may act as the primary processor and the GPU as the co-processor.

In some embodiments, instructions that benefit from highly parallel, throughput processors may be performed by the GPU, while instructions that benefit from the performance of processors that benefit from deeply pipelined architectures may be performed by the CPU. For example, graphics, scientific applications, financial applications and other parallel workloads may benefit from the performance of the GPU and be executed accordingly, whereas more sequential applications, such as operating system kernel or application code may be better suited for the CPU.

In FIG. 10, processor 1000 includes a CPU 1005, GPU 1010, image processor 1015, video processor 1020, USB controller 1025, UART controller 1030, SPI/SDIO controller 1035, display device 1040, memory interface controller 1045, MIPI controller 1050, flash memory controller 1055, dual data rate (DDR) controller 1060, security engine 1065, and $I^2S/I^2C$ controller 1070. Other logic and circuits may be included in the processor of FIG. 10, including more CPUs or GPUs and other peripheral interface controllers.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine-readable medium ("tape") and supplied to various customers or manufacturing facilities to load into the fabrication machines that actually make the logic or processor. For example, IP cores, such as the Cortex™ family of processors developed by ARM Holdings, Ltd. and Loongson IP cores developed the Institute of Computing Technology (ICT) of the Chinese Academy of Sciences may be licensed or sold to various customers or licensees, such as Texas Instruments, Qualcomm, Apple, or Samsung and implemented in processors produced by these customers or licensees.

Figure 11:
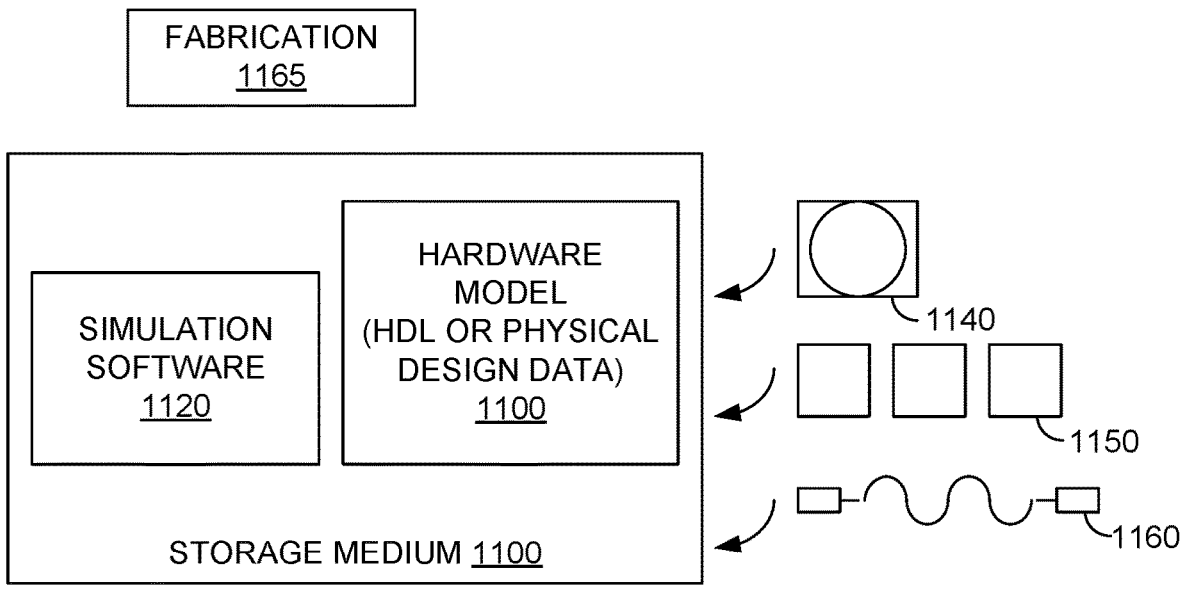
FIG. 11 is a block diagram illustrating the development of IP cores, in accordance with embodiments of the present disclosure.

FIG. 11 illustrates a block diagram illustrating the development of IP cores, in accordance with embodiments of the present disclosure. Storage 1130 may include simulation software 1120 and/or hardware or software model 1110. In one embodiment, the data representing the IP core design may be provided to storage 1130 via memory 1140 (e.g., hard disk), wired connection (e.g., internet) 1150 or wireless connection 1160. The IP core information generated by the simulation tool and model may then be transmitted to a fabrication facility where it may be fabricated by a $3^{rd}$ party to perform at least one instruction in accordance with at least one embodiment.

In some embodiments, one or more instructions may correspond to a first type or architecture (e.g., x86) and be translated or emulated on a processor of a different type or architecture (e.g., ARM). An instruction, according to one embodiment, may therefore be performed on any processor or processor type, including ARM, x86, MIPS, a GPU, or other processor type or architecture.

Figure 12:
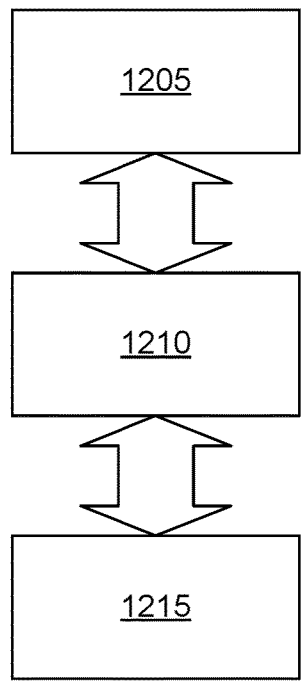
FIG. 12 illustrates how an instruction of a first type may be emulated by a processor of a different type, in accordance with embodiments of the present disclosure.

FIG. 12 illustrates how an instruction of a first type may be emulated by a processor of a different type, in accordance with embodiments of the present disclosure. In FIG. 12, program 1205 contains some instructions that may perform the same or substantially the same function as an instruction according to one embodiment. However the instructions of program 1205 may be of a type and/or format that is different from or incompatible with processor 1215, meaning the instructions of the type in program 1205 may not be able to execute natively by the processor 1215. However, with the help of emulation logic, 1210, the instructions of program 1205 may be translated into instructions that may be natively be executed by the processor 1215. In one embodiment, the emulation logic may be embodied in hardware. In another embodiment, the emulation logic may be embodied in a tangible, machine-readable medium containing software to translate instructions of the type in program 1205 into the type natively executable by processor 1215. In other embodiments, emulation logic may be a combination of fixed-function or programmable hardware and a program stored on a tangible, machine-readable medium. In one embodiment, the processor contains the emulation logic, whereas in other embodiments, the emulation logic exists outside of the processor and may be provided by a third party. In one embodiment, the processor may load the emulation logic embodied in a tangible, machine-readable medium containing software by executing microcode or firmware contained in or associated with the processor.

Figure 13:
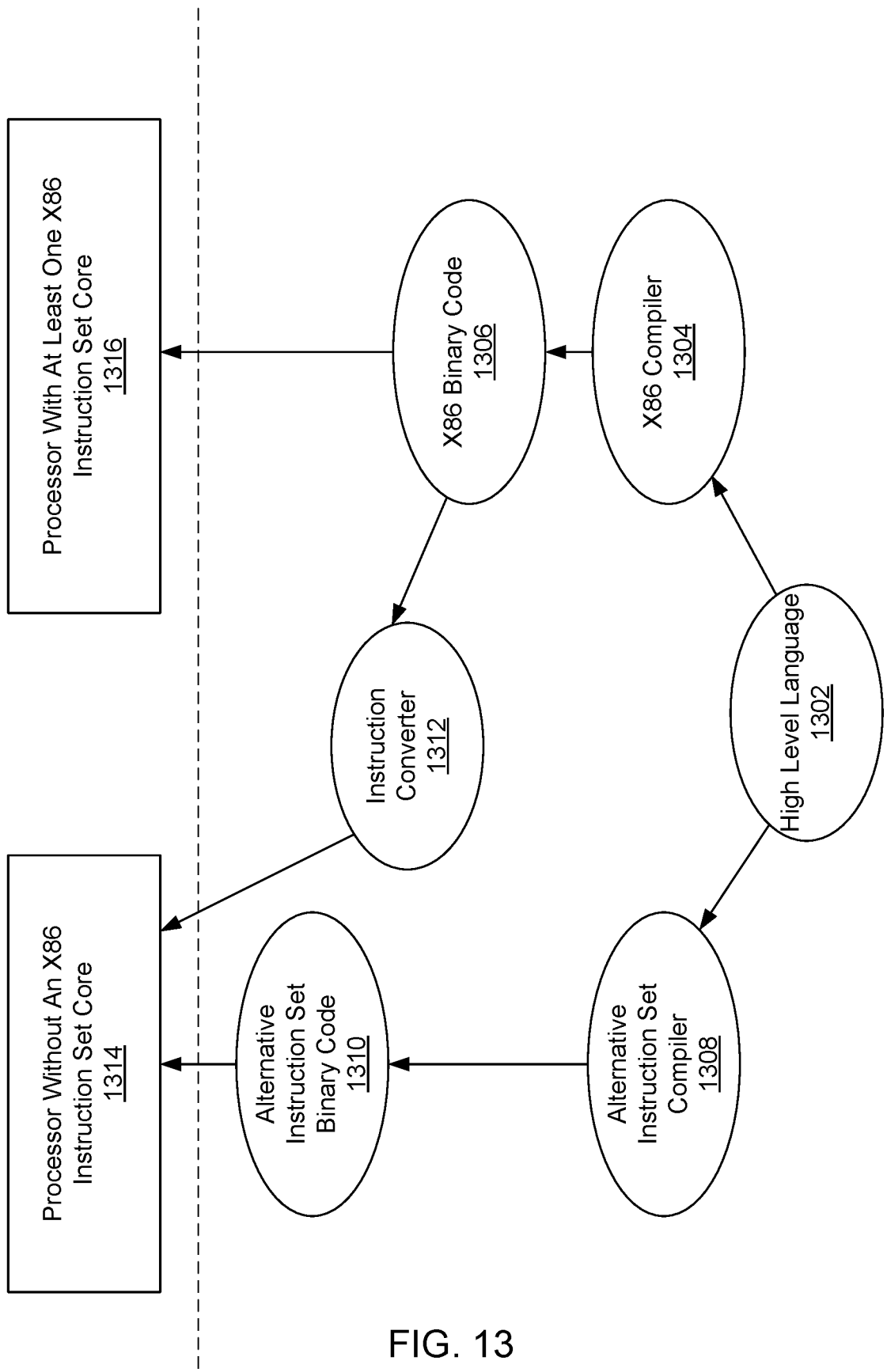
FIG. 13 illustrates a block diagram contrasting the use of a software instruction converter to convert binary instructions in a source instruction set to binary instructions in a target instruction set, in accordance with embodiments of the present disclosure.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, FIG. 13 shows the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.).

The instruction converter 1312 is used to convert the x86 binary code 1306 into alternative instruction set binary code 1311 that may be natively executed by the processor without an x86 instruction set core 1314. This converted code may or may not be the same as the alternative instruction set binary code 1310 resulting from an alternative instruction set compiler 1308; however, the converted code will accomplish the same general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

Figure 14:
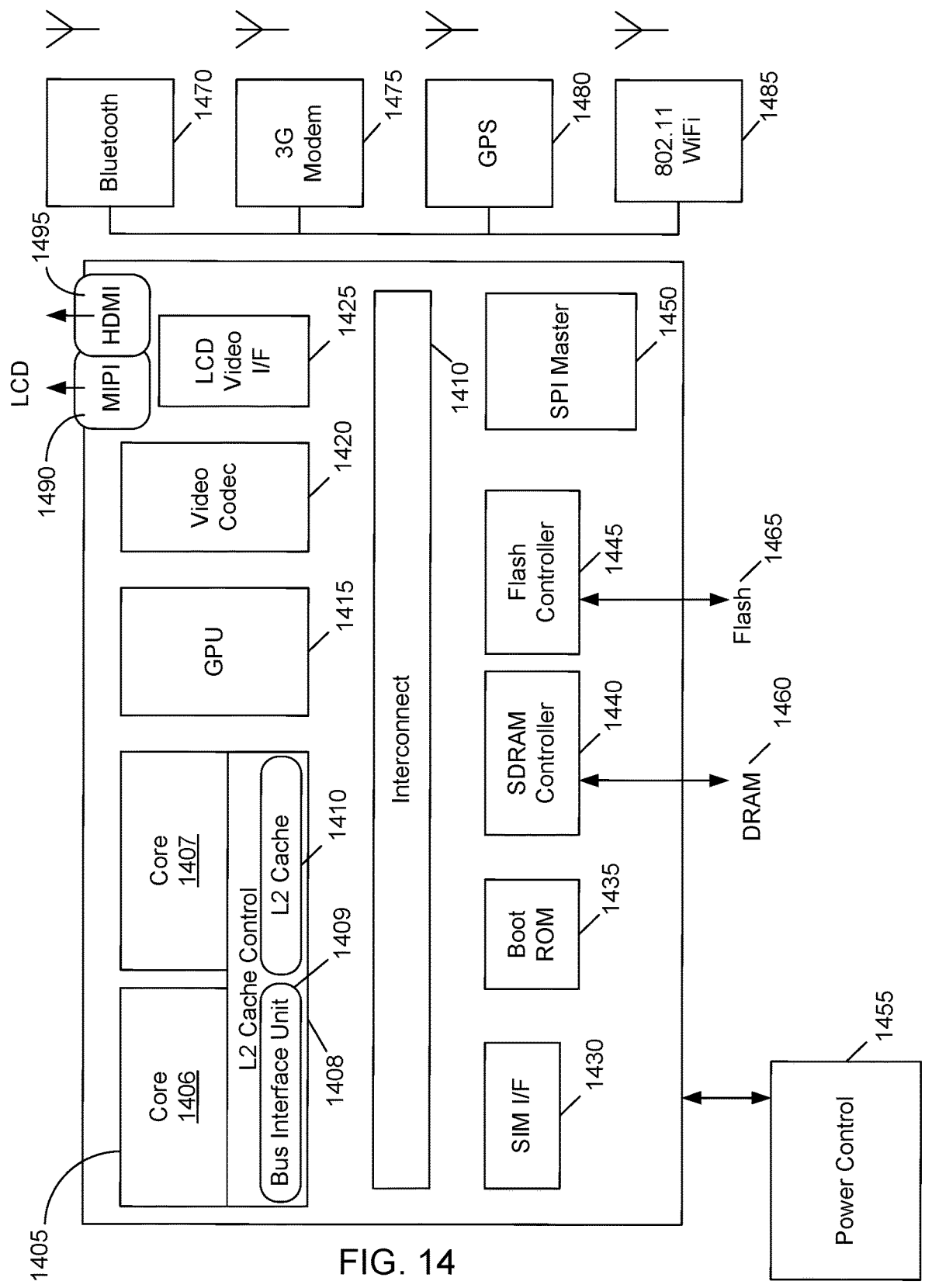
FIG. 14 is a block diagram of an instruction set architecture of a processor, in accordance with embodiments of the present disclosure.

FIG. 14 is a block diagram of an instruction set architecture 1400 of a processor, in accordance with embodiments of the present disclosure. Instruction set architecture 1400 may include any suitable number or kind of components.

For example, instruction set architecture 1400 may include processing entities such as one or more cores 1406, 1407 and a graphics processing unit 1415. Cores 1406, 1407 may be communicatively coupled to the rest of instruction set architecture 1400 through any suitable mechanism, such as through a bus or cache. In one embodiment, cores 1406, 1407 may be communicatively coupled through an L2 cache control 1408, which may include a bus interface unit 1409 and an L2 cache 1410. Cores 1406, 1407 and graphics processing unit 1415 may be communicatively coupled to each other and to the remainder of instruction set architecture 1400 through interconnect 1410. In one embodiment, graphics processing unit 1415 may use a video code 1420 defining the manner in which particular video signals will be encoded and decoded for output.

Instruction set architecture 1400 may also include any number or kind of interfaces, controllers, or other mechanisms for interfacing or communicating with other portions of an electronic device or system. Such mechanisms may facilitate interaction with, for example, peripherals, communications devices, other processors, or memory. In the example of FIG. 14, instruction set architecture 1400 may include a liquid crystal display (LCD) video interface 1425, a subscriber interface module (SIM) interface 1430, a boot ROM interface 1435, a synchronous dynamic random access memory (SDRAM) controller 1440, a flash controller 1445, and a serial peripheral interface (SPI) master unit 1450. LCD video interface 1425 may provide output of video signals from, for example, GPU 1415 and through, for example, a mobile industry processor interface (MIPI) 1490 or a high-definition multimedia interface (HDMI) 1495 to a display. Such a display may include, for example, an LCD. SIM interface 1430 may provide access to or from a SIM card or device. SDRAM controller 1440 may provide access to or from memory such as an SDRAM chip or module. Flash controller 1445 may provide access to or from memory such as flash memory or other instances of RAM. SPI master unit 1450 may provide access to or from communications modules, such as a Bluetooth module 1470, high-speed 3G modem 1475, global positioning system module 1480, or wireless module 1485 implementing a communications standard such as 802.11.

Figure 15:
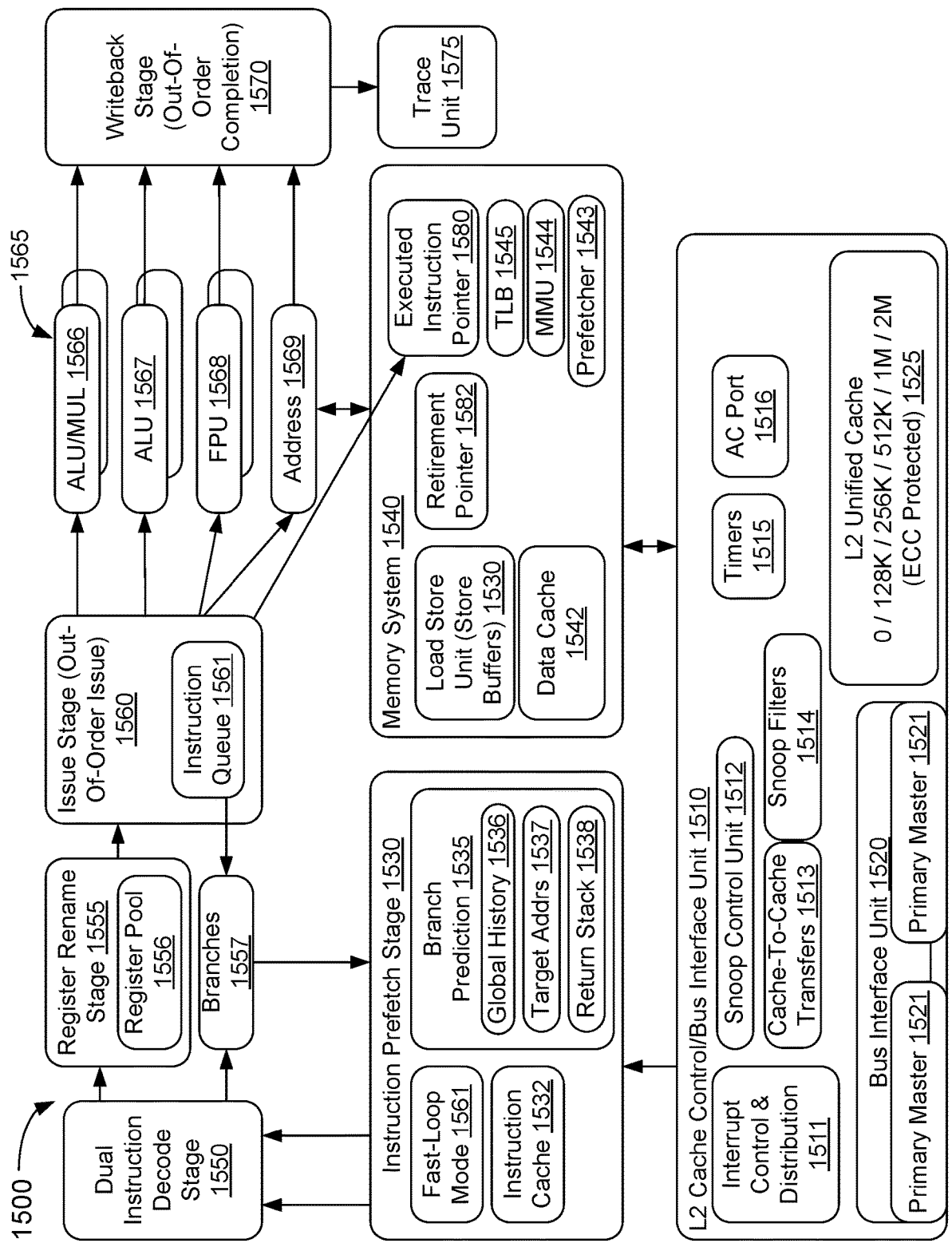
FIG. 15 is a more detailed block diagram of an instruction set architecture of a processor, in accordance with embodiments of the present disclosure.

FIG. 15 is a more detailed block diagram of an instruction set architecture 1500 of a processor, in accordance with embodiments of the present disclosure. Instruction architecture 1500 may implement one or more aspects of instruction set architecture 1400. Furthermore, instruction set architecture 1500 may illustrate modules and mechanisms for the execution of instructions within a processor.

Instruction architecture 1500 may include a memory system 1540 communicatively coupled to one or more execution entities 1565. Furthermore, instruction architecture 1500 may include a caching and bus interface unit such as unit 1510 communicatively coupled to execution entities 1565 and memory system 1540. In one embodiment, loading of instructions into execution entities 1564 may be performed by one or more stages of execution. Such stages may include, for example, instruction prefetch stage 1530, dual instruction decode stage 1550, register rename stage 155, issue stage 1560, and writeback stage 1570.

In another embodiment, memory system 1540 may include a retirement pointer 1582. Retirement pointer 1582 may store a value identifying the program order (PO) of the last retired instruction. Retirement pointer 1582 may be set by, for example, retirement unit 454. If no instructions have yet been retired, retirement pointer 1582 may include a null value.

Execution entities 1565 may include any suitable number and kind of mechanisms by which a processor may execute instructions. In the example of FIG. 15, execution entities 1565 may include ALU/multiplication units (MUL) 1566, ALUs 1567, and floating point units (FPU) 1568. In one embodiment, such entities may make use of information contained within a given address 1569. Execution entities 1565 in combination with stages 1530, 1550, 1555, 1560, 1570 may collectively form an execution unit.

Unit 1510 may be implemented in any suitable manner. In one embodiment, unit 1510 may perform cache control. In such an embodiment, unit 1510 may thus include a cache 1525. Cache 1525 may be implemented, in a further embodiment, as an L2 unified cache with any suitable size, such as zero, 128 k, 256 k, 512 k, 1M, or 2M bytes of memory. In another, further embodiment, cache 1525 may be implemented in error-correcting code memory. In another embodiment, unit 1510 may perform bus interfacing to other portions of a processor or electronic device. In such an embodiment, unit 1510 may thus include a bus interface unit 1520 for communicating over an interconnect, intraprocessor bus, interprocessor bus, or other communication bus, port, or line. Bus interface unit 1520 may provide interfacing in order to perform, for example, generation of the memory and input/output addresses for the transfer of data between execution entities 1565 and the portions of a system external to instruction architecture 1500.

To further facilitate its functions, bus interface unit 1520 may include an interrupt control and distribution unit 1511 for generating interrupts and other communications to other portions of a processor or electronic device. In one embodiment, bus interface unit 1520 may include a snoop control unit 1512 that handles cache access and coherency for multiple processing cores. In a further embodiment, to provide such functionality, snoop control unit 1512 may include a cache-to-cache transfer unit that handles information exchanges between different caches. In another, further embodiment, snoop control unit 1512 may include one or more snoop filters 1514 that monitors the coherency of other caches (not shown) so that a cache controller, such as unit 1510, does not have to perform such monitoring directly. Unit 1510 may include any suitable number of timers 1515 for synchronizing the actions of instruction architecture 1500. Also, unit 1510 may include an AC port 1516.

Memory system 1540 may include any suitable number and kind of mechanisms for storing information for the processing needs of instruction architecture 1500. In one embodiment, memory system 1504 may include a load store unit 1530 for storing information such as buffers written to or read back from memory or registers. In another embodiment, memory system 1504 may include a translation lookaside buffer (TLB) 1545 that provides look-up of address values between physical and virtual addresses. In yet another embodiment, bus interface unit 1520 may include a memory management unit (MMU) 1544 for facilitating access to virtual memory. In still yet another embodiment, memory system 1504 may include a prefetcher 1543 for requesting instructions from memory before such instructions are actually needed to be executed, in order to reduce latency.

The operation of instruction architecture 1500 to execute an instruction may be performed through different stages. For example, using unit 1510 instruction prefetch stage 1530 may access an instruction through prefetcher 1543. Instructions retrieved may be stored in instruction cache 1532. Prefetch stage 1530 may enable an option 1531 for fast-loop mode, wherein a series of instructions forming a loop that is small enough to fit within a given cache are executed. In one embodiment, such an execution may be performed without needing to access additional instructions from, for example, instruction cache 1532. Determination of what instructions to prefetch may be made by, for example, branch prediction unit 1535, which may access indications of execution in global history 1536, indications of target addresses 1537, or contents of a return stack 1538 to determine which of branches 1557 of code will be executed next. Such branches may be possibly prefetched as a result. Branches 1557 may be produced through other stages of operation as described below. Instruction prefetch stage 1530 may provide instructions as well as any predictions about future instructions to dual instruction decode stage.

Dual instruction decode stage 1550 may translate a received instruction into microcode-based instructions that may be executed. Dual instruction decode stage 1550 may simultaneously decode two instructions per clock cycle. Furthermore, dual instruction decode stage 1550 may pass its results to register rename stage 1555. In addition, dual instruction decode stage 1550 may determine any resulting branches from its decoding and eventual execution of the microcode. Such results may be input into branches 1557.

Register rename stage 1555 may translate references to virtual registers or other resources into references to physical registers or resources. Register rename stage 1555 may include indications of such mapping in a register pool 1556. Register rename stage 1555 may alter the instructions as received and send the result to issue stage 1560.

Issue stage 1560 may issue or dispatch commands to execution entities 1565. Such issuance may be performed in an out-of-order fashion. In one embodiment, multiple instructions may be held at issue stage 1560 before being executed. Issue stage 1560 may include an instruction queue 1561 for holding such multiple commands. Instructions may be issued by issue stage 1560 to a particular processing entity 1565 based upon any acceptable criteria, such as availability or suitability of resources for execution of a given instruction. In one embodiment, issue stage 1560 may reorder the instructions within instruction queue 1561 such that the first instructions received might not be the first instructions executed. Based upon the ordering of instruction queue 1561, additional branching information may be provided to branches 1557. Issue stage 1560 may pass instructions to executing entities 1565 for execution.

Upon execution, writeback stage 1570 may write data into registers, queues, or other structures of instruction set architecture 1500 to communicate the completion of a given command. Depending upon the order of instructions arranged in issue stage 1560, the operation of writeback stage 1570 may enable additional instructions to be executed. Performance of instruction set architecture 1500 may be monitored or debugged by trace unit 1575.

Figure 16:
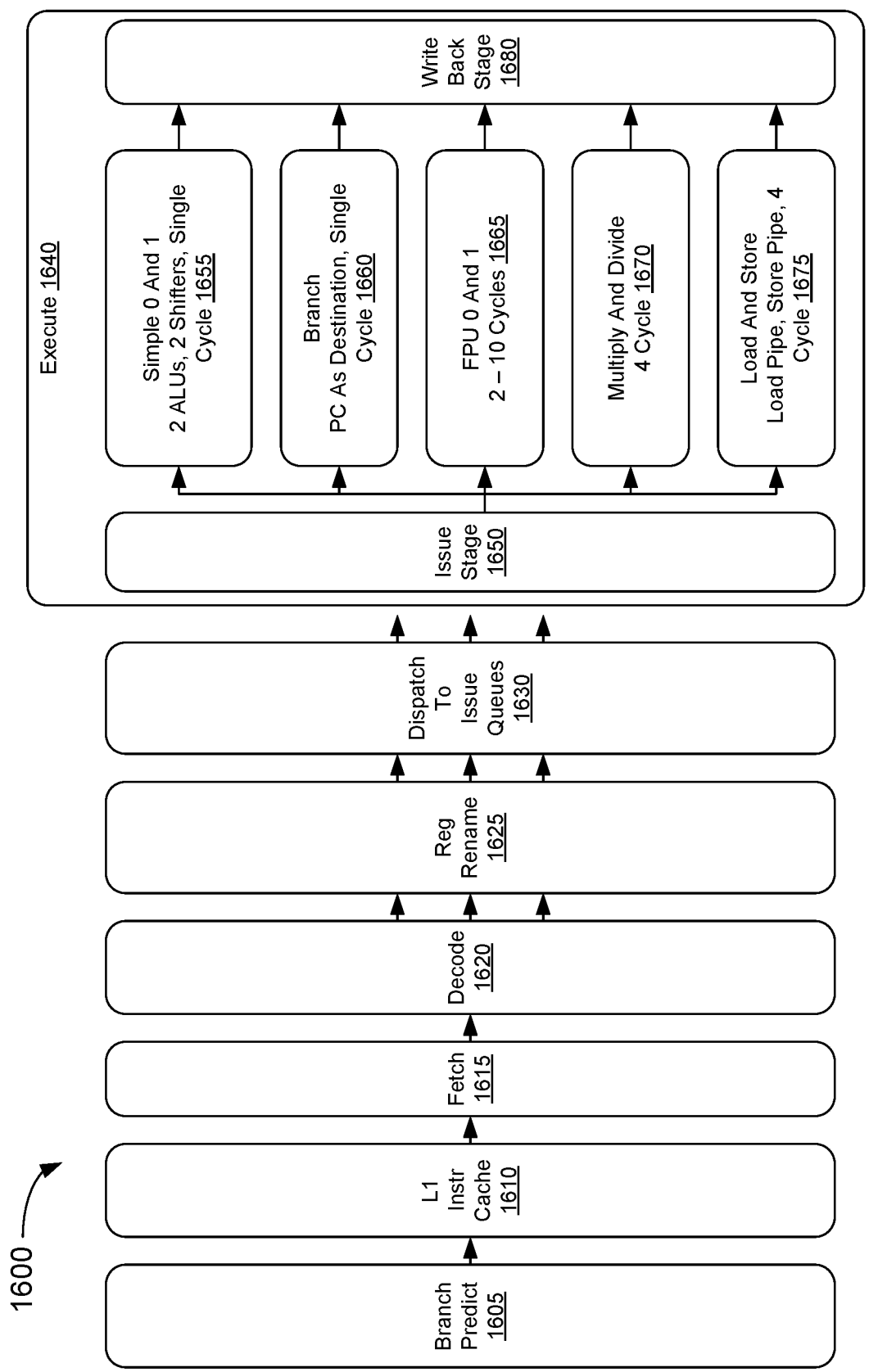
FIG. 16 is a block diagram of an execution pipeline for an instruction set architecture of a processor, in accordance with embodiments of the present disclosure.

FIG. 16 is a block diagram of an execution pipeline 1600 for an instruction set architecture of a processor, in accordance with embodiments of the present disclosure. Execution pipeline 1600 may illustrate operation of, for example, instruction architecture 1500 of FIG. 15.

Execution pipeline 1600 may include any suitable combination of steps or operations. In 1605, predictions of the branch that is to be executed next may be made. In one embodiment, such predictions may be based upon previous executions of instructions and the results thereof. In 1610, instructions corresponding to the predicted branch of execution may be loaded into an instruction cache. In 1615, one or more such instructions in the instruction cache may be fetched for execution. In 1620, the instructions that have been fetched may be decoded into microcode or more specific machine language. In one embodiment, multiple instructions may be simultaneously decoded. In 1625, references to registers or other resources within the decoded instructions may be reassigned. For example, references to virtual registers may be replaced with references to corresponding physical registers. In 1630, the instructions may be dispatched to queues for execution. In 1640, the instructions may be executed. Such execution may be performed in any suitable manner. In 1650, the instructions may be issued to a suitable execution entity. The manner in which the instruction is executed may depend upon the specific entity executing the instruction. For example, at 1655, an ALU may perform arithmetic functions. The ALU may utilize a single clock cycle for its operation, as well as two shifters. In one embodiment, two ALUs may be employed, and thus two instructions may be executed at 1655. At 1660, a determination of a resulting branch may be made. A program counter may be used to designate the destination to which the branch will be made. 1660 may be executed within a single clock cycle. At 1665, floating point arithmetic may be performed by one or more FPUs. The floating point operation may require multiple clock cycles to execute, such as two to ten cycles. At 1670, multiplication and division operations may be performed. Such operations may be performed in four clock cycles. At 1675, loading and storing operations to registers or other portions of pipeline 1600 may be performed. The operations may include loading and storing addresses. Such operations may be performed in four clock cycles. At 1680, write-back operations may be performed as required by the resulting operations of 1655-1675.

Figure 17:
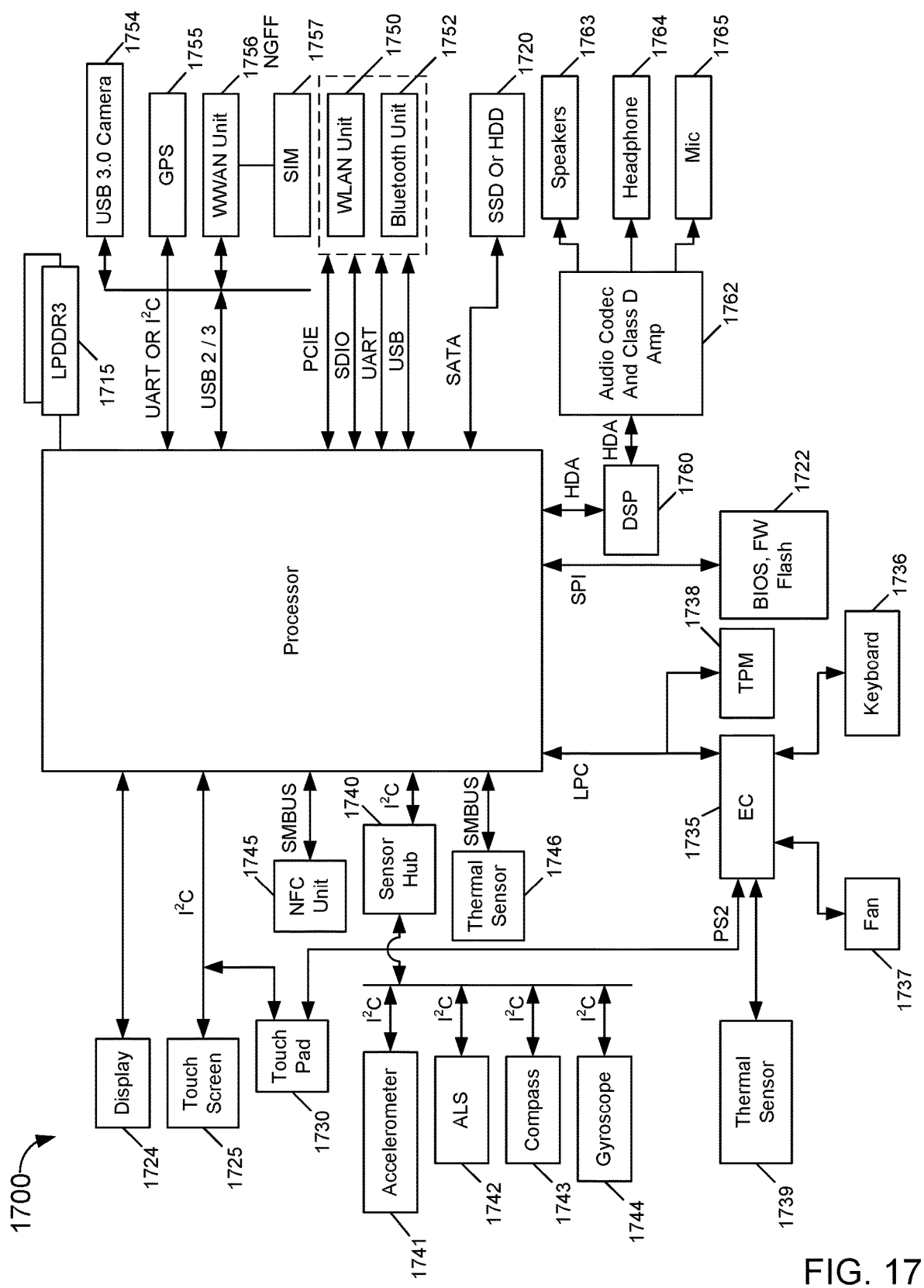
FIG. 17 is a block diagram of an electronic device for utilizing a processor, in accordance with embodiments of the present disclosure.

FIG. 17 is a block diagram of an electronic device 1700 for utilizing a processor 1710, in accordance with embodiments of the present disclosure. Electronic device 1700 may include, for example, a notebook, an ultrabook, a computer, a tower server, a rack server, a blade server, a laptop, a desktop, a tablet, a mobile device, a phone, an embedded computer, or any other suitable electronic device.

Electronic device 1700 may include processor 1710 communicatively coupled to any suitable number or kind of components, peripherals, modules, or devices. Such coupling may be accomplished by any suitable kind of bus or interface, such as I$^2$C bus, system management bus (SMBus), low pin count (LPC) bus, SPI, high definition audio (HDA) bus, Serial Advance Technology Attachment (SATA) bus, USB bus (versions 1, 2, 3), or Universal Asynchronous Receiver/Transmitter (UART) bus.

Such components may include, for example, a display 1724, a touch screen 1725, a touch pad 1730, a near field communications (NFC) unit 1745, a sensor hub 1740, a thermal sensor 1746, an express chipset (EC) 1735, a trusted platform module (TPM) 1738, BIOS/firmware/flash memory 1722, a digital signal processor 1760, a drive 1720 such as a solid state disk (SSD) or a hard disk drive (HDD), a wireless local area network (WLAN) unit 1750, a Bluetooth unit 1752, a wireless wide area network (WWAN) unit 1756, a global positioning system (GPS), a camera 1754 such as a USB 3.0 camera, or a low power double data rate (LPDDR) memory unit 1715 implemented in, for example, the LPDDR3 standard. These components may each be implemented in any suitable manner.

Furthermore, in various embodiments other components may be communicatively coupled to processor 1710 through the components discussed above. For example, an accelerometer 1741, ambient light sensor (ALS) 1742, compass 1743, and gyroscope 1744 may be communicatively coupled to sensor hub 1740. A thermal sensor 1739, fan 1737, keyboard 1746, and touch pad 1730 may be communicatively coupled to EC 1735. Speaker 1763, headphones 1764, and a microphone 1765 may be communicatively coupled to an audio unit 1764, which may in turn be communicatively coupled to DSP 1760. Audio unit 1764 may include, for example, an audio codec and a class D amplifier. A SIM card 1757 may be communicatively coupled to WWAN unit 1756. Components such as WLAN unit 1750 and Bluetooth unit 1752, as well as WWAN unit 1756 may be implemented in a next generation form factor (NGFF).

Figure 18:
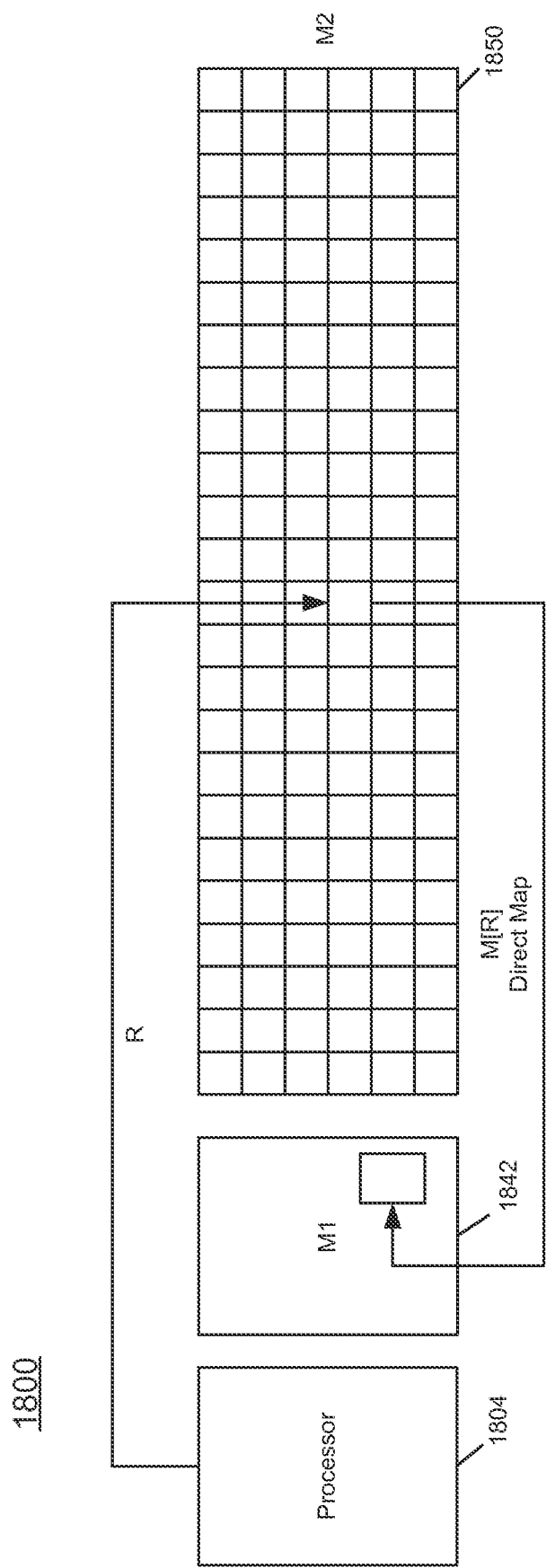
FIG. 18 is a block diagram of a system in accordance with an embodiment.

Referring now to FIG. 18, shown is a block diagram of a system in accordance with an embodiment. As shown in FIG. 18, system 1800 is illustrated at a high level as having a two-level memory (2LM) hierarchy in which a processor 1804 (e.g., a multicore processor or other SoC) is coupled to a first memory tier 1842, and a second, more capacious but slower system memory tier, 1850. In various embodiments the capacious memory 1850 may be a byte-addressable and directly addressable large capacity (e.g., multiple terabytes) memory tier created out of denser storage class memory technologies using phase change materials, memristors, or alternative memory technologies. In a two-level mode of operation, the multiple terabytes of memory 1850 can be hardware-cached by system memory 1842 (e.g., DRAM) that is roughly an order of magnitude smaller in comparison, transparent to software. Such transparent caching enables applications to realize the higher capacity of this memory, but shields them from longer and non-uniform memory latencies presented by the capacious memory 1850. For brevity, "M2" is used herein to refer to the capacious memory 1850, and "M1" is used to refer to buffering memory 1842, which may be invisible or transparent to software but is used by hardware as a cache for M2.

As FIG. 18 shows, memory references ("R") are, in most cases, already cache-filtered. These post-cache references can be expected to manifest diluted temporal and/or spatial locality. Embodiments may increase hit rates in M1 by providing control logic (e.g., within an integrated memory controller of processor 1804), to enable software to provide a high level indication about relative importance and popularity of different sets of data in M2. Hardware may then use this guidance to improve allocation of M1 for retaining higher value data. Hardware may provide for both detection and correction of any deviations by software from its own guidance (so that details of the M1 and M2 arrangement can be invisible to software), as well as inviting software to provide any changes in guidance that are indicated from the actual data reference behavior. Thus embodiments may be used to increase hit rates in M1 without significant hardware complexity and without intrusive software customizations, particularly as this M1 is intended to be transparent to most software. Embodiments may be used to provide increased DRAM cache hit rates in a system with a 2LM (or another memory hierarchy).

With the two-level memory arrangement of FIG. 18, software may be shielded from longer and non-uniform M2 access latencies. However, as a cache, M1 is arranged differently from processor-internal caches. For instance, because the mapping from address to data storage is implemented by a memory controller, it is typically designed not to require a high degree of associative lookup and displacement policy choices; thus, a direct-mapped organization is a very common choice. Also common is a transfer size (e.g., 256 bytes (B)) that is efficient for error detection and correction, but has a potential for low hit rates when the access pattern is not sufficiently sequential. Processor-internal caches capture nearby correlated accesses to exploit spatial and temporal locality; these effects are diluted in M2, and are further eddied by many cores and I/O streams interfering in M1. Processor-internal caches are also relatively insensitive to phase changes, as they are relatively small but fast and deeply associative, which allow them to capture the denser portions of a thread's dynamic working set and to adjust quickly to perturbations. By contrast, M1 contains most of the long tail of accesses and thus can be susceptible to interference from phase swings that wash out whatever temporal locality a long running background activity may have established in M1.

As a result of the above differences, while M1 in this two-level memory system acts like a traditional cache, there are notable differences. Given that this memory is located externally to processor cores, more nuanced displacement decisions can be considered (as the higher base latency of a memory access and diminished post-cache access rate allow some flexibility in elongating the decision time) provided that their implementation retains the relative hardware simplicity of a memory controller with a direct mapped organization.

In various embodiments, a processor includes hardware such as control logic to hold and update priority and usage information of data stored in a persistent memory. In addition, this logic may be adapted to implement a stochastic replacement policy that blends usage information and priority information. In an embodiment, the priority information may be obtained from software, e.g., responsive to instructions (such as user-level instructions) that set priorities of datasets stored in M2. In an embodiment, the control logic may be implemented within a memory controller (which may be integrated within a processor) that uses direct-mapped correspondence between M2 and M1.

In this way, embodiments enable software to influence caching of data from M2 in a closer level of a memory hierarchy (such as a system memory), while providing hardware the ability to override software guidance depending on runtime behavior (including the usage information).

Embodiments may be used to capture usage information at the memory tier itself (not extending access tracking in processor caches) and adapt using both software guidance and usage information captured statistically at the memory tier. While different techniques can be used to associate priority with data items, in one embodiment a set of Bloom filters (BFs) may be generated and stored within the processor based on priority information received from software to economically associate dataset blocks (e.g., cacheline sets) to a given priority level. Of course, while a multitude of different priority levels are possible, in examples described herein, data may be classified with one of three levels, namely prioritized, deprioritized or unprioritized. More specifically, a data coloring technique may be used to associate data items as BLACK (deprioritized), GRAY (unprioritized), or WHITE (prioritized). Such coloring is scalable—that is, it is not constrained in either the numbers of cachelines in the capacity tier (i.e., M2) that are associated with a category, nor by the size of the buffering tier (i.e., M1).

In various embodiments, the software priority guidance received by hardware can be supplemented with hardware generated and economic approximate access history. Such tracking can be performed, in an embodiment, with structures that are small enough (e.g., a small fraction of the LLC size) to be implemented on die with the memory controller, and not requiring expensive associative lookups. The history is collected and used in a category sensitive manner to deal with situations in which software behavior deviates from software guidance. This history may be used in some embodiments to affect a stochastic bias to permit new data from M2 to displace data currently in M1, where the latter has a higher priority. When a processor references data from M2, but the referenced data is not permitted to displace data currently in M1, the data read from M2 is directly brought into a processor cache without storage in M1.

In different embodiments, a variety of category-wise considerations may be used to adjust the stochastic bias up or down. The overall tactic is to employ category preemption—occasionally, and based on stronger evidence of a temporary shift in popularity for such preemption. This adjustment is based on the following: processor caches already capture much of the essential temporal locality; and category preemption can be effected primarily to favor just a small fraction of data from a long tail of reference probability, which happens to be temporarily popular but does not enjoy a short enough reuse distance to be maintained in processor caches.

Embodiments may afford some time and inexactness when deciding whether a new access should or should not be given space in M1. This is because the decision is less performance sensitive than for a processor cache that is of modest capacity and has little time to choose victims. Stated another way, even if an incorrect decision is made, processor caches hold onto data received from M1|M2 for some stretch of time, to lessen impact. Conversely, embodiments ensure that when some workload is unable to sustain a high hit rate in processor caches, it does not suffer a double penalty because its high value data also drains out of M1 as a further side effect of poor locality.

In addition to being tailored to very low level caches, embodiments leverage software knowledge, to make decisions that hardware by itself would find difficult to make. At the same time, as software is not expected to always be correct, embodiments provide adaptation to enable hardware to override programmer mistakes or deal with unexpected behavior.

In one embodiment, data item priorities may be assigned to memory locations by a producer of such data item priorities. In another embodiment and after a miss of a data access, hardware may utilize such data item priorities to evaluate whether and how to evict data that otherwise was a candidate for eviction. In a further embodiment, hardware may also consider access histories to evaluate whether and how to evict data. Candidate data for eviction may be of a high priority and the hardware may choose to not displace this data. In yet another embodiment, the hardware may override or adapt the data item priorities. In still yet another embodiment, the producer of the data item priorities may take corrective action by, for example, adjusting the utilization of priorities to be performed by hardware, adjusting the data item priorities, or other suitable action.

Figure 19:
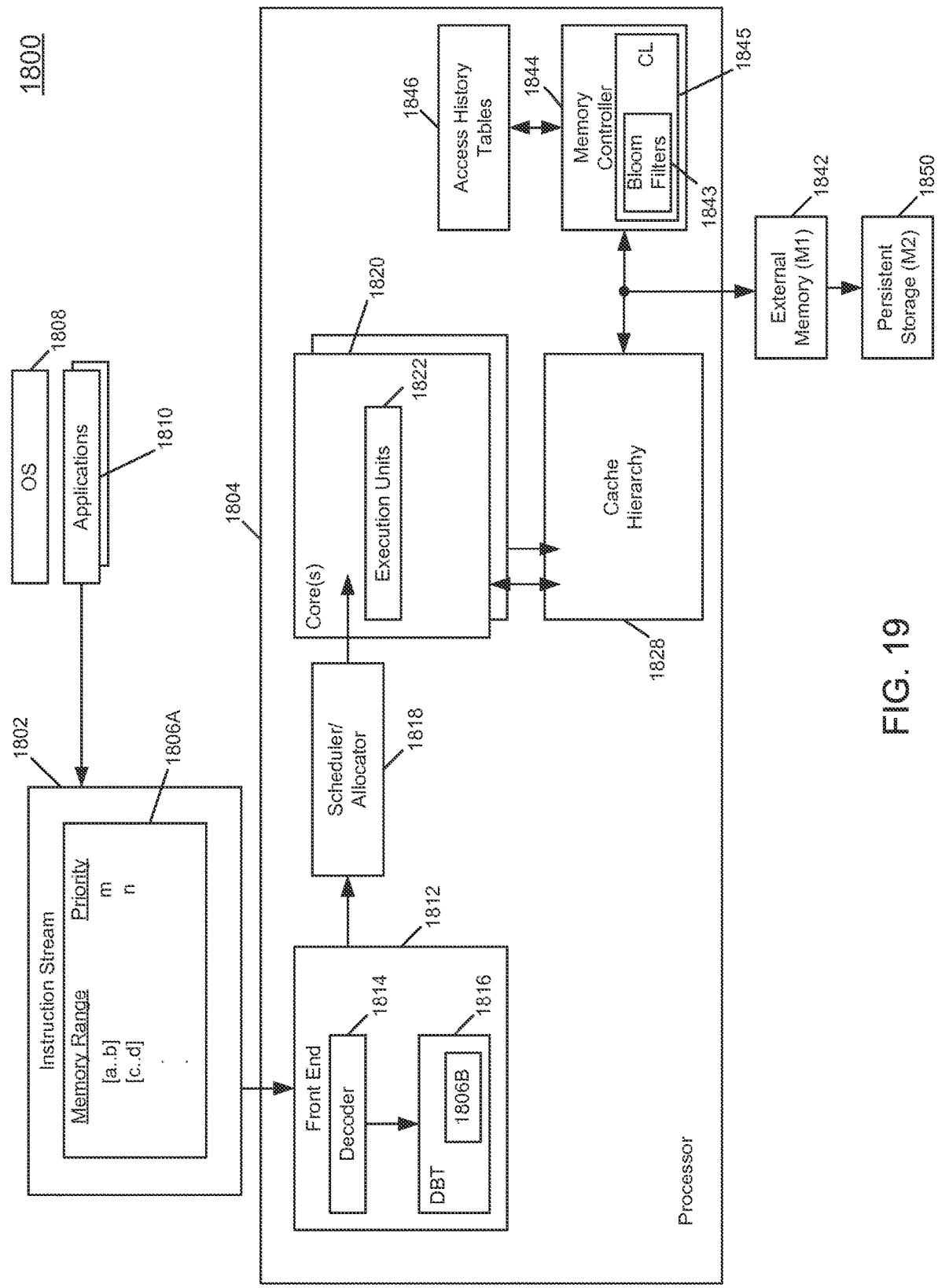
FIG. 19 is a block diagram of a system for implementing an instruction and logic for adaptive data item priorities, in accordance with an embodiment.

Embodiments of the present disclosure involve instructions and logic for adaptive data item prioritization. Specified priorities and probabilities may be used to evaluate and evict elements from caches. FIG. 19 is a block diagram of a system 1800 for implementing instructions and logic for adaptive data item priorities, in accordance with embodiments of the present disclosure. More specifically, FIG. 19 shows a more detailed view of system 1800 from FIG. 18, particularly with regard to processor 1804. System 1800 may include any suitable number and kind of elements to perform the operations described herein. Furthermore, although specific elements of system 1800 may be described herein as performing a specific function, any suitable portion of system 1800 may perform the functionality described herein. System 1800 may fetch, dispatch, execute, and retire instructions out-of-order.

The producer of data item priorities may include any suitable entity to specify priorities of memory locations. In one embodiment, the producer of data item priorities may be implemented in software such as an application for execution in system 1800. In another embodiment, the producer of data item priorities may include instructions in software applications specifying the priorities. Such applications may include, for example, applications 1810. Applications 1810 may specify data item priorities in terms of virtual memory or physical memory. Moreover, applications 1810 may change data item priorities, instruct hardware to perform priority analysis in a given mode, or otherwise take corrective action based upon hardware adapting to data item priorities. In yet another embodiment, the production of data item priorities may include instructions generated from operating systems autonomously or in response to system calls from applications 1810. Operating systems, such as operating system 1808, may specify data item priorities or translate data item priorities from virtual memory designations to physical memory designations. Moreover, operating system 1808 may change data item priorities, instruct hardware to perform priority analysis in a given mode, or otherwise take corrective action based upon hardware adapting to data item priorities. In another embodiment, the production of data item priorities may include instructions in a compiler, translator, just-in-time component, or other suitable entities in a processor 1804. Such an entity may include a dynamic binary translator (DBT) 1816. DBT 1816 may specify data item priorities or translate data item priorities from virtual memory designations to physical memory designations. Moreover, DBT 1816 may change data item priorities, instruct hardware to perform priority analysis in a given mode, or otherwise take corrective action based upon hardware adapting to data item priorities.

As further illustrated in FIG. 19, from a given one of an application 1810 or OS 1808, an incoming instruction stream 1802 is provided. Certain of these instructions may provide priority information as described herein. As shown, instructions 1806A represent ISA-level instructions to indicate a particular priority for given memory ranges (which can be in terms of virtual memory address ranges, or physical memory address ranges). In other cases, such as in the absence of such instructions or upon the basis of hardware-based updates to priority, DBT 1816 may similarly associate priority with given memory ranges, as indicated at 1806B. In either case, incoming priority information may be encoded within processor 1814 as a set of Bloom filters 1843, which in the embodiment shown is included within control logic 1845 of a memory controller 1844. In an embodiment, each Bloom filter 1843 may be associated with a particular priority level and can be a many-bit vector to indicate, in an economic fashion, whether a given memory address is associated with the particular priority (as indicated by a predetermined value, e.g., a logic 1) within the corresponding element of the bit vector. Of course other embodiments may provide for a different encoding of priority information. The priority readout may be performed at any stage of an access, but in one embodiment, this determination can be delegated to a Bloom filter 1843 lodged within memory controller 1844 itself so as to reduce the need to send it to the memory controller from the remainder of the processor logic. Of course in other embodiments, Bloom filters 1843 may be implemented in a separate entity of the processor.

Any suitable hardware may be used to evaluate and adapt data item priorities in view of a need to evict or otherwise displace data. In one embodiment, such hardware may include a memory controller 1844 of processor 1804. Example displacement decisions as described herein may relate to an off-socket memory, such as a system memory 1842 coupled to a persistent memory 1850. Execution of instructions in an execution unit 1822 in a core 1820 may cause a write or read of a memory location or register through a memory hierarchy implemented in any suitable manner. In the example of FIG. 19, the request may proceed through a cache hierarchy 1824, such that on a LLC miss, the request proceeds to memory controller 1844. In turn, memory controller 1844 may make a replacement decision for a coupled cache memory, namely an M1 as described herein. In the example of FIG. 19, memory controller 1844 includes a control logic 1845 that represents possible operation of any suitable hardware to evaluate and adapt data item priorities in view of displacement considerations.

System 1800 may include processor 1804 to perform, fully or in part, adaptive handling of data item priorities in applying an eviction policy. Processor 1804 may be implemented in part by any processor core, logical processor, processor, or other processing entity such as those illustrated in FIGS. 1-17. In various embodiments, processor 1804 may include a front end 1812 to fetch instructions to be executed; a scheduler and allocator 1818 to allocate and assign instructions for execution to execution units 1822 or cores 1820; and one or more execution units 1822 or cores 1820 to execute the instructions. Processor 1804 may include other suitable components that are not shown, such as allocation units to reserve alias resources or retirement units to recover resources used by the instructions.

Front end 1812 may fetch and prepare instructions to be used by other elements of processor 1804, and may include any suitable number or kind of components. For example, front end 1812 may include a decoder 1814 to translate instructions into microcode commands. Furthermore, front end 1812 may arrange instructions into parallel groups or other mechanisms of out-of-order processing. DBT 1816 may be included in front end 1812. Instructions may be processed for in-order or out-of-order execution. In one embodiment, such instructions may include instructions for manipulating the adaptive handling of data item priorities. In another embodiment, such instructions may include instructions for specifying data item priorities. Scheduler 1820 may schedule instructions to be executed on any suitable execution unit 1822 or core 1822. Cores 1822 may be implemented in any suitable manner. A given core 1822 may include any suitable number, kind, and combination of execution units 1822.

In one embodiment, memory controller 1844 may apply eviction policies that are adaptive to information, such as priority data items, specified by software and to actual behavior experience in hardware. Some portions of a program's address space may be disproportionally important to its performance. In some embodiments, such importance may be recognized by software itself, either through monitoring or programming. Accordingly, software such as applications 1810, operating system 1808, or DBT 1816 may specify priorities as reflected in priority data ranges 1806.

In one embodiment, priority data items 1806 may specify virtual memory address ranges and, for each range, a priority designation such as an integer value wherein a higher value indicates a higher priority. In another embodiment, priority data items 1806 may specify physical memory address ranges and, for each range, a priority designation. In various embodiments, user-level instructions may be used to provide priority information from software to the hardware. In one such embodiment, multiple user-level instructions may be provided that can be used to identify a particular priority level (e.g., one of the three W, B, G categories discussed above) along with a corresponding memory range to which the priority applies. Understand that different granularities of memory range, may be implemented, varying from very fine-grained (e.g., single or multiple byte wide granularities) to page and multi-page sizes. In addition, in different implementations the user-level instructions may identify priority using virtual memory addresses or physical memory addresses. In various embodiments, applications 1810, operating system 1808, or DBT 1816 may generate a first priority data item and another of applications 1810, operating system 1808, or DBT 1816 may translate the priority data item into a different type. For example, application 1810 may generate a virtual memory priority data item that is translated by operating system 1808 into a physical memory priority data item. Hardware of processor 1804 may access priority values specified in physical memory ranges.

Upon determining that a cache miss or other similar request has been made, memory controller 1844 may read the priority data from priority datasets 1806 as embodied in Bloom filter 1843. Such data, as resident within Bloom filter 1843 or any other suitable structure, may yield a priority when queried with an address. A consideration regarding the use of a Bloom filter is to provide highly accurate (but not necessarily perfect) readout of priority associated with a given address, without expending variable amount of time and storage for retrieving the exact priority for each data element anywhere in system memory space.

At a high level, embodiments may group memory references into a plurality of dynamically specified sets with respect to priority. Such priority information may be used to control displacement decisions. More specifically, embodiments provide a probabilistic promotion/demotion technique with built-in adaptive capabilities at a macro (population) grain. Such techniques may be enhanced, in another embodiment, with a hardware-maintained approximate reference history to be used for fine-grained adaptation without burdening processor caches. Thus as shown in FIG. 19, processor 1804 may further maintain a set of tables, namely access history tables 1846. In an embodiment, tables 1846, which may be controlled by control logic 1845 of memory controller 1844, may be a set of bitmaps associated with one or more priority levels to indicate relative access history to corresponding data items in M2. In some embodiments, more sophisticated displacement policies, responsive to the meanings of these sets, are possible as will be described.

As discussed above, in an embodiment application software may provide priority information to, e.g., an OS, using three categories of memory addresses: White, Gray, and Black. More specifically, in one embodiment various user-level instructions of an ISA may be provided to provide indication of a given priority level for particular memory ranges (which can be arranged from fine-grained ranges to page and other larger-grained ranges). As an example embodiment, a priority association instruction may take the general form of: SETPRIORITY ADDR, LEN, CATEGORY to bind the address range [ADDR, ADDR+LEN-1] with a CATEGORY such as White, Gray, or Black. White-listed priority may be used to identify pages or other data blocks containing popular items such as indexes, translation dictionaries, hot code, etc. In turn, Black-listed priority may be used to identify pages or other data blocks containing mostly rarely touched data/code items. Ideally, software can identify a large amount of its reference set into the Black-listed category (e.g., data that grows cold with time, data that is scanned for needles in haystacks, etc.). Gray-listed priority may be used to identify pages or other data blocks in which software is uncertain as to the priority level, or cannot label as White or Black. To maintain this priority information, a small bank of Bloom filters may be provided within a processor or its memory controller unit that, given an address R in M2, produces R's label in a small, constant number of cycles. Other embodiments for storing and retrieving the labels, such as bits in page table entries, are possible.

With WBG (short for White/Black/Gray-listed) sets, hardware may be adapted to perform base level differentiated handling as follows: an item Y cached in M1 and having a category (priority) (given by software) is prevented from being displaced by an item Z of a lower priority (where Z maps to same location in M1 where Y is cached), unless a flag set by software enables displacement without regard to priority (category) consideration. Instead, displacement of an item Y cached in M1 by another item Z of the same or higher priority as Y and mapping to same caching location in M1, proceeds according to normal hardware displacement policies without category consideration (which baseline displacement policy may be based on direct mapping, LRU techniques or so forth depending on implementation). In many cases, this degree of differentiation suffices; however, embodiments may further provide adaptation in hardware to adapt to dynamic shifts in software access patterns.

Figure 20:
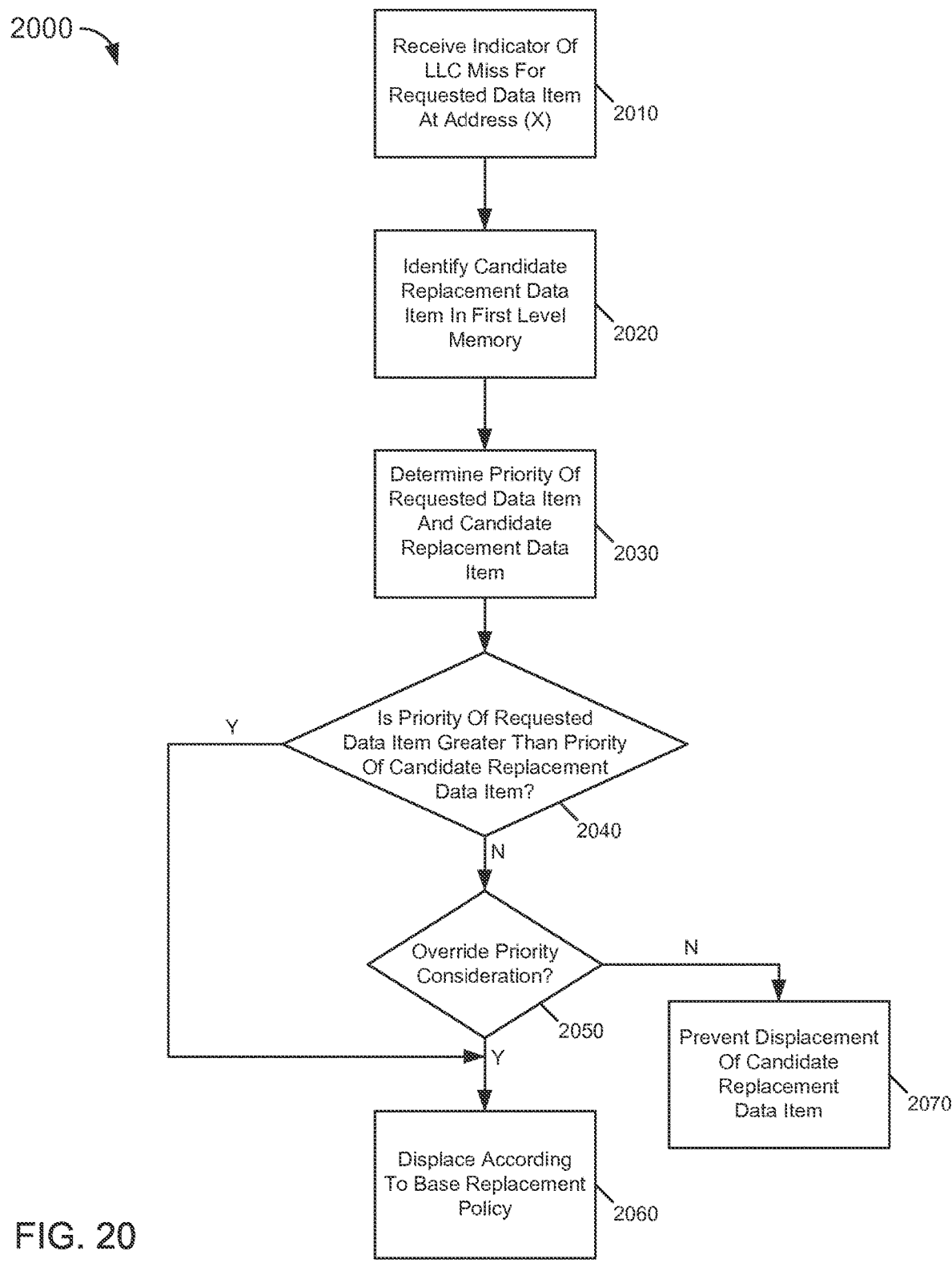
FIG. 20 is a flow diagram of a high level method for performing displacement decisions in accordance with an embodiment.

Referring now to FIG. 20, shown is a flow diagram of a high level method for performing displacement decisions in accordance with an embodiment. As shown in FIG. 20, method 2000, which may be performed by hardware of a processor, such as control logic of a memory controller begins by receiving an indication of a cache miss (block 2010). In an embodiment, this indication may be responsive to an LLC cache miss for a requested data item at an address X. Next at block 2020 a candidate replacement data item is identified in a first level memory (block 2020). This first level memory may be the M1 memory discussed above, coupled to a processor. In an embodiment in which this memory is direct mapped, the candidate replacement data item may be at a single particular address location of the memory. In other cases, for a set-associative mapped cache memory, one of multiple data items in a given set may be identified as the candidate victim data item.

In any case, control next passes to block 2030 where the priorities of the requested data item and the candidate replacement data item can be determined. In an embodiment, this determination may be made with reference to one or more Bloom filters for the associated addresses. Next at diamond 2040 it is determined whether the priority of the replacement data item exceeds that of the candidate replacement data item. If so, control passes directly to block 2060 where a displacement may occur according to a base replacement policy (block 2060). A base replacement policy chooses a data item to evict from the cache in order to make room for the requested data item. In an embodiment, this base replacement policy for a direct mapped M1 memory may constitute replacement of the candidate replacement data item with the requested data item. In other situations, an appropriate replacement policy, such as an LRU policy may be applied.

Instead if the priority of the replacement data item does not exceed that of the candidate replacement data item, control passes to diamond 2050 to determine whether an override of priority consideration is in effect (as may be controlled responsive to an indication from an application or other software undergoing execution (such as an override flag)). If priority considerations are to be overridden, control passes again to block 2060. Otherwise if no override exists, control passes to block 2070 where displacement of the candidate replacement data item with the requested data item is prevented from occurring. Understand while shown at this high level in the embodiment of FIG. 20, many variations and alternatives are possible.

Software may thus specify a group of cachelines that are to be given priority treatment for M1, and may further describe ranges of pages that fall into a very cold category whose cachelines preferably stay in M2; but occasionally, such as when an application is performing garbage collection or running some extensive search for a rare object, the application can request hardware to ignore prioritization temporarily. Note that priority consideration may be set as the default choice most of the time, where the implication is that items in the B set would almost never find allocation in M1, while items in the G set share capacity left over from that used by the W set, and thus both W and G are shielded from being displaced by accesses in the long tail.

Figure 21:
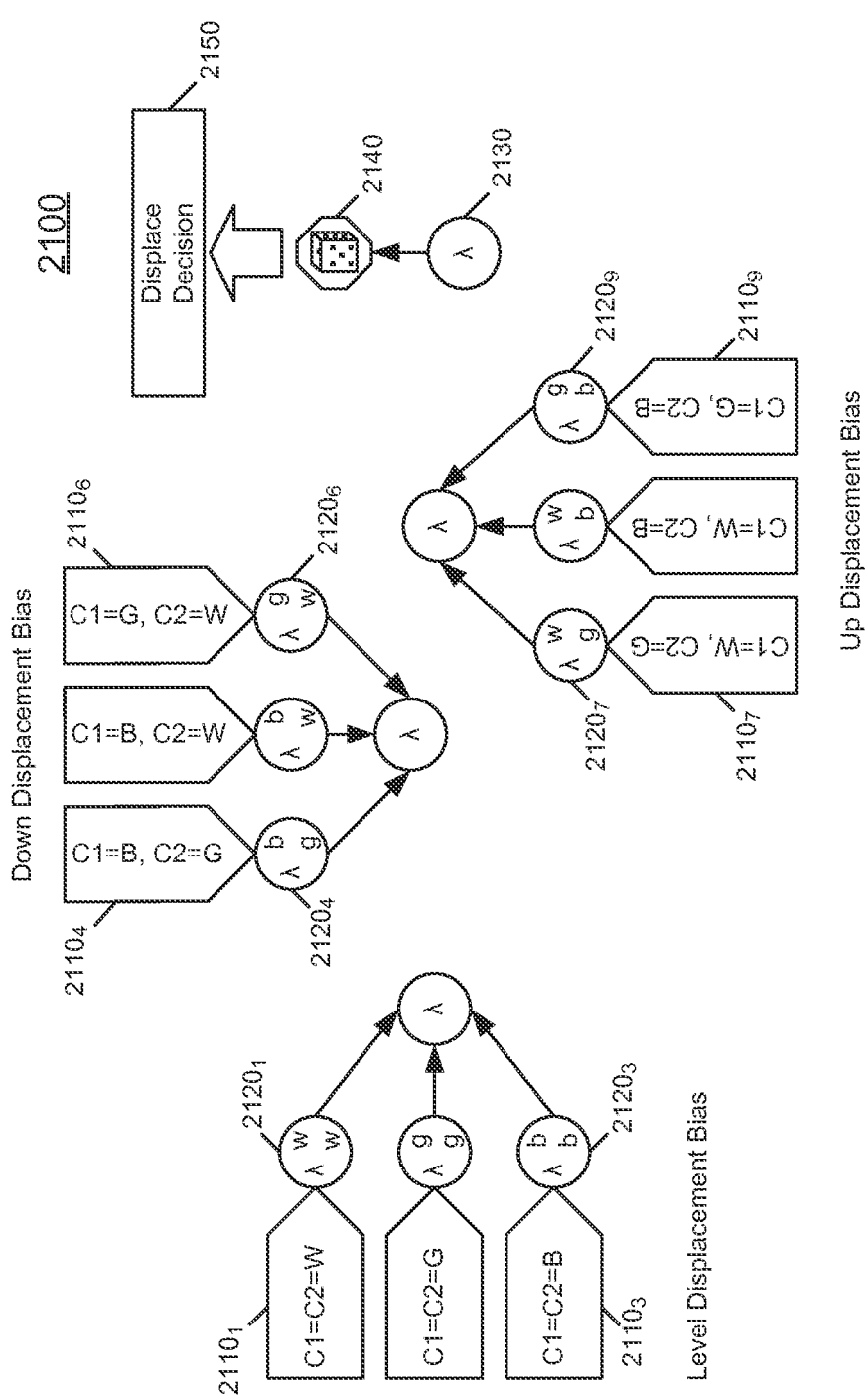
FIG. 21 is a flow diagram of a method for adapting displacement decisions in accordance with an embodiment.

Referring now to FIG. 21, shown is a flow diagram of a method for adapting displacement decisions in accordance with an embodiment. More specifically, method 2100 incorporates a statistical bias to the replacement decision method of FIG. 20 that can be adjusted dynamically.

In FIG. 21, C1 and C2 are respectively labels for a new access (X) and a potential victim (Y) that X can displace from M1. Thus with three categories and two data items under analysis nine different relationships $2110_1$-$2110_9$ with respect to the categories of the two data items are possible, as shown in FIG. 21. (To elaborate, for example $2110_4$ refers to the case that a new access is in the "B" category, a potential victim is "G", and thus a "down displacement" is in consideration). Hardware maintains probabilities shown in FIG. 21 as bias values, k (namely bias values $2120_1$-$2120_9$) (and which in an embodiment may be set between 0 and 1). These bias values, which may be stored in a set of bias tables, each to define a matrix (e.g., 3×3 matrix) of bias values, which are used to make a randomized (statistical) decision as to whether to displace Y and give its slot in M1 to X. Based on the relative priority of the two data items, a given one of these bias values 2120 is selected (at 2130) and based at least in part on this bias value, a statistical or stochastic determination is made at block 2140 that may result in a displacement decision (block 2150). Note that if all bias values in the down displacement bias group (top center) were set to 0, then FIG. 21 would approach the baseline policy described by the displacement method of FIG. 20 for the case where priorities are applied; and if all the bias values were 1, then FIG. 21 approaches the baseline policy described by FIG. 20 for the case where priorities are suspended.

In some embodiments, within the level displacement bias group, the three cases (C1,2=W), (C1,2=G), and (C1,2=B) may be controlled differently. For example, one might make the biases respectively 1, 0.5, and 0, to reflect the relative nature of uncertainty implicit in the W, G, and B labeling by software. Similarly, one might forbid down displacement of W by B, but permit that of W by G, or G by B with very small probabilities. This stochastic bias technique allows software to guide hardware, or hardware to guide itself, based on statistics collected at runtime or by a machine learning algorithm that evaluates the positive or negative consequences of adjusting the biases based on performance of the system. As such, embodiments may dynamically update bias values based on access history, software input, hardware control, or so forth.

Embodiments may further perform adaptation based on usage history. More specifically in an embodiment approximate usage history may be used in displacement decisions. Let R be a reference (address) in system memory range. In turn, PBITS(R) are page address bits (e.g., address bits 12-63) of R, and CBITS(R) are the page address bits (e.g., address bits 6-11) that give the offset of R within its page, in cacheblock units. $\chi(R)$ is a many-to-one hardware mapping from address R to a bit location in a bitmap, C[ ]. And $\delta(R)$ is a many-to-one hardware mapping from address R to a bit location in a bitmap, D[ ].

For adaptive tiering, processor-based storages may be used to store usage or access history information, which in an embodiment may be implemented with two small bitmaps: C[ ] and D[ ]. These bitmaps are used to collect and maintain single bit, approximate access histories into M2. In an embodiment, C[ ] holds access histories for W and G cacheblocks, and D[ ] holds the same for B cacheblocks. (One can extend this access history information to multi-bit access histories). The bits in C[ ] and D[ ] are used for tracking references, and as well, for reinforcing or un-reinforcing recentness of access, as described below. In an embodiment, these access histories may be small and may cover a small fraction of the overall referenced population with some small loss of accuracy that does not affect correctness. Hashing functions, $\chi$ and $\delta$, may be used to map from location in M2 to location in C and D, respectively. For its hashing, χ uses the full cacheblock address (PBITS and CBITS) while δ takes only the PBITS. The hardware sweeps through the C[ ] and D[ ] bit arrays to reset them periodically in the background, in an embodiment. Such updates allow methods described below to remain current when comparing access history of one cacheblock to that of another. Note that data labeling (i.e., priority categorization) may change from time to time, even if not frequently. The only consequence of these label changes that affect the methods described here is a temporary loss of some adaptation (the part which benefits from tracking) while C[ ] and D[ ] are reset to zeros.

Figure 22:
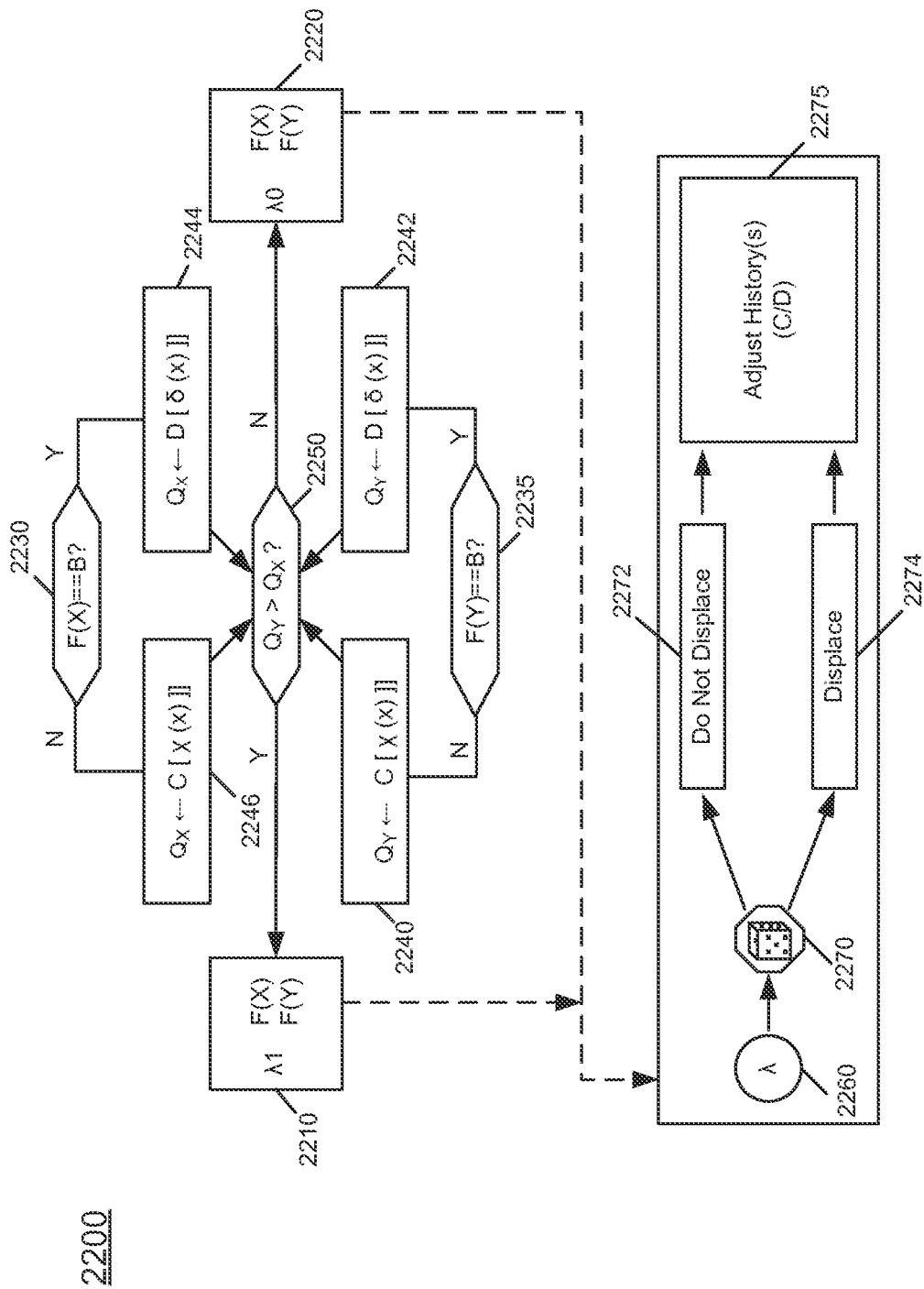
FIG. 22 is a flow diagram of a method for behavior tracking and adaptation in accordance with an embodiment.

Referring now to FIG. 22 shown is a flow diagram of a method for behavior tracking and adaptation in accordance with an embodiment. As seen in FIG. 22, method 2200 begins with determinations of the category of the displacement candidate and potential replacer lines (respectively displacement candidate Y and potential replacer X), at determination blocks 2230 and 2235. Depending on whether the data items are black labeled or not, a given access is made to either the C[ ] or D[ ] bit arrays (at selected ones of blocks 2240, 2242, 2244, and 2246). Then based on whether the displacement candidate was more recently accessed than the potential replacer, selection is made from one of multiple bias matrix storages 2210 and 2220.

Then in turn, a selected bias value 2260 from the selected storage is used in a statistical probability determination at block 2270, resulting in a decision to displace or not to displace (at blocks 2272 and 2274). In addition, appropriate update to access bitmaps C[ ] and D[ ] occurs (at block 2275). At a high level, FIG. 22 thus shows that depending on whether a displacement candidate (Y) was more recently referenced than a potential replacer (X), choice of bias is made from an alternate (e.g., 3×3) bias matrix. Then, depending on whether the decision was made to displace or not, tracking bits in the bitmaps are adjusted. Optional, more sophisticated or nuanced treatment of WBG sets is also made possible with these mechanisms, as described below.

Figure 23:
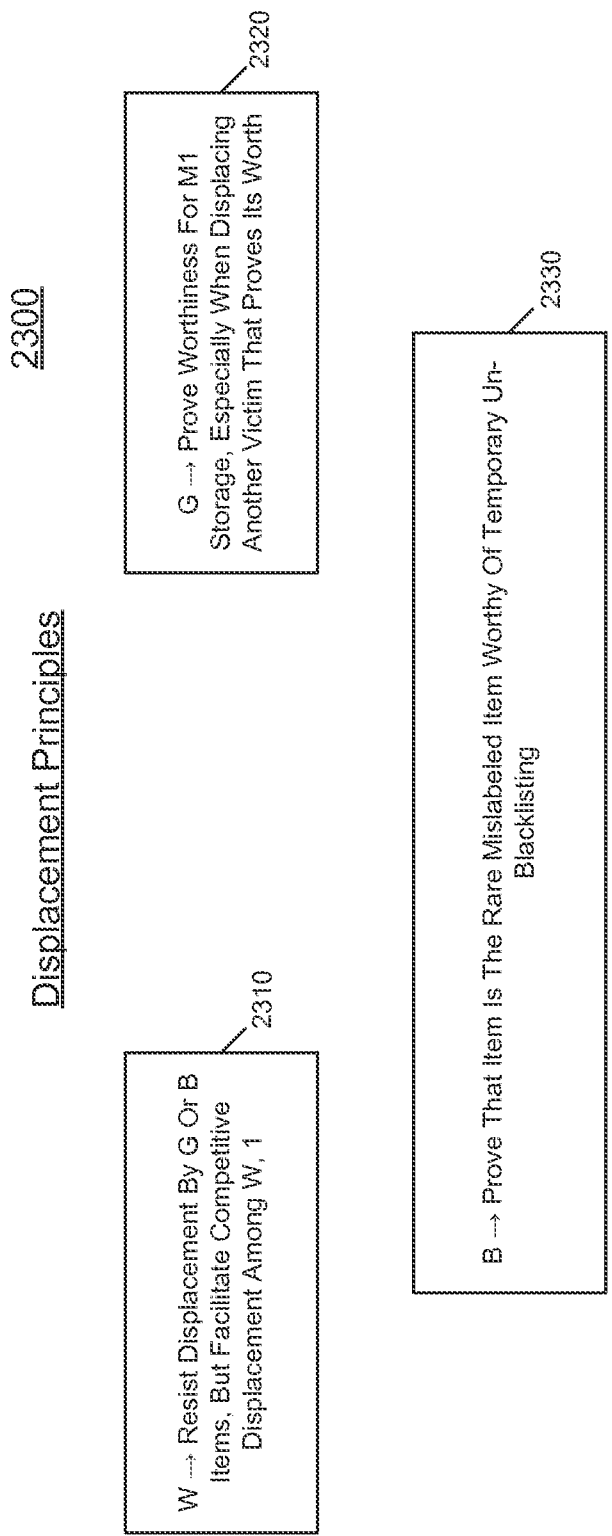
FIG. 23 is a flow diagram that illustrates principles of displacement decisions of a method in accordance with another embodiment.

Referring now to FIG. 23 shown is a flow diagram that illustrates principles of displacement decisions of a method in accordance with another embodiment. As shown in FIG. 23, sophisticated displacement decisions may be based on the following adaptation principles for software-hardware collaboration. More specifically, in the high level view of FIG. 23, method 2300 provides a different set of rules depending on category. At block 2320, G encoded data blocks may prove their worthiness for storage in M1, especially when displacing another victim that proved its worth. Such operation may occur because not much is known to software about gray labeled data ahead of time and/or behavior of such data items can be very data/phase dependent. In turn, at block 2310 W encoded data blocks may resist displacement by G or B items, but facilitate competitive displacement among W blocks. Such operation may occur because white-white conflicts may be rare, in spite of mistakes. Finally, at block 2330, for B encoded data blocks, an item may first prove that it is the rare mislabeled item worthy of temporary un-blacklisting before allowing storage in M1. This is the case, because blacklisting is meant to keep M1 from being trashed by data of known, overall uniform low probability of reference, while keeping hardware demands (complexity) low.

Ideally, software provides hardware high level guidance, but then hardware adapts that guidance according to dynamic behavior. For cachelines in the W group, the control logic is adapted to resist displacement by G/B items, and aid competitive displacement by W cachelines. For those data items in the G group, the displacing G item first proves its worthiness over that of a victim (as the victim has already secured a spot in M1) before displacement is allowed. For the B group, items are only promoted into M1 after proving that they have the rare characteristic of being referenced repeatedly in relation to other B items.

Let us use the following additional notation, for convenience.

$\zeta 0( \ldots )$, $\zeta 1( \ldots )$ are dynamic thresholds for biasing displacement decisions using randomization.

DMAP/µ is a direct-map (many-to-one) function used by hardware to map from M2 into M1.

R'=TAG(µ(R)) is a tag (identifying the cacheblock in M2) of a potential victim block (in M2) that is presently cached in M1, and could be replaced by a new reference R.

Figure 24:
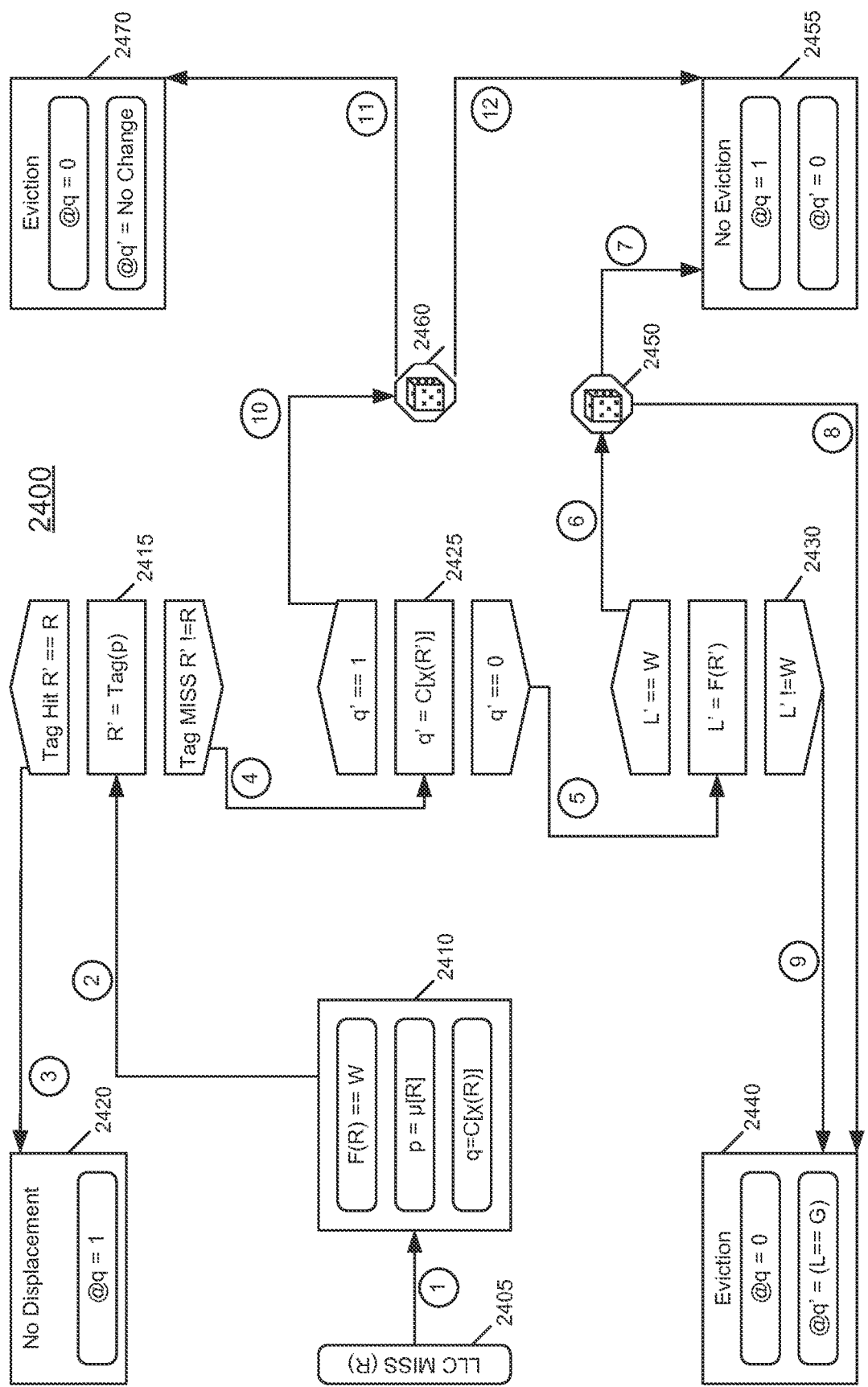
FIG. 24 is a flow diagram of a method for performing adaptive displacement decisions for a white-labeled cacheblock in accordance with one embodiment of the present invention.

Referring now to FIG. 24, shown is a flow diagram of a method for performing adaptive displacement decisions upon an LLC miss for a white labeled cacheblock in accordance with one embodiment of the present invention. Method 2400 may enable enhanced handling of white-listed cache blocks. FIG. 24 shows how the two displacement principles: resist displacement by B, G items; and enable competitive displacement of W items by other W items, can be achieved in a lightweight way.

Method 2400 generally describes various analysis and decisions made during determination of a displacement decision for a white labeled data item that misses in a last level cache (block 2405). At a first analysis block 2410, the Bloom filters are checked to thus determine that it is a white labeled data item, a set is determined, and the access bits for the corresponding address are obtained from the C[ ] bitmap. Based on the determinations made, one or more various decision blocks 2415, 2425, and 2430 are executed, resulting in determinations of no displacement (blocks 2420 and 2455) or eviction (at block 2440 and 2470). As further seen, along certain paths, probabilistic determinations are made (at blocks 2450 and 2460).

In FIG. 24 method 2400 provides a path 1-2-3 ("hit" path) that is the most likely, and in that path, hardware deposits a "1" in the accessed-bitmap (@C[χ(R)]) and no displacement occurs (block 2420). On the rare tag miss, the hardware checks if the victim to be displaced (i.e., R') has a "1" in its bitmap (at block 2425), and if not, it is displaced along the path (4-5-9) (to block 2440), if it is not a W item (determined at block 2430).

Path 4-5-6 represents the case that while the victim's accessed bit is 0, the victim is of type W. In this case, the victim is displaced (path 8) or not (path 7) according to a random draw (namely a probability determination at block 2450) with a tunable bias ($\zeta 0( )$) between displacing and not displacing it by the incoming W access. Path 4-10 represents the situation that the victim item was referenced. In this case a random chance (much lower, $\zeta 1( )$) is given for displacing the victim (namely a probability determination at block 2460); the likelihood of a recently referenced W item being displaced is different according to the victim's category. When eviction succeeds (along paths 8, 9, 11), the accessed-bit for the displacer cacheblock is set to 0 (at block 2470); and for the displaced victim it is left unchanged. In case a recently accessed G item is evicted from M1, the accessed-bit for the victim is raised to 1. This is because G items are tracked between the point that they are displaced and re-accessed.

Path 4-5-9 discourages displacing a white item unless the displacement is by a W item; similarly, path 4-5-6-8 uses a low eviction probability bias when the displacement target is W. This is an example of the resistance principle. Conversely, when the displacement target is W, then two different biases ($\zeta 0(W)$ and $\zeta 1(W)$) are used to displace it by this incoming W item according to whether the displacement target was previously referenced or not. This is an example of the competitive displacement principle.

Figure 25:
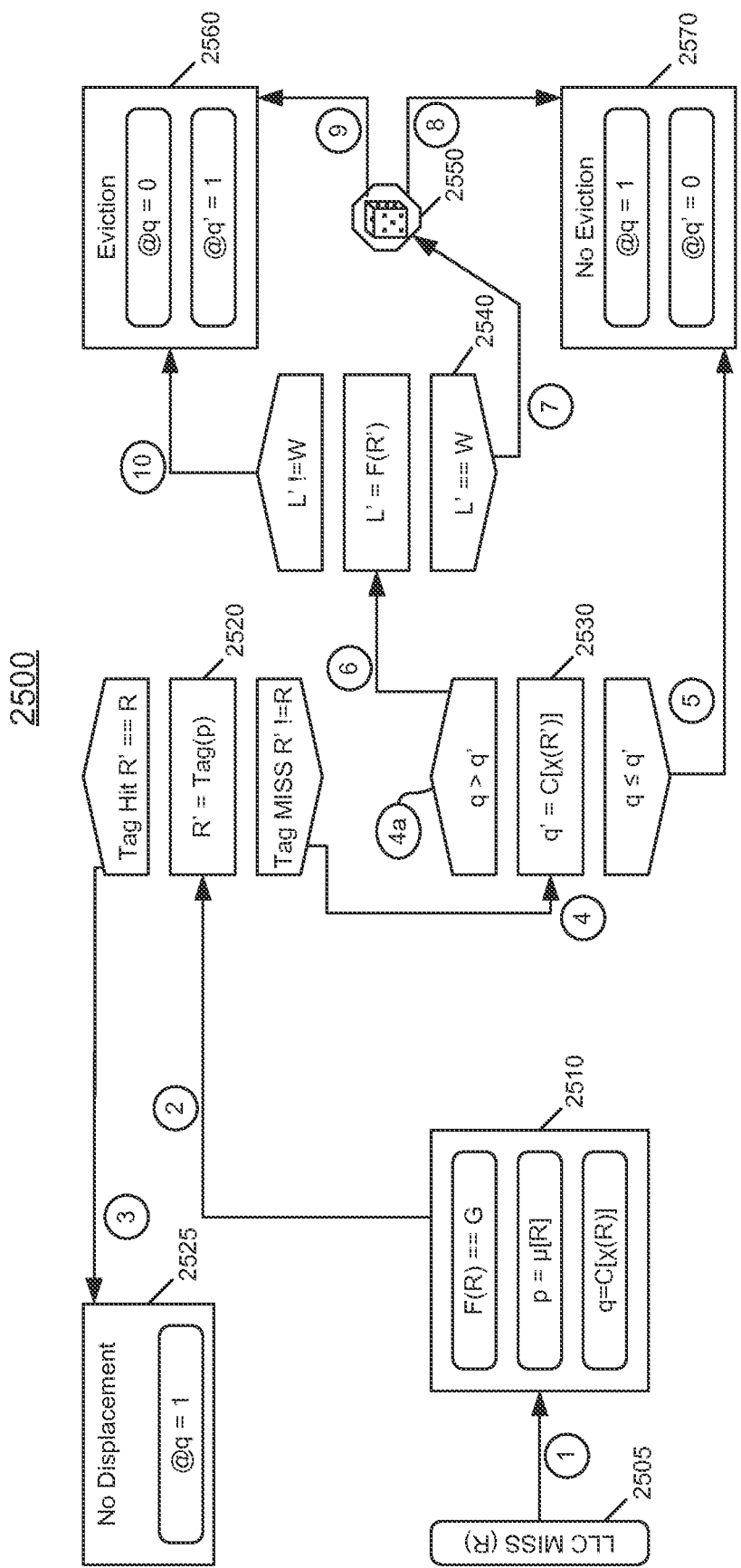
FIG. 25 is a flow diagram of a method for adaptive displacement decisions for a gray-labeled cacheblock in accordance with an embodiment of the present invention.

FIG. 25 is a flow diagram of a method for adaptive displacement decisions upon an LLC miss for a gray labeled cacheblock in accordance with an embodiment of the present invention. As with FIG. 24 above, in FIG. 25, method 2500 begins responsive to determination of a miss and an LLC (block 2505). After determination of a gray labeled item, identification of a set, and determination of access history with reference to bitmap C[ ] (at determination block 2510), a series of analyses occur at one or more of decision blocks 2520, 2530, and 2540. Based on these decisions, a random probability may be performed at block 2550, following path 7. Determinations of no displacement (blocks 2525 and 2570) or eviction (at decision block 2560) may proceed.

More specifically, method 2500 of FIG. 25 shows how the principle: "show worthiness" can be applied in relation to G items in a lightweight way. Path 1-2-3 is the common path that a G item that is popular and therefore in M1, might experience. However, it is possible that caches may filter out most of the locality, and therefore the cache-missing accesses for G items may find that some good fraction of even popular G items is displaced from M1.

To prove worthiness, a G item can show that when displaced from M1, it has a reasonably high likelihood of being missed. This is achieved by the comparison shown at block 2530 in FIG. 25: for a candidate G item (that has missed), block 2530 compares whether an access has occurred to the potential victim, while an access has not happened to the missed item (4-6-10, if the victim isn't W). And, if the potential victim happens to be W (as determined at block 2540), it is still subject to displacement, albeit with a lower probability (path 4-6-7-9). Conversely, if the victim has registered a recent access, then regardless of whether the candidate G item (i.e., R) was also touched recently, no eviction happens (path 4-5).

Figure 26:
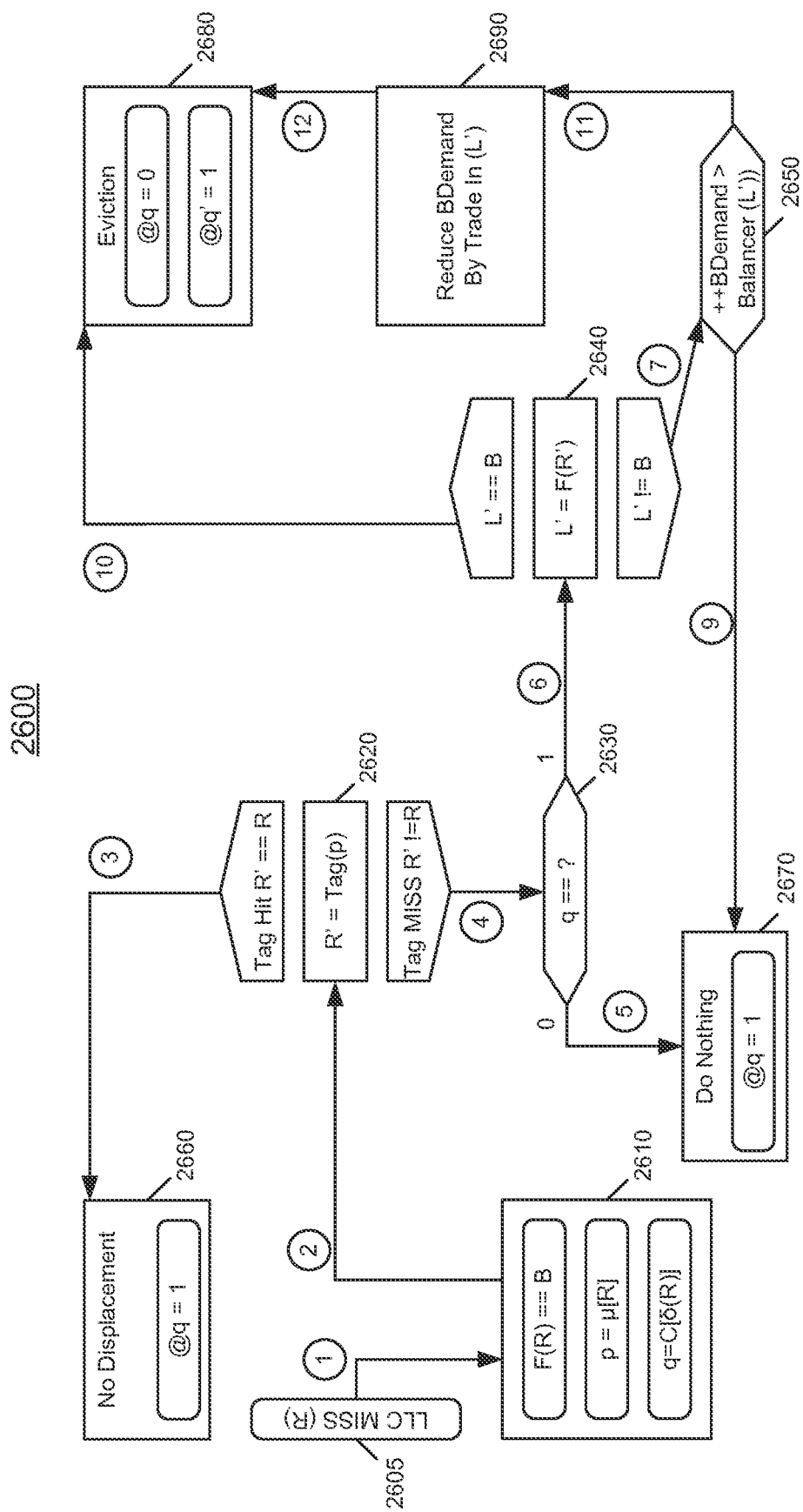
FIG. 26 is a flow diagram of a method for adaptive displacement decisions for a black-labeled cacheblock in accordance with an embodiment.

FIG. 26 is a flow diagram of a method for adaptive displacement upon an LLC miss for a black labeled cacheblock in accordance with an embodiment of the present invention. Method 2600 begins responsive to a LLC miss (block 2605) for a black labeled item (as determined at determination block 2610, which further identifies the set of the missing item and its access history per the D[ ] bitmap). Various decisions are made at decision blocks 2620, 2630, 2640 and 2650 based on a variety of determinations as shown, to result in determinations of no displacement (at blocks 2660 and 2670) or eviction at block 2680.

More specifically, method 2600 of FIG. 26 shows how the principle: "show that it is the rare mislabeled item" is applied in relation to B items in a lightweight way. First, since B items are expected to be accessed rarely as a group, path 1-2-3 may occur only occasionally. To detect the rare mislabeled B element, access bitmap D[ ] is used for tracking B data items. In addition, the bitmap hash $\delta$ considers only the PBITS, so that many more B cacheblocks can be (statistically) tracked with the D[ ] bitmap.

Path 1-2-3 may be followed by B items occasionally for a mislabeled B item, as noted above. Rarer than it even is the area in the middle (path 4-5) for other correctly labeled B items, and for correctly identified B items, the path 6-7-9 tests if referenced B items are being demanded more frequently than potential victims to be balanced off against, which are not B labeled. Finally, in the event that such a rare mislabeled B item is found, it either bumps another mis- identified B item (via path 10 to block 2680), or is exchanged for a non-B victim when hardware detects that demand for B items (where the B items conflict with non-B items) has increased temporarily. In the latter case, a B item bumps a non-B item. When a B item bumps a non-B item, then the B demand statistic is artificially reduced by a high value (e.g., 10, or 25) (at block 2690), as reflected by a "TRADE-IN" value shown in path 7-11-12; software may thus prohibit exchanging a B item for a W item by having a very high TRADE-IN value for W's, or make exchanges easier by reducing TRADE-IN values.

Note that in still further embodiments, the access bitmap history D[ ] may be removed for B cacheblocks. Instead, the processor may include a victim cache to isolate and hold the rare B elements that fall out of processor caches and are referenced again within a threshold reuse distance within the population of B cacheblocks. In that implementation, $\delta$ is not needed either, and hence the need to consider only the PBITS vanishes as well. In other cases, probabilistic promotion/demotion for the "B" set may be replaced with a statistically sized reservation pool, e.g., allocated in M1.

As yet another alternative to a victim cache, an equivalent prefetch buffer mechanism may be used, where all B blocks could be placed there when touched, and if re-touched while in the buffer, the blocks could be promoted by placing them into M1 for treatment as "G" group items.

The following examples pertain to further embodiments.

In one example, a processor comprises: a control logic to determine whether to enable an incoming data block associated with a first priority to displace, in a cache memory coupled to the processor, a candidate victim data block associated with a second priority and stored in the cache memory, based at least in part on the first and second priorities, a first access history associated with the incoming data block and a second access history associated with the candidate victim data block.

In an example, the control logic is to enable a second data block having the second priority to displace a first data block stored in the cache memory, the first data block having the first priority, the second priority lower than the first priority, when an application indicates that priority information is to be overridden.

In an example, the control logic is to receive the first priority and the second priority from the application responsive to one or more user-level instructions to indicate the first priority and the second priority.

In an example, the control logic, when the application indicates that the priority information is not to be overridden, is to prevent the displacement of the first data block with the second data block.

In an example, the control logic is to statistically bias displacement of the candidate victim data block according to a first bias value, the first bias value based at least in part on the first priority and the second priority. The first bias value may further be based at least in part on the first access history and the second access history.

In an example, the cache memory comprises a direct-mapped cache memory and the candidate victim data block and the incoming data block map to a common entry of the direct-mapped cache memory.

In an example, the processor further comprises a plurality of filter storages including a first filter storage to store a first pattern to indicate locations in the cache memory that may store data blocks of the first priority.

In an example, the processor further comprises: a first storage to store a first access history to indicate an access history for data blocks having the first priority; and a second storage to store a second access history to indicate an access history for data blocks having the second priority.

In an example, the control logic is to perform a hash function of an address of the incoming data block and to update a corresponding entry of the first storage based on the hash function.

In an example, the processor further comprises a memory controller including the control logic, where the cache memory comprises a system memory coupled to the processor, and where the incoming data block is to be obtained from a persistent storage coupled to the system memory.

In an example, the control logic is to prevent displacement of the candidate victim data block with a second incoming data block having a third priority unless data blocks of the third priority are requested more often than data blocks of the first priority or the second priority, where the third priority is lower than the first priority and the second priority.

Note that the above processor can be implemented using various means.

In an example, the processor comprises a SoC incorporated in a user equipment touch-enabled device.

In another example, a system comprises a display and a memory, and includes the processor of one or more of the above examples.

In another example, a method comprises: responsive to a cache miss for a requested data item in a cache memory of a processor, identifying a candidate victim data item stored in a first memory coupled to the processor; determining to displace the candidate victim data item stored in the first memory with the requested data item when an override indicator indicates that a priority consideration of a displacement policy is to be overridden, where a priority associated with the candidate victim data item is higher than a priority associated with the requested data item; and storing the requested data item in the first memory in a location in which the candidate replacement data item was stored.

In an example, the method further comprises receiving an instruction from an application to indicate a first priority level for a memory range including the requested data item.

In an example, the method further comprises storing a first value in an entry of a filter storage corresponding to the requested data item responsive to the instruction, the filter storage associated with the first priority level.

In an example, the method further comprises receiving the override indicator from the application, based on a particular phase of application execution.

In an example, the first memory comprises a system memory coupled to the processor and in response to the displacement determination, the method includes loading the requested data item from a persistent memory coupled to the first memory into the first memory, where the first memory is direct mapped.

In an example, the method further comprises determining whether to displace the candidate victim data item according to a stochastic determination.

In an example, the method further comprises adjusting a bias of the stochastic determination according to a bias value, the bias value based at least in part on the priority associated with the requested data item and the priority associated with the candidate victim data item.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system comprises: a persistent storage to store data blocks persistently; a memory coupled to the persistent storage to cache a plurality of the data blocks obtained from the persistent storage; and a processor coupled to the memory and the persistent storage, the processor including at least one core, at least one cache memory, and a memory controller, the memory controller including a control logic to stochastically determine whether to displace a first data block stored in the memory with a second data block stored in the persistent storage, based at least in part on a first priority associated with the first data block and a second priority associated with the second data block.

In an example, the processor further comprises a first filter storage having entries to indicate one or more first addresses within the persistent storage associated with the first priority and a second filter storage having entries to indicate one or more second addresses within the persistent storage associated with the second priority, where the control logic is to update an entry of the first filter storage associated with the first data block according to a hash function responsive to an indication that associates the first priority with the first data block, the indication received from an application.

In an example, the indication comprises a user-level instruction to indicate, from the application, association of the first priority with the first data block.

In an example, the processor further comprises: a first storage to store a first access history to indicate an access history for data blocks having the first priority; and a second storage to store a second access history to indicate an access history for data blocks having the second priority.

In an example, the control logic is to stochastically determine whether to displace the first data block further based at least in part on a first access history for the first data block obtained from the first storage and a second access history for the second data block obtained from the second storage.

In an example, the control logic is to stochastically determine whether to displace the first data block further based on a first bias value or a second bias value, where the control logic is to obtain the first bias value if the first data block was more recently used than the second data block.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a control logic to determine whether to enable an incoming data block associated with a first priority to displace, in a cache memory coupled to the processor, a candidate victim data block associated with a second priority and stored in the cache memory, based at least in part on the first and second priorities, a first access history associated with the incoming data block and a second access history associated with the candidate victim data block, wherein the control logic is to perform a data block displacement decision with respect to the incoming data block and the candidate victim data block comprising a statistical probability determination according to a first bias value to randomly statistically bias displacement of the candidate victim data block, wherein the control logic is to select one of a first bias matrix storage and a second bias matrix storage from which to obtain the first bias value based at least in part on the first priority and the second priority.

2. The processor of claim 1, wherein the control logic is to enable a second data block having the second priority to displace a first data block stored in the cache memory, the first data block having the first priority, the second priority lower than the first priority, when an application indicates that priority information is to be overridden.

3. The processor of claim 2, wherein the control logic is to receive the first priority and the second priority from the application responsive to one or more user-level instructions to indicate the first priority and the second priority.

4. The processor of claim 2, wherein the control logic, when the application indicates that the priority information is not to be overridden, is to prevent the displacement of the first data block with the second data block.

5. The processor of claim 1, wherein the first bias value is further based at least in part on the first access history and the second access history.

6. The processor of claim 1, wherein the cache memory comprises a direct-mapped cache memory and wherein the candidate victim data block and the incoming data block map to a common entry of the direct-mapped cache memory.

7. The processor of claim 1, further comprising a plurality of filter storages including a first filter storage to store a first pattern to indicate locations in the cache memory that may store data blocks of the first priority.

8. The processor of claim 1, wherein the processor further comprises:
a first storage to store a first access history to indicate an access history for data blocks having the first priority; and
a second storage to store a second access history to indicate an access history for data blocks having the second priority.

9. The processor of claim 8, wherein the control logic is to perform a hash function of an address of the incoming data block and to update a corresponding entry of the first storage based on the hash function.

10. The processor of claim 1, wherein the processor further comprises a memory controller, the memory controller including the control logic, wherein the cache memory comprises a system memory coupled to the processor, and wherein the incoming data block is to be obtained from a persistent storage coupled to the system memory.

11. The processor of claim 1, wherein the control logic is to prevent displacement of the candidate victim data block with a second incoming data block having a third priority unless data blocks of the third priority are requested more often than data blocks of the first priority or the second priority, wherein the third priority is lower than the first priority and the second priority.

12. A non-transitory machine-readable medium having stored thereon data, which if used by at least one machine, causes the at least one machine to fabricate at least one integrated circuit to perform a method comprising:
responsive to a cache miss for a requested data item in a cache memory of a processor, identifying a candidate victim data item stored in a first memory coupled to the processor;
determining to displace the candidate victim data item stored in the first memory with the requested data item according to a stochastic probability determination, when an override indicator indicates that a priority consideration of a displacement policy is to be overridden, wherein a priority associated with the candidate victim data item is higher than a priority associated with the requested data item, and adjusting a bias of the stochastic probability determination according to a bias value obtained from a selected one of a first bias matrix storage and a second bias matrix storage based at least in part on an access history of the requested data item and an access history of the candidate victim data item, the bias value based at least in part on the priority associated with the requested data item and the priority associated with the candidate victim data item; and
storing the requested data item in the first memory in a location in which the candidate replacement data item was stored.

13. The non-transitory machine-readable medium of claim 12, wherein the method further comprises receiving an instruction from an application to indicate a first priority level for a memory range including the requested data item.

14. The non-transitory machine-readable medium of claim 13, wherein the method further comprises storing a first value in an entry of a filter storage corresponding to the requested data item responsive to the instruction, the filter storage associated with the first priority level.

15. The non-transitory machine-readable medium of claim 13, wherein the method further comprises receiving the override indicator from the application, based on a particular phase of application execution.

16. The non-transitory machine-readable medium of claim 12, wherein the first memory comprises a system memory coupled to the processor and in response to the displacement determination, loading the requested data item from a persistent memory coupled to the first memory into the first memory, wherein the first memory is direct mapped.

17. A system comprising:
a persistent storage to store data blocks persistently;
a memory coupled to the persistent storage to cache a plurality of the data blocks obtained from the persistent storage; and
a processor coupled to the memory and the persistent storage, the processor including at least one core, at least one cache memory, and a memory controller, the memory controller including a control logic to perform a data block displacement decision comprising a stochastic probability determination according to a bias value to stochastically determine whether to displace a first data block stored in the memory with a second data block stored in the persistent storage, the bias value based at least in part on a first priority associated with the first data block and a second priority associated with the second data block, and in response to the stochastic probability determination, replace the first data block with the second data block.

18. The system of claim 17, wherein the processor further comprises a first filter storage having entries to indicate one or more first addresses within the persistent storage associated with the first priority and a second filter storage having entries to indicate one or more second addresses within the persistent storage associated with the second priority, wherein the control logic is to update an entry of the first filter storage associated with the first data block according to a hash function responsive to an indication that associates the first priority with the first data block, the indication received from an application.

19. The system of claim 18, wherein the indication comprises a user-level instruction to indicate, from the application, association of the first priority with the first data block.

20. The system of claim 18, wherein the processor further comprises:
a first storage to store a first access history to indicate an access history for data blocks having the first priority; and
a second storage to store a second access history to indicate an access history for data blocks having the second priority.

21. The system of claim 20, wherein the control logic is to perform the stochastic probability determination to stochastically determine whether to displace the first data block further based at least in part on a first access history for the first data block obtained from the first storage and a second access history for the second data block obtained from the second storage.

22. The system of claim 21, wherein the bias value is one of a first bias value or a second bias value, wherein the control logic is to obtain the first bias value and not the second bias value if the first data block was more recently used than the second data block.

* * * * *